US012380857B2

(12) United States Patent
In et al.

(10) Patent No.: US 12,380,857 B2
(45) Date of Patent: Aug. 5, 2025

(54) SCAN DRIVER

(71) Applicant: Samsung Display Co., Ltd., Yongin-si (KR)

(72) Inventors: Haijung In, Yongin-si (KR); Chulkyu Kang, Yongin-si (KR); Kimyeong Eom, Yongin-si (KR); Soongi Kwon, Yongin-si (KR); Minjeong Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/128,956

(22) Filed: Mar. 30, 2023

(65) Prior Publication Data

US 2023/0335062 A1 Oct. 19, 2023

(30) Foreign Application Priority Data

Apr. 14, 2022 (KR) ........................ 10-2022-0046497

(51) Int. Cl.
*G09G 3/3266* (2016.01)
*G09G 3/3258* (2016.01)

(52) U.S. Cl.
CPC ......... *G09G 3/3266* (2013.01); *G09G 3/3258* (2013.01); *G09G 2310/0286* (2013.01); *G09G 2310/08* (2013.01); *G09G 2320/0223* (2013.01)

(58) Field of Classification Search
CPC .. G09G 3/3233; G09G 3/3266; G09G 3/3291; G09G 2300/0819; G09G 2300/0842; G09G 2300/0861; G09G 2310/0248; G09G 2310/0286; G09G 2310/0297; H01L 27/1225; H01L 27/124; H01L 27/1251; H01L 27/1255; H01L 29/78648
See application file for complete search history.

(56) References Cited

U.S. PATENT DOCUMENTS

| | | | |
|---|---|---|---|
| 9,123,282 | B2 | 9/2015 | Sung et al. |
| 9,330,593 | B2 | 5/2016 | Jang |
| 10,991,314 | B2 | 4/2021 | Park et al. |
| 11,151,940 | B2 | 10/2021 | Park |

(Continued)

FOREIGN PATENT DOCUMENTS

| | | | |
|---|---|---|---|
| KR | 10-2020-0072635 | A | 6/2020 |
| KR | 10-2020-0100247 | A | 8/2020 |

(Continued)

*Primary Examiner* — Stacy Khoo
(74) *Attorney, Agent, or Firm* — Womble Bond Dickinson (US) LLP

(57) ABSTRACT

A scan driver includes a stage, wherein the stage includes: a first output controller including a first pull-up transistor and a first pull-down transistor, wherein the first pull-up transistor has a gate connected to a first control node, and the first pull-down transistor has a gate connected to a second control node; a second output controller including a second pull-up transistor and a second pull-down transistor, wherein the second pull-up transistor has a gate connected to the first control node, and the second pull-down transistor has a gate connected to the second control node; and a stabilizer configured to maintain the first control node at an off-voltage level based on the second control node being at an on-voltage level.

27 Claims, 34 Drawing Sheets

(56) References Cited

U.S. PATENT DOCUMENTS

| | | | | |
|---|---|---|---|---|
| 11,238,811 | B2 | 2/2022 | Chung et al. | |
| 11,348,530 | B2 | 5/2022 | Choi et al. | |
| 2014/0078029 | A1 | 3/2014 | Jang | |
| 2022/0208104 | A1* | 6/2022 | Chang | G09G 3/3266 |
| 2023/0197012 | A1* | 6/2023 | Oh | G11C 19/28 345/204 |

FOREIGN PATENT DOCUMENTS

| | | | |
|---|---|---|---|
| KR | 10-2020-0128278 | A | 11/2020 |
| KR | 10-2021-0024343 | A | 3/2021 |

* cited by examiner

SCAN DRIVER

CROSS-REFERENCE TO RELATED APPLICATION

The present application claims priority to and the benefit of Korean Patent Application No. 10-2022-0046497, filed on Apr. 14, 2022, in the Korean Intellectual Property Office, the entire disclosure of which is incorporated herein by reference.

BACKGROUND

1. Field

Aspects of one or more embodiments relate to a scan driver and a display apparatus including the same.

2. Description of the Related Art

A display apparatus generally includes a pixel part (or display panel comprising a plurality of pixels), a scan driver, a data driver, and a controller, wherein the pixel part includes a plurality of pixels. The scan driver generally includes stages connected to scan lines. The stages are configured to supply scan signals to corresponding scan lines connected thereto according to signals from the controller.

The above information disclosed in this Background section is only for enhancement of understanding of the background and therefore the information discussed in this Background section does not necessarily constitute prior art.

SUMMARY

Aspects of one or more embodiments include a scan driver configured to stably output scan signals, and a display apparatus including the same. Characteristics of embodiments according to the present disclosure, however, are not limited to the characteristics mentioned above, and other characteristics that are not mentioned will be more clearly understood by those of ordinary skill in the art from the description of some embodiments of the present disclosure.

Additional aspects will be set forth in part in the description which follows and, in part, will be apparent from the description, or may be learned by practice of the presented embodiments of the disclosure.

According to some embodiments, a scan driver includes a plurality of stages, wherein each of the plurality of stages includes a first node controller configured to control a voltage level of a first control node, a second node controller configured to control a voltage level of a second control node, a first output controller including a first pull-up transistor and a first pull-down transistor, wherein the first pull-up transistor has a gate connected to the first control node, and is configured to output scan signals of an on-voltage level, and the first pull-down transistor has a gate connected to the second control node, and is configured to output scan signals of an off-voltage level, a second output controller including a second pull-up transistor and a second pull-down transistor, wherein the second pull-up transistor has a gate connected to the first control node, and is configured to output carry signals of an on-voltage level, and the second pull-down transistor has a gate connected to the second control node, and is configured to output carry signals of an off-voltage level, and a stabilizer configured to maintain the first control node at an off-voltage level when the second control node is at an on-voltage level.

According to some embodiments, the second control node may include a (2-1)st control node and a (2-2)nd control node, wherein the first pull-down transistor may include a (1-1)st pull-down transistor connected between a first output terminal and a second voltage input terminal, the (1-1)st pull-down transistor having a gate connected to the (2-1)st control node, and a (1-2)nd pull-down transistor connected between the first output terminal and the second voltage input terminal, the (1-2)nd pull-down transistor having a gate connected to the (2-2)nd control node, and wherein the (1-1)st pull-down transistor and the (1-2)nd pull-down transistor may be alternately turned on in units of n times or 1/n times of a frame.

According to some embodiments, the second control node may include a (2-1)st control node and a (2-2)nd control node, wherein the second pull-down transistor may include a (2-1)st pull-down transistor connected between a second output terminal and a third voltage input terminal, the (2-1)st pull-down transistor having a gate connected to the (2-1)st control node, and a (2-2)nd pull-down transistor connected between the second output terminal and the third voltage input terminal, the (2-2)nd pull-down transistor having a gate connected to the (2-2)nd control node, and wherein the (2-1)st pull-down transistor and the (2-2)nd pull-down transistor may be alternately turned on in units of n times or 1/n times of a frame.

According to some embodiments, the second output controller may further include a first capacitor connected between the first control node and the second output terminal.

According to some embodiments, the first node controller may include a first transistor connected between an input terminal that receives a start signal and the first control node, the first transistor including a gate that receives a carry clock signal.

According to some embodiments, the second node controller may include a twelfth transistor connected between a fourth voltage input terminal and a first node, the twelfth transistor having a gate connected to the fourth voltage input terminal, a thirteenth transistor connected between the fourth voltage input terminal and a (2-1)st control node, the thirteenth transistor having a gate connected to the first node, a 14-th transistor connected between the first node and the second voltage input terminal, the 14-th transistor having a gate connected to the first control node, a 15-th transistor connected between the first node and the third voltage input terminal, the 15-th transistor having a gate connected to the first control node, a 16-th transistor connected between a fifth voltage input terminal and a second node, the 16-th transistor having a gate connected to the fifth voltage input terminal, a 17-th transistor connected between the fifth voltage input terminal and a (2-2)nd control node, the 17-th transistor having a gate connected to the second node, an 18-th transistor connected between the second node and the second voltage input terminal, the 18-th transistor having a gate connected to the first control node, and a 19-th transistor connected between the second node and the third voltage input terminal, the 19-th transistor having a gate connected to the first control node.

According to some embodiments, a third voltage applied to the third voltage input terminal may be less than a second voltage applied to the second voltage input terminal.

According to some embodiments, a fourth voltage applied to the fourth voltage input terminal and a fifth voltage applied to the fifth voltage input terminal may be signals in which an on-voltage level and an off-voltage level alternate each other in units of n times or 1/n times of a frame.

According to some embodiments, when the fourth voltage is an on-voltage level, the fifth voltage may be an off-voltage level, and when the fourth voltage is an off-voltage level, the fifth voltage may be an on-voltage level.

According to some embodiments, a portion of a section in which the fourth voltage is an on-voltage level may overlap a portion of a section in which the fifth voltage is an on-voltage level.

According to some embodiments, the first pull-up transistor may be connected between a scan clock terminal and a first output terminal, the second pull-up transistor may be connected between a first carry clock terminal and a second output terminal, and an on-voltage period of a scan clock signal applied to the scan clock terminal may overlap an on-voltage period of a carry clock signal applied to the first carry clock terminal.

According to some embodiments, the scan clock signal and the carry clock signal may be clock signals in which an on-voltage level and an off-voltage level alternate each other.

According to some embodiments, the first node controller may include a first transistor connected between an input terminal to which a start signal is applied, and the first control node, the first transistor having a gate connected to a second carry clock terminal, wherein a carry clock signal applied to the second carry clock terminal may have a same waveform as that of a carry clock signal applied to the first carry clock terminal, the carry clock signal having a phase shifted by a preset interval.

According to some embodiments, the stabilizer may include a fourth transistor connected between the second output terminal and a third node, the fourth transistor having a gate connected to the (2-1)st control node, a fifth transistor connected between the second output terminal and the third node, the fifth transistor having a gate connected to the (2-2)nd control node, and a third transistor connected between the third node and the first control node, the third transistor having a gate receiving a carry clock signal.

According to some embodiments, when the first control node is an off-voltage level, and the (2-1)st control node or the (2-2)nd control node is an on-voltage level, the carry clock signal may be configured to alternately output an on-voltage level and an off-voltage level, and when the carry clock signal is an on-voltage level and the second output terminal is an off-voltage level, the first control node may be electrically connected to the second output terminal.

According to one or more embodiments, a scan driver includes a plurality of stages, wherein each of the plurality of stages includes a first node controller configured to control a voltage level of a first control node, a second node controller configured to control a voltage level of a second control node, a first output controller including a first pull-up transistor and a first pull-down transistor, wherein the first pull-up transistor has a gate connected to the first control node, and is configured to output scan signals of an on-voltage level, and the first pull-down transistor has a gate connected to the second control node, and is configured to output scan signals of an off-voltage level, a second output controller including a second pull-up transistor and a second pull-down transistor, wherein the second pull-up transistor has a gate connected to the first control node, and is configured to output carry signals of an on-voltage level, and the second pull-down transistor has a gate connected to the second control node, and is configured to output carry signals of an off-voltage level. According to some embodiments, the second control node may include a (2-1)st control node and a (2-2)nd control node. According to some embodiments, the first pull-down transistor may include a (1-1)st pull-down transistor connected between a first output terminal and a second voltage input terminal, the (1-1)st pull-down transistor having a gate connected to the (2-1)st control node, and a (1-2)nd pull-down transistor connected between the first output terminal and the second voltage input terminal, the (1-2)nd pull-down transistor having a gate connected to the (2-2)nd control node. According to some embodiments, the second pull-down transistor may include a (2-1)st pull-down transistor connected between a second output terminal and a third voltage input terminal, the (2-1)st pull-down transistor having a gate connected to the (2-1)st control node, and a (2-2)nd pull-down transistor connected between the second output terminal and the third voltage input terminal, the (2-2)nd pull-down transistor having a gate connected to the (2-2)nd control node.

According to some embodiments, the (1-1)st pull-down transistor and the (1-2)nd pull-down transistor may be alternately turned on in units of n times or 1/n times of a frame, and the (2-1)st pull-down transistor and the (2-2)nd pull-down transistor may be alternately turned on in units of n times or 1/n times of a frame.

According to some embodiments, the scan driver may further include a fourth transistor connected between the second output terminal and a third node, the fourth transistor having a gate connected to the (2-1)st control node, a fifth transistor connected between the second output terminal and the third node, the fifth transistor having a gate connected to the (2-2)nd control node, and a third transistor connected between the third node and the first control node, the third transistor having a gate receiving a carry clock signal.

According to some embodiments, the second node controller may include a twelfth transistor connected between a fourth voltage input terminal and a first node, the twelfth transistor having a gate connected to the fourth voltage input terminal, a thirteenth transistor connected between the fourth voltage input terminal and the (2-1)st control node, the thirteenth transistor having a gate connected to the first node, a 14-th transistor connected between the first node and the second voltage input terminal, the 14-th transistor having a gate connected to the first control node, a 15-th transistor connected between the first node and the third voltage input terminal, the 15-th transistor having a gate connected to the first control node, a 16-th transistor connected between a fifth voltage input terminal and a second node, the 16-th transistor having a gate connected to the fifth voltage input terminal, a 17-th transistor connected between the fifth voltage input terminal and the (2-2)nd control node, the 17-th transistor having a gate connected to the second node, a 18-th transistor connected between the second node and the second voltage input terminal, the 18-th transistor having a gate connected to the first control node, and a 19-th transistor connected between the second node and a third voltage input terminal, the 19-th transistor having a gate connected to the first control node.

According to some embodiments, a fourth voltage applied to the fourth voltage input terminal, and a fifth voltage applied to the fifth voltage input terminal may be signals in which an on-voltage level and an off-voltage level alternate each other in units of n times or 1/n times of a frame, wherein, when the fourth voltage is an on-voltage level, the fifth voltage may be an off-voltage level, and when fourth voltage is an off-voltage level, the fifth voltage may be an on-voltage level.

According to some embodiments, a fourth voltage applied to the fourth voltage input terminal, and a fifth voltage applied to the fifth voltage input terminal may be on-voltage levels.

BRIEF DESCRIPTION OF THE DRAWINGS

The above and other aspects, features, and characteristics of certain embodiments of the disclosure will be more apparent from the following description taken in conjunction with the accompanying drawings, in which.

DETAILED DESCRIPTION

Figure 1:
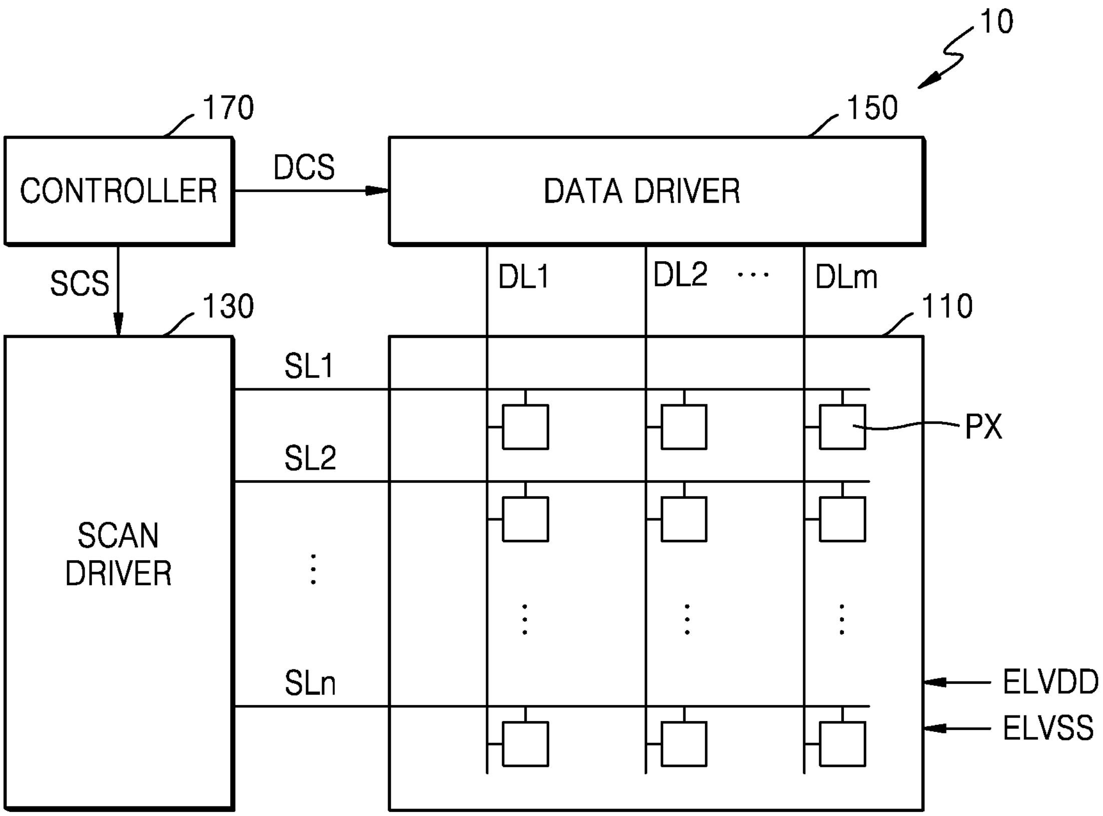
FIG. 1 is a schematic view of a display apparatus according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

As the present disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

While such terms as "first" and "second" may be used to describe various elements, such elements must not be limited to the above terms. The above terms are used to distinguish one element from another.

The singular forms "a," "an," and "the" as used herein are intended to include the plural forms as well unless the context clearly indicates otherwise.

It will be understood that the terms "comprise," "comprising," "include" and/or "including" as used herein specify the presence of stated features or elements but do not preclude the addition of one or more other features or elements.

It will be further understood that, when a layer, region, or element is referred to as being "on" another layer, region, or element, it can be directly or indirectly on the other layer, region, or element. That is, for example, intervening layers, regions, or elements may be present.

Sizes of elements in the drawings may be exaggerated or reduced for convenience of explanation. As an example, the size and thickness of each element shown in the drawings are arbitrarily represented for convenience of description, and thus, the present disclosure is not necessarily limited thereto.

In the present specification, "A and/or B" means A or B, or A and B. In the present specification, "at least one of A and B" means A or B, or A and B.

In following embodiments, when X is connected to Y, it may include the case where X is electrically connected to Y, the case where X is functionally connected to Y, and the case where X is directly connected to Y. Here, X and Y may be objects (e.g., apparatuses, elements, circuits, wirings, electrodes, terminals, conductive layers, layers, and the like). Accordingly, the connection is not limited to a preset connection relationship, for example, not limited to connection relationship denoted in the drawing or detailed description, but may include connection relationships other than the connection relationship denoted in the drawing or detailed description.

The case where X is electrically connected to Y may include, for example, the case where at least one element (e.g., a switch transistor, a capacitance element, an inductor, a resistance element, a diode, and the like) is connected between X and Y.

In the following embodiments, "ON" used in association with an element state, may denote an activated state of an element, and "OFF" may denote an inactivated state of an element. "ON" used in association with a signal received by an element, may denote a signal that activates the element, and "OFF" may denote a signal that deactivates the element. An element may be activated by a high-level voltage or a low-level voltage. As an example, a P-type transistor is activated by a low-level voltage, and an N-type transistor is activated by a high-level voltage. Accordingly, it should be understood that "ON"-voltages for a P-type transistor and an N-type transistor are opposite voltage levels (low versus high). Hereinafter, a voltage level that activates a transistor is referred to as an "ON"-voltage level, and a voltage level that inactivates a transistor is referred to as an "OFF"-voltage level.

FIG. 1 is a schematic view of a display apparatus 10 according to some embodiments.

The display apparatus 10 according to embodiments may be implemented as electronic apparatuses, such as smartphones, mobile phones, smartwatches, navigation apparatuses, game consoles, televisions (TVs), head units for automobiles, notebook computers, laptop computers, tablet computers, personal multimedia players (PMPs), personal digital assistants (PDAs), and the like. In addition, an electronic apparatus may be a flexible apparatus.

Referring to FIG. 1, the display apparatus 10 according to some embodiments may include a pixel part (or display panel) 110, a scan driver 130, a data driver 150, and a controller 170.

A plurality of pixels PX and signal lines may be located on the pixel part 110, wherein the signal lines are configured to apply electric signals to the plurality of pixels PX.

The plurality of pixels PX may be repeatedly arranged in a first direction (an x direction, a row direction) and a second direction (a y direction, a column direction). The plurality of pixels PX may be arranged in various configurations such as a stripe configuration, a pentile configuration, a mosaic configuration, and the like to display images. Each of the plurality of pixels PX may include an organic light-emitting diode as a display element, and the organic light-emitting diode may be connected to a pixel circuit. The pixel circuit may include a plurality of transistors and at least one capacitor.

According to some embodiments, the plurality of transistors included in the pixel part 110 may be N-type oxide thin-film transistors. As an example, an oxide thin-film transistor may be a low-temperature polycrystalline oxide (LTPO) thin-film transistor. However, this is provided as an example, and the N-type transistors are not limited thereto. As an example, an active pattern (a semiconductor layer) included in the transistors, may include an inorganic material semiconductor (e.g., amorphous silicon, polycrystalline silicon, etc.), or an organic material semiconductor.

The signal lines configured to apply electric signals to the plurality of pixels PX, may include a plurality of scan lines SL1 to SLn each extending in the first direction, and a plurality of data lines DL1 to DLm each extending in the second direction. The plurality of scan lines SL1 to SLn may be apart from each other in the second direction, and configured to transfer scan signals to the pixels PX. The plurality of data lines DL1 to DLm may be apart from each other in the first direction, and configured to transfer data signals to the pixels PX. Each of the plurality of pixels P may be connected to at least one corresponding scan line of the plurality of scan lines SL1 to SLn, and connected to at least one corresponding data line of the plurality of data lines DL1 to DLm.

The scan driver 130 may be connected to the plurality of scan lines SL1 to SLn, configured to generate scan signals according to a scan control signal SCS from the controller 170, and configured to sequentially supply the generated scan signals to the plurality of scan lines SL1 to SLn. A scan signal may be a square wave signal that may repeat an on-voltage (an on-voltage level) by which a transistor of a pixel PX may be turned on, and an off-voltage (an off-voltage level) by which a transistor may be turned off. According to some embodiments, an on-voltage may be a high-level voltage (referred to as a 'high voltage', hereinafter), or a low-level voltage (referred to as a 'low voltage', hereinafter). A period (referred to as an 'on-voltage period', hereinafter) for which an on-voltage of a scan signal is maintained, and a period (referred to as an 'off-voltage period', hereinafter) for which an off-voltage of the scan signal is maintained, may be determined depending on the function of a transistor that receives a scan signal within a pixel PX. The scan driver 130 may include shift registers (or stages) configured to sequentially generate and output scan signals.

The data driver 150 may be connected to the plurality of data lines DL1 to DLm, and configured to supply data signals to the data lines DL1 to DLm according to data control signals DCS from the controller 170. Data signals supplied to the data lines DL1 to DLm, may be supplied to the pixels PX to which scan signals are supplied. For this purpose, the data driver 150 may be configured to supply data signals to the data lines DL1 to DLm such that the data signals are synchronized with the scan signals.

In the case where the display apparatus is an organic field light-emitting display apparatus, a first power voltage ELVDD and a second power voltage ELVSS may be supplied to the pixels PX of the pixel part 110. The first power voltage ELVDD may be a high voltage provided to a first electrode (a pixel electrode or an anode) of an organic light-emitting diode included in each pixel PX. The second power voltage ELVSS may be a low voltage provided to a second electrode (an opposite electrode or a cathode) of the organic light-emitting diode. The first power voltage ELVDD and the second power voltage ELVSS are driving voltages for allowing the plurality of pixels PX to emit light.

The controller 170 may generate scan control signals SCS and data control signals DCS based on signals input from outside. The controller 170 may be configured to supply scan control signals SCS to the scan driver 130, and supply data control signals DCS to the data driver 150.

Figure 2:
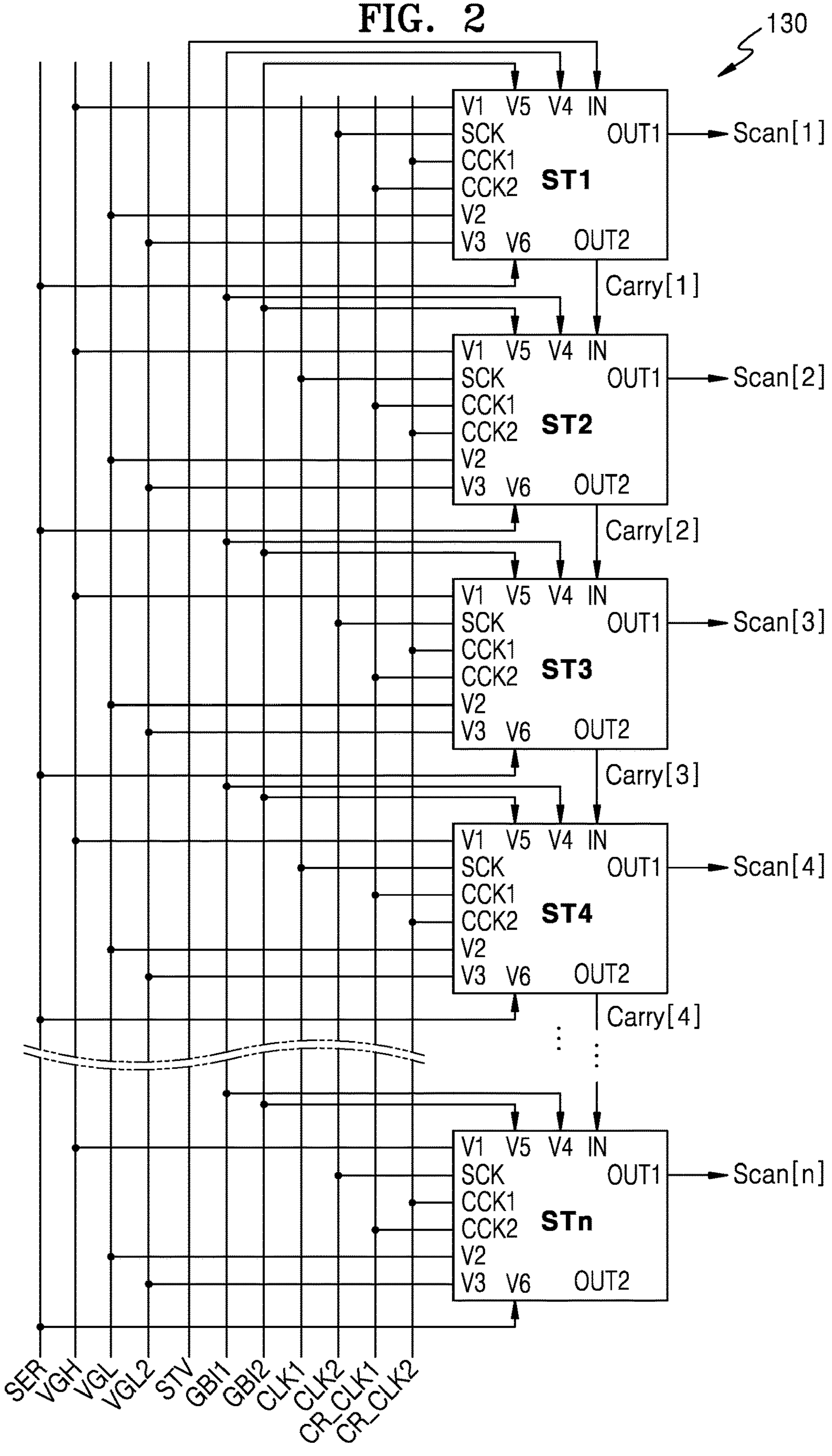
FIG. 2 is a schematic view of a scan driver according to an embodiment.
Figure 3:
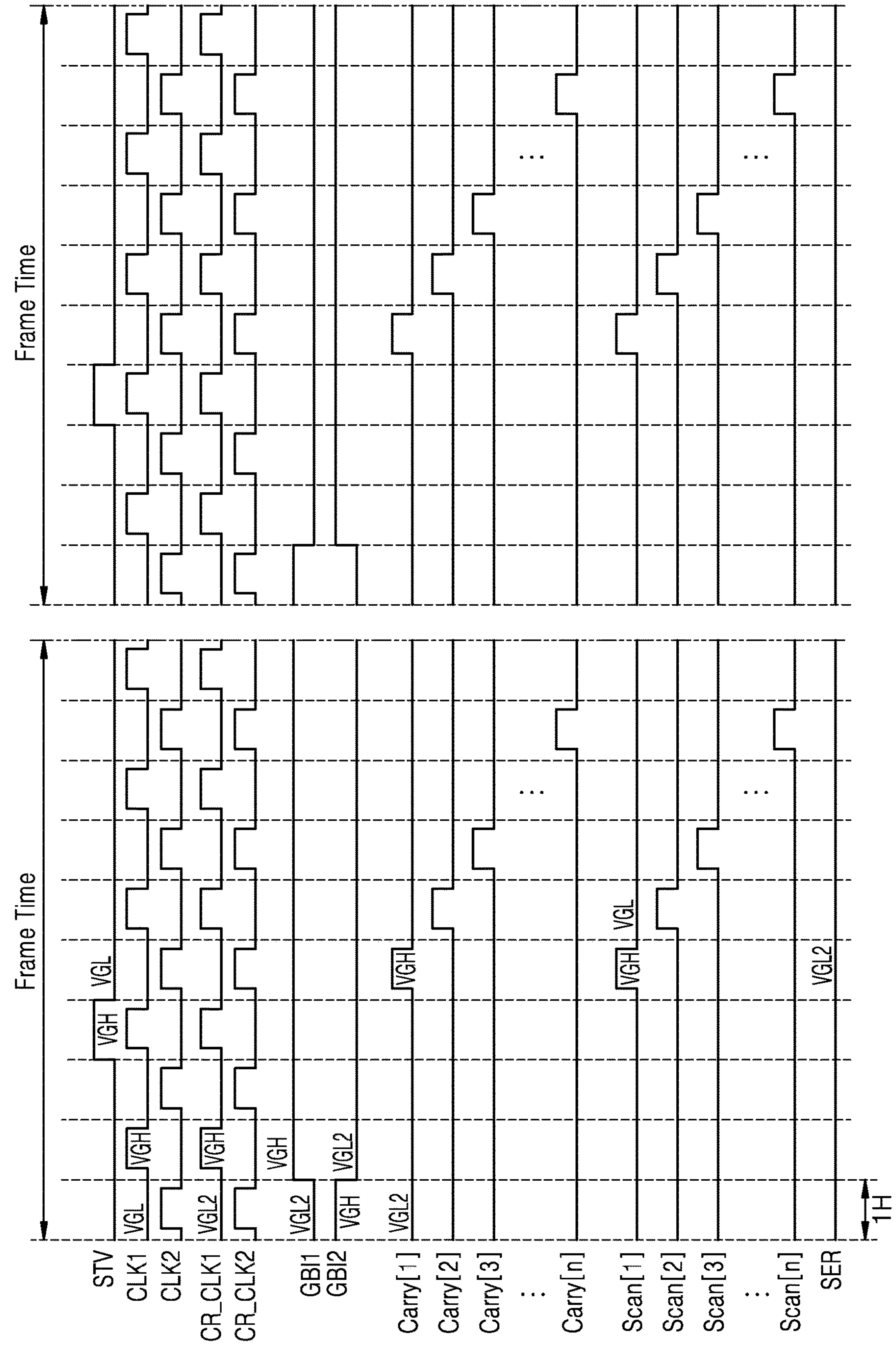
FIG. 3 is a timing diagram of input/output signals of the scan driver of FIG. 2.

FIG. 2 is a schematic view of the scan driver 130 according to some embodiments. FIG. 3 is a timing diagram of input/output signals of the scan driver 130.

Referring to FIG. 2, the scan driver 130 may include a plurality of first to n-th stages ST1 to STn. The number of stages provided to the scan driver 130 may be variously changed depending on the number of pixel rows provided to the pixel part 110.

The plurality of first to n-th stages ST1 to STn may be respectively connected to scan lines on corresponding rows, and configured to respectively supply scan signals to scan lines on the corresponding rows. The plurality of first to n-th stages ST1 to STn may respectively output scan signals, that is, first to n-th scan signals Scan[1], Scan[2], Scan[3], Scan[4], . . . , and Scan[n], in response to a start signal. As an example, the n-th stage STn may be configured to output an n-th scan signal Scan[n] to the n-th scan line. An external signal STV, which is a start signal controlling timing of the first scan signal Scan[1] may be supplied to the first stage ST1. Hereinafter, an on-voltage may denote a high-level voltage, and an off-voltage may denote a low-level voltage.

Each of the plurality of first to n-th stages ST1 to STn may include an input terminal IN, a scan clock terminal SCK, a first carry clock terminal CCK1, a second carry clock terminal CCK2, a first voltage input terminal V1, a second voltage input terminal V2, a third voltage input terminal V3, a fourth voltage input terminal V4, a fifth voltage input terminal V5, a sixth voltage input terminal V6, a first output terminal OUT1, and a second output terminal OUT2.

The input terminal IN may be configured to receive an external signal STV or a previous carry signal as a start signal. According to some embodiments, an external signal STV may be applied to the input terminal IN of the first stage ST1. A carry signal output from a previous stage may be applied to the input terminal IN of each of the second to n-th stages ST2 to STn except the first stage ST1. As an example, an (n−1)-th carry signal Carry[n−1] may be applied to the input terminal IN of the n-th stage, wherein the (n−1)-th carry signal Carry[n−1] is output from the (n−1)-th stage STn−1. As shown in FIG. 3, the first stage ST1 starts to be driven by the external signal STV of a high voltage, and may be configured to generate and output a scan signal.

The scan clock terminal SCK may be configured to receive a scan clock signal. The scan clock signal may include a first scan clock signal CLK1 and a second scan clock signal CLK2. The scan clock terminal SCK may be configured to receive the first scan clock signal CLK1 or the second scan clock signal CLK2. As shown in FIG. 3, the first scan clock signal CLK1 and the second scan clock signal CLK2 may each be a square-wave signal that repeats a first voltage VGH, which is a high voltage, and a second voltage VGL, which is a low voltage. The first scan clock signal CLK1 and the second scan clock signal CLK2 may be signals with the same wave form and a shifted phase. As an example, the second scan clock signal CLK2 may have the same waveform as that of the first scan clock signal CLK1, and be applied with a phase shifted (phase-delayed) by a preset interval (about a 1-horizontal period 1H).

The first scan clock signal CLK1 and the second scan clock signal CLK2 may be alternately applied to the first to n-th stages ST1 to STn. As an example, a second scan clock signal CLK2 may be applied to a scan clock terminal SCK of an odd-numbered stage, and a first scan clock signal CLK1 may be applied to a scan clock terminal SCK of an even-numbered stage.

A first carry clock signal CR_CLK1 or a second carry clock signal CR_CLK2 may be applied to a first carry clock terminal CCK1 and a second carry clock terminal CCK2. As shown in FIG. 3, the first carry clock signal CR_CLK1 and the second carry clock signal CR_CLK2 may each be a square-wave signal that repeats a first voltage VGH, which is a high voltage, and a third voltage VGL2, which is a low voltage. The third voltage VGL2 may be set to a voltage less than the second voltage VGL. The first carry clock signal CR_CLK1 and the second carry clock signal CR_CLK2 may be signals with the same waveform and a shifted phase. As an example, the second carry clock signal CR_CLK2 may have the same waveform as that of the first carry clock signal CR_CLK1, and be applied with a phase shifted (phase-delayed) by a preset interval (about a 1-horizontal period 1H).

Different carry clock signals may be respectively applied to the first carry clock terminal CCK1 and the second carry clock terminal CCK2. As an example, in an odd-numbered stage, the second carry clock signal CR_CLK2 may be applied to the first carry clock terminal CCK1, and the first carry clock signal CR_CLK1 may be applied to the second carry clock terminal CCK2. And, in an even-numbered stage, the first carry clock signal CR_CLK1 may be applied to the first carry clock terminal CCK1, and the second carry clock signal CR_CLK2 may be applied to the second carry clock terminal CCK2.

The first voltage input terminal V1 may be configured to receive the first voltage VGH, the second voltage input terminal V2 may be configured to receive the second voltage VGL, and the third voltage input terminal V3 may be configured to receive the third voltage VGL2. The fourth voltage input terminal V4 may be configured to receive a fourth voltage GBI1, and the fifth voltage input terminal V5 may be configured to receive a fifth voltage GBI2. The sixth voltage input terminal V6 may be configured to receive a sixth voltage SER.

According to some embodiments, as shown in FIG. 3, the fourth voltage GBI1 and the fifth voltage GBI2 may each be a signal in which the first voltage VGH and the third voltage VGL2 alternate at a preset interval (e.g., on a frame basis). As an example, in an odd-numbered frame, the fourth voltage GBI1 applied to each of the first to n-th stages ST1 to STn, may be the first voltage VGH, and the fifth voltage GBI2 applied to each of the first to n-th stages ST1 to STn, may be the third voltage VGL2. In an even-numbered frame, the fourth voltage GBI1 applied to each of the first to n-th stages ST1 to STn, may be the third voltage VGL2, and the fifth voltage GBI2 applied to each of the first to n-th stages ST1 to STn, may be the first voltage VGH. According to some embodiments, the fourth voltage GBI1 and the fifth voltage GBI2 may each be a signal that inverts the first voltage VGH and the third voltage VGL2 in units of n frames, or a signal that inverts the first voltage VGH and the third voltage VGL2 in units of a 1/n frame. Here, n is a natural number equal to or greater than 2.

The first voltage VGH, the second voltage VGL, and the third voltage VGL2 are global signals, and may be supplied from the controller 170 shown in FIG. 1 and/or a power supply unit and the like.

The sixth voltage SER may have a voltage level of the third voltage VGL2 while the scan driver 130 is driven. According to some embodiments, the sixth voltage SER may have a voltage level of the first voltage VGH for a preset period such that the scan driver 130 is not driven while the display apparatus starts up or switches from a sleep mode to an active mode.

The first output terminal OUT1 may be configured to output scan signals. A scan signal may be supplied to a pixel through its corresponding scan line. The second output terminal OUT2 may be configured to output carry signals. A carry signal may be supplied to the input terminal IN of a next stage.

A pulse width of the first to n-th scan signals Scan[1], Scan[2], Scan[3], Scan[4], . . . , and Scan[n] respectively output from the first to n-th stages ST1 to STn, may be about a 1 horizontal period 1H. The pulse width may be an on-voltage period (a high voltage period) of a scan signal. On-voltage periods of the first to n-th scan signals Scan[1], Scan[2], Scan[3], Scan[4], . . . , and Scan[n], may not overlap each other.

A pulse width of the first to n-th carry signals Carry[1], Carry[2], Carry[3], Carry[4], . . . , and Carry[n] respectively output from the first to n-th stages ST1 to STn, may be about a 1 horizontal period 1H. The pulse width may be an on-voltage period (a high voltage period) of a carry signal. On-voltage periods of the first to n-th carry signals Carry[1], Carry[2], Carry[3], Carry[4], . . . , and Carry[n], may not overlap each other.

Figure 4:
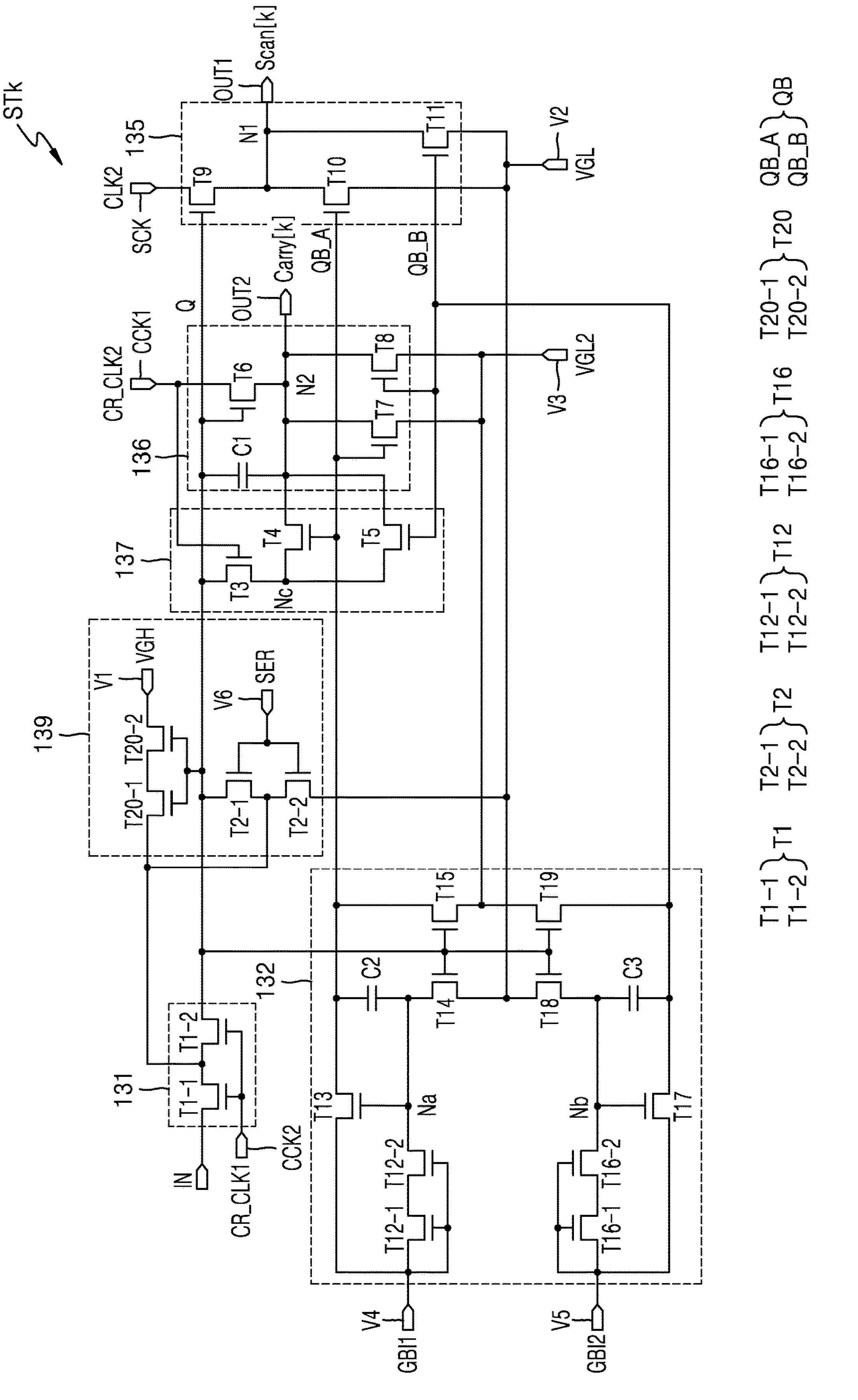
FIG. 4 is a circuit diagram of an example of a stage included in the scan driver of FIG. 2.
Figure 5:
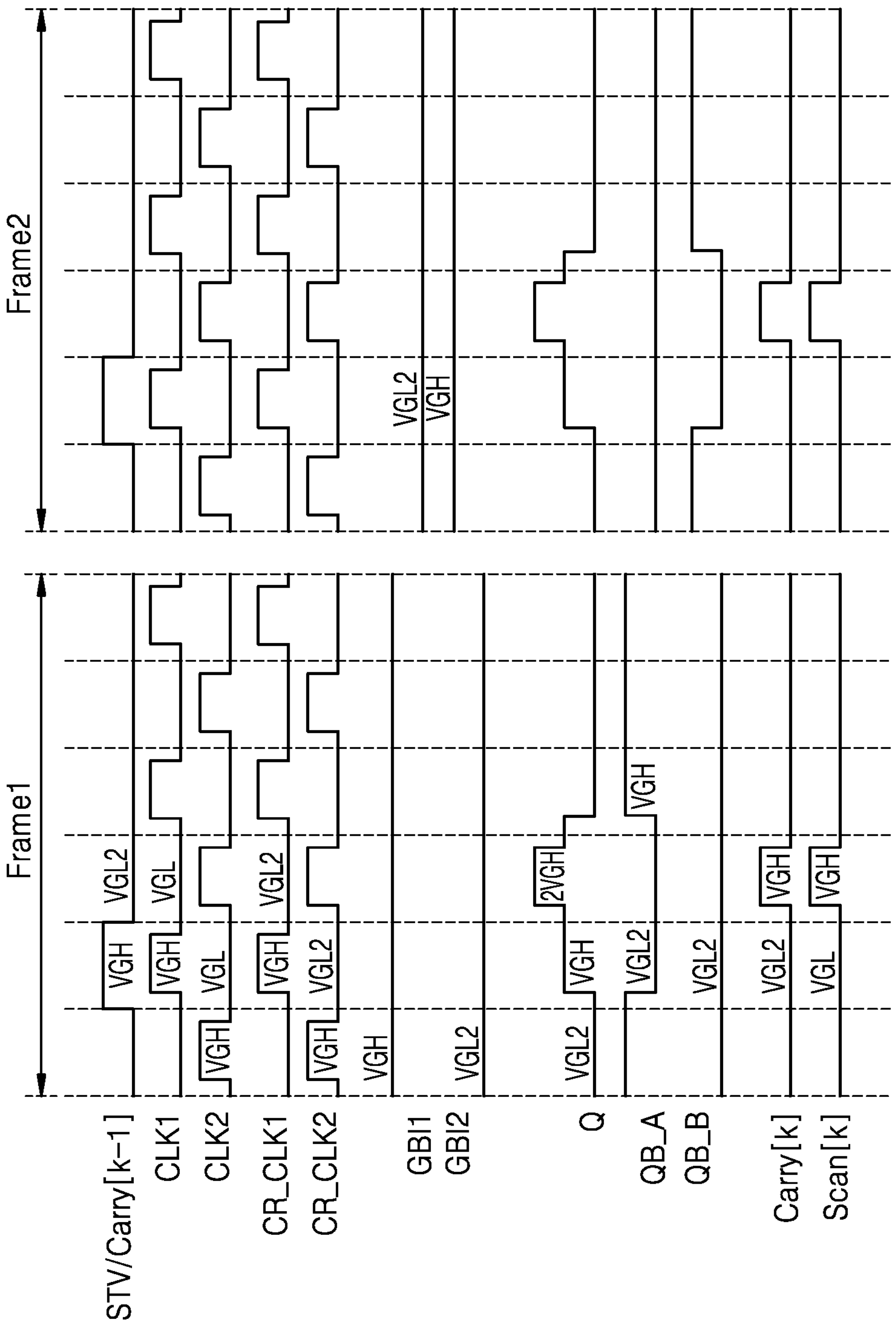
FIG. 5 is a timing diagram for explaining a method of driving the stage of FIG. 4.
Figure 6:
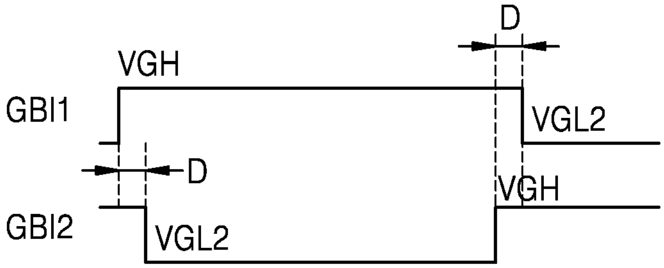
FIG. 6 is a view of an example of a voltage level of a fourth voltage GBI1 and a fifth voltage GBI2 according to an embodiment.

FIG. 4 is a circuit diagram of an example of a stage included in the scan driver 130 of FIG. 2. FIG. 5 is a timing diagram for explaining a method of driving the stage of FIG. 4. FIG. 6 is a view of an example of a voltage level of a fourth voltage GBI1 and a fifth voltage GBI2 according to some embodiments.

Each of the first to n-th stages ST1 to STn has a plurality of nodes. Hereinafter, some of the plurality of nodes are denoted by first and second output nodes N1 and N2, and first and second control nodes Q and QB. The second control node QB may include a (2-1)st control node QB_A and a (2-2)nd control node QB_B. Hereinafter, a k-th stage STk configured to output a k-th scan signal Scan[k] and a k-th carry signal Carry[k] to a k-th row of the pixel part 110, is described as an example. According to some embodiments, a plurality of transistors included in a circuit of each of the first to n-th stages ST1 to STn, may be N-type thin-film transistors. N-type thin-film transistors may be oxide thin-film transistors. According to some embodiments, a high voltage may be an on-voltage, and a low voltage may be an off-voltage.

A k-th stage STk (k is a natural number) may include a first node controller 131, a second node controller 132, a first output controller 135, a second output controller 136, and a first stabilizer 137. The k-th stage STk may further include a second stabilizer 139. Hereinafter, as an example, the case where the k-th stage is an odd-numbered stage, the second carry clock signal CR_CLK2 is applied to the first carry clock terminal CCK1, and the first carry clock signal CR_CLK1 is applied to the second carry clock terminal CCK2, is described.

The first node controller 131 may be connected between the input terminal IN and the first control node Q. The first node controller 131 may be configured to control a voltage of the first control node Q, based on a start signal (e.g., a signal STV or a previous carry signal) applied to the input terminal IN, and a first carry clock signal CR_CLK1 applied to the second carry clock terminal CCK2. The first node controller 131 may include a first transistor.

The first transistor T1 may include a (1-1)st transistor T1-1 and a (1-2)nd transistor T1-2 connected in series between the input terminal IN and the first control node Q. Gates of the (1-1)st transistor T1-1 and the (1-2)nd transistor T1-2 may be connected to the second carry clock terminal CCK2. When a first carry clock signal CR_CLK1 of a high voltage is applied, the (1-1)st transistor T1-1 and the (1-2)nd transistor T1-2 may be turned on and may set (charge) the first control node Q to a high voltage.

The second node controller 132 may be connected between the first control node Q and the second control node QB. The second node controller 132 may be configured to control the voltage of the second control node QB by inverting the voltage of the first control node Q and supplying the same to the second control node QB. The second node controller 132 may be configured to control the voltage of the second control node QB, based on the fourth voltage GBI1 applied to the fourth voltage input terminal V4, and the fifth voltage GBI2 applied to the fifth voltage input terminal V5. The second node controller 132 may include a twelfth transistor T12, a thirteenth transistor T13, a 14-th transistor T14, a 15-th transistor T15, a 16-th transistor T16, a 17-th transistor T17, an 18-th transistor T18, a 19-th transistor T19, a second capacitor C2, and a third capacitor C3.

The twelfth transistor T12 may include a (12-1)st transistor T12-1 and a (12-2)nd transistor T12-2 connected in series between a first node Na and the fourth voltage input terminal V4. Gates of the (12-1)st transistor T12-1 and the (12-2)nd transistor T12-2 may be connected to the fourth voltage input terminal V4.

The thirteenth transistor T13 may be connected between the (2-1)st control node QB_A and the fourth voltage input terminal V4. A gate of the thirteenth transistor T13 may be connected to the first node Na.

The 14-th transistor T14 may be connected between the first node Na and the second voltage input terminal V2. A gate of the 14-th transistor T14 may be connected to the first control node Q.

The 15-th transistor T15 may be connected between the (2-1)st control node QB_A and the third voltage input terminal V3. A gate of the 15-th transistor T15 may be connected to the first control node Q.

The 16-th transistor T16 may include a (16-1)st transistor T16-1 and a (16-2)nd transistor T16-2 connected in series between a second node Nb and the fifth voltage input terminal V5. Gates of the (16-1)st transistor T16-1 and the (16-2)nd transistor T16-2 may be connected to the fifth voltage input terminal V5.

The 17-th transistor T17 may be connected between the (2-2)nd control node QB_B and the fifth voltage input terminal V5. A gate of the 17-th transistor T17 may be connected to the second node Nb.

The 18-th transistor T18 may be connected between the second node Nb and the second voltage input terminal V2. A gate of the 18-th transistor T18 may be connected to the first control node Q.

The 19-th transistor T19 may be connected between the (2-2)nd control node QB_B and the third voltage input terminal V3. A gate of the 19-th transistor T19 may be connected to the first control node Q.

The second capacitor C2 may be connected between the (2-1)st control node QB_A and the first node Na. The third capacitor C3 may be connected between the (2-2)nd control node QB_B and the second node Nb. When the (2-1)st control node QB_A and the (2-2)nd control node QB_B are switched from a high level to a low level, the 13-th transistor T13 and the 17-th transistor T17 may be turned off fast by the second capacitor C2 and the third capacitor C3. Accordingly, because a current leakage from the first voltage (VGH) supply source to the second voltage (VGL) supply source and the third voltage (VGL2) supply source, may be reduced (prevented), a voltage drop of the second voltage VGL and the third voltage VGL2 may be reduced (prevented). Because a voltage drop of the second voltage VGL and the third voltage VGL2 is reduced (prevented), an issue that a voltage drop of a scan signal occurs as a stage is away from a voltage supply source, may be resolved.

As an example, in a first frame Frame1, the fourth voltage GBI1 of the first voltage VGH may be applied to the fourth voltage input terminal V4, and the fifth voltage GBI2 of the third voltage VGL2 may be applied to the fifth voltage input terminal V5.

When the first control node Q is switched from a low level to a high level, the (2-1)st control node QB_A may be switched from a high level to a low level, and the (2-2)nd control node QB_B may maintain a low level. Because the first control node Q is in a high-level state, the 14-th transistor T14, the 15-th transistor T15, the 18-th transistor T18, and the 19-th transistor T19 may be turned on. The (2-1)st control node QB_A and the (2-2)nd control node QB_B may each be set to the third voltage VGL2 by the 15-th transistor T15 and the 19-th transistor T19 that are turned on. In addition, because the first node Na and the second node Nb may each be set to the second voltage VGL by the 14-th transistor T14 and the 18-th transistor T18 that are turned on, the 13-th transistor T13 and the 17-th transistor may be turned off. In this case, because the first node Na is fast set to the second voltage VGL, the 13-th transistor T13 may be turned off fast by the second capacitor C2. The 16-th transistor T16 may be turned off by the fifth voltage GBI2.

When the first control node Q is switched from a high level to a low level, the (2-1)st control node QB_A may be switched from a low level to a high level, and the (2-2)nd control node QB_B may maintain a low level. Because the first control node Q is in a low-level state, the 14-th transistor T14, the 15-th transistor T15, the 18-th transistor T18, and the 19-th transistor T19 may be turned off. Because the twelfth transistor T12 and the thirteenth transistor T13 are turned on by the fourth voltage GBI1, the (2-1)st control node QB_A may become a high-level state. The 16-th transistor is turned off by the fifth voltage GBI2, the second node Nb may maintain a low-level state and the 17-th transistor T17 may be maintained turned off, and the (2-2)nd control node QB_B may maintain a low level state.

In a second frame Frame2, the fourth voltage GBI1 of the third voltage VGL2 may be applied to the fourth voltage input terminal V4, and the fifth voltage GBI2 of the first voltage VGH may be applied to the fifth voltage input terminal V5.

When the first control node Q is switched from a low level to a high level, the (2-2)nd control node QB_B may be switched from a high level to a low level, and the (2-1)st control node QB_A may maintain a low level. Because the first control node Q is in a high-level state, the 14-th transistor T14, the 15-th transistor T15, the 18-th transistor T18, and the 19-th transistor T19 may be turned on. The (2-1)st control node QB_A and the (2-2)nd control node QB_B may each be set to the third voltage VGL2 by the 15-th transistor T15 and the 19-th transistor T19 that are turned on. In addition, because the first node Na and the second node Nb may each be set to the second voltage VGL by the 14-th transistor T14 and the 18-th transistor T18 that are turned on, the 13-th transistor T13 and the 17-th transistor may be turned off. In this case, because the second node Nb is fast set to the second voltage VGL, the 17-th transistor T17 may be turned off fast by the third capacitor C3. The twelfth transistor T12 may be turned off by the fourth voltage GBI1.

When the first control node Q is switched from a high level to a low level, the (2-2)nd control node QB_B may be switched from a low level to a high level, and the (2-1)st control node QB_A may maintain a low level. Because the first control node Q is in a low-level state, the 14-th transistor T14, the 15-th transistor T15, the 18-th transistor T18, and the 19-th transistor T19 may be turned off. Because the 16-th transistor T16 and the 17-th transistor T17 are turned on by the fifth voltage GBI2, the (2-2)nd control node QB_B may become a high-level state. The twelfth transistor T12 is turned off by the fourth voltage GBI1, the first node Na may maintain a low-level state and the thirteenth transistor T13 may be maintained turned off, and the (2-1)st control node QB_A may maintain a low level state.

The first output controller 135 may be configured to output the second scan clock signal CLK2 or the second voltage VGL to the first output terminal OUT1 connected to the first output node N1, according to the voltages of the first control node Q and the second control node QB. The first output controller 135 may include the ninth transistor T9, the tenth transistor T10, and the eleventh transistor T11 connected between the scan clock terminal SCK and the second voltage input terminal V2.

The ninth transistor T9 may be connected between the scan clock terminal SCK and the first output terminal OUT1. A gate of the ninth transistor T9 may be connected to the first control node Q. The ninth transistor T9 may be turned on or turned off according to the voltage of the first control node Q. The ninth transistor T9 may be a pull-up transistor configured to output a high voltage. While the first control node Q is in a high-level state, the ninth transistor T9 may be turned on and may output the second scan clock signal CLK2 of a high voltage as a k-th scan signal Scan[k] of a high voltage through the first output terminal OUT1.

The tenth transistor T10 may be connected between the first output terminal OUT1 and the second voltage input terminal V2. A gate of the tenth transistor T10 may be connected to the (2-1)st control node QB_A. The tenth transistor T10 may be turned on or turned off according to the voltage of the (2-1)st control node QB_A. The tenth transistor T10 may be a pull-down transistor configured to output a low voltage. While the (2-1)st control node QB_A is in a high-level state, the tenth transistor T10 may be turned on and may output the second voltage VGL as a k-th scan signal Scan[k] of a low voltage through the first output terminal OUT1.

The eleventh transistor T11 may be connected between the first output terminal OUT1 and the second voltage input terminal V2. A gate of the eleventh transistor T11 may be connected to the (2-2)nd control node QB_B. The eleventh transistor T11 may be turned on or turned off according to the voltage of the (2-2)nd control node QB_B. The eleventh transistor T11 may be a pull-down transistor configured to output a low voltage. While the (2-2)nd control node QB_B is in a high-level state, the eleventh transistor T11 may be turned on and may output the second voltage VGL as a k-th scan signal Scan[k] of a low voltage through the first output terminal OUT1.

The second output controller 136 may be configured to output the second carry clock signal CR_CLK2 or the third voltage VGL2 to the second output terminal OUT2 connected to the second output node N2 according to the voltages of the first control node Q and the second control node QB. The second output controller 136 may include the sixth transistor T6, the seventh transistor T7, and the eighth transistor T8 connected between the first carry clock terminal CCK1 and the third voltage input terminal V3. The second output controller 136 may further include a first capacitor C1.

The sixth transistor T6 may be connected between the first carry clock terminal CCK1 and the second output terminal OUT2. A gate of the sixth transistor T6 may be connected to the first control node Q. The sixth transistor T6 may be turned on or turned off according to the voltage of the first control node Q. The sixth transistor T6 may be a pull-up transistor configured to output a high voltage. While the first control node Q is in a high-level state, the sixth transistor T6 may be turned on and may output the second carry clock signal CR_CLK2 of a high voltage as a k-th carry signal Carry[k] of a high voltage through the second output terminal OUT2.

The seventh transistor T7 may be connected between the second output terminal OUT2 and the third voltage input terminal V3. A gate of the seventh transistor T7 may be connected to the (2-1)st control node QB_A. The seventh transistor T7 may be turned on or turned off according to the voltage of the (2-1)st control node QB_A.

The seventh transistor T7 may be a pull-down transistor configured to output a low voltage. While the (2-1)st control node QB_A is in a high-level state, the seventh transistor T7 may be turned on and may output the third voltage VGL2 as a k-th carry signal Carry[k] of a low voltage through the second output terminal OUT2.

The eighth transistor T8 may be connected between the second output terminal OUT2 and the third voltage input terminal V3. A gate of the eighth transistor T8 may be connected to the (2-2)nd control node QB_B. The eighth transistor T8 may be turned on or turned off according to the voltage of the (2-2)nd control node QB_B. The eighth transistor T8 may be a pull-down transistor configured to output a low voltage. While the (2-2)nd control node QB_B is in a high-level state, the eighth transistor T8 may be turned on and may output the third voltage VGL2 as a k-th carry signal Carry[k] of a low voltage through the second output terminal OUT2.

The first capacitor C1 may be connected between the first control node Q and the second output terminal OUT2. The voltage of the first control node Q may be bootstrapped by the first capacitor C1.

The tenth transistor T10 and the eleventh transistor T11 may be alternately turned on according to alternate application of the fourth voltage GBI1 and the fifth voltage GBI2. As an example, in the case where the fourth voltage GBI1 and the fifth voltage GBI2 alternate on a frame basis, the tenth transistor T10 and the eleventh transistor T11 may be alternately turned on, on a frame basis.

The seventh transistor T7 and the eighth transistor T8 may be alternately turned on according to alternate application of the fourth voltage GBI1 and the fifth voltage GBI2. As an example, in the case where the fourth voltage GBI1 and the fifth voltage GBI2 alternate on a frame basis, the seventh transistor T7 and the eighth transistor T8 may be alternately turned on, on a frame basis.

In the case where a single pull-down transistor is used to output a carry signal and a scan signal of a low level for a long time, a threshold voltage shift due to a long time on-bias of the transistor may occur. According to some embodiments, because the voltage levels of the fourth voltage GBI1 and the fifth voltage GBI2 are changed on a frame basis, the tenth transistor T10 and the eleventh transistor T11 may be alternately turned on and turned off on a frame basis, and the seventh transistor T7 and the eighth transistor T8 may be alternately turned on and turned off on a frame basis. Accordingly, a change in the threshold voltages of the tenth transistor T10 and the eleventh transistor T11, and the seventh transistor T7 and the eighth transistor T8 may be reduced or prevented.

The first stabilizer 137 may include the third transistor T3, the fourth transistor T4, and the fifth transistor T5.

The third transistor T3 may be connected between the first control node Q and a third node Nc. A gate of the third transistor T3 may be connected to the first carry clock terminal CCK1.

The fourth transistor T4 may be connected between the third node Nc and the second output terminal OUT2. A gate of the fourth transistor T4 may be connected to the (2-1)st control node QB_A.

The fifth transistor T5 may be connected between the third node Nc and the second output terminal OUT2. A gate of the fifth transistor T5 may be connected to the (2-2)nd control node QB_B.

While the first control node Q is in a low-level state, when a second scan clock signal CLK2 of a high voltage is supplied to the scan clock terminal SCK, the voltage of the first control node Q rises momentarily, and the 14-th transistor T14 and the 15-th transistor T15 are turned on for a short period, and a short circuit occurs between a power applying the first voltage VGH and a power applying the second voltage VGL/third voltage VGL2, and thus, a leakage current may occur.

According to some embodiments, while the first control node Q is in a low-level state, and the (2-1)st control node QB_A or the (2-2)nd control node QB_B is in a high-level state, a second scan clock signal CLK2 of a high voltage may be supplied to the scan clock terminal SCK. When the second output node N2 is in a low-level state, the first control node Q may be electrically connected to the third node Nc and the second output terminal OUT2 by the third transistor T3, the fourth transistor T4, and the fifth transistor T5. Accordingly, because the voltage level of the first control node Q is maintained at a low-level state, the voltage of the first control node Q may be prevented from rising momentarily.

As an example, when the first control node Q is in a low-level state, and a second scan clock signal CLK2 of a high voltage is supplied to the scan clock terminal SCK, the third transistor T3 may be turned on by a second carry clock signal CR_CLK2 of a high voltage applied to the first carry clock terminal CCK1. In this case, when the (2-1)st control node QB_A is in a high-level state, the fourth transistor T4 and the seventh transistor T7 may be turned on. The second output node N2 may become a low-level state by the third voltage VGL2 through the seventh transistor T7 that is turned on, and the third node Nc may become a low-level state equal to that of the second output node N2 through the fourth transistor T4 that is turned on. Accordingly, the third transistor T3 that is turned on may maintain the voltage level of the first control node Q at the low-level state of the third node Nc. Similarly, when the (2-2)nd control node QB_B is in a high-level state, the fifth transistor T5 and the eighth transistor T8 may be turned on. The second output node N2 may become a low-level state by the third voltage VGL2 through the eighth transistor T8 that is turned on, and the third node Nc may become a low-level state equal to that of the second output node N2 through the fifth transistor T5 that is turned on. Accordingly, the third transistor T3 that is turned on may maintain the voltage level of the first control node Q at the low-level state of the third node Nc.

According to some embodiments, while the first control node Q is in a low-level state, and the second control node QB is in a high-level state, the voltage level of the first control node Q may be maintained at a low level by the first stabilizer 137, and thus, a leakage current may be prevented.

The second stabilizer 139 may include a second transistor and a 20-th transistor T20.

The second transistor may include a (2-1)st transistor T2-1 and a (2-2)nd transistor T2-2 connected in series between the first control node Q and the second voltage input terminal V2. Gates of the (2-1)st transistor T2-1 and the (2-2)nd transistor T2-2 may be connected to the sixth voltage input terminal V6. When the display apparatus starts up or switches from a sleep mode to an active mode, the second transistor T2 may be turned on by the sixth voltage SER of the first voltage VGH and may maintain a low-level state of the first control node Q, thereby allowing the scan driver 130 not to be driven. While the scan driver 130 is driven, the sixth voltage SER is supplied as the third voltage VGL2, the second transistor T2 may be turned off.

The 20-th transistor T20 may include a (20-1)st transistor T20-1 and a (20-2)nd transistor T20-2 connected in series between an intermediate node (a common electrode) of the (2-1)st transistor T2-1 and the (2-2)nd transistor T2-2, an intermediate node (a common electrode) of the (1-1)st transistor T1-1 and the (1-2)nd transistor T1-2, and the first voltage input terminal V1. Gates of the (20-1)st transistor T20-1 and the (20-2)nd transistor T20-2 may be connected to the first control node Q. Because the 20-th transistor T20 is turned on while the first control node Q is in a high-level and maintains an intermediate node of the (2-1)st transistor T2-1 and the (2-2)nd transistor T2-2, and an intermediate node of the (1-1)st transistor T1-1 and the (1-2)nd transistor T1-2 at a high-level state, a voltage drop due to a current leakage of the first control node Q may be prevented.

In FIG. 3, a voltage-level switching timing of the fourth voltage GBI1 coincides with a voltage-level switching timing of the fifth voltage GBI2. According to some embodiments, as shown in FIG. 6, there may be a section D in which a high-voltage section of the fourth voltage GBI1 overlaps a high-voltage section of the fifth voltage GBI2. In a timing at which the voltage levels of the fourth voltage GBI1 and the fifth voltage GBI2 are switched, the first control node Q may be in a low-level state, and one of the (2-1)st control node QB_A and the (2-2)nd control node QB_B may be in a high-level state, and the other may be in a low-level state, as shown in FIG. 3.

As an example, when a timing at which the fourth voltage GBI1 is switched from a high level to a low level is faster than a timing at which the fifth voltage GBI2 is switched from a low level to a high level, and/or a timing at which the fourth voltage GBI1 is switched from a low level to a high level is slower than a timing at which the fifth voltage GBI2 is switched from a high level to a low level, the tenth transistor T10 and the eleventh transistor T11 of the first output controller 135 may be simultaneously turned off in the section where the low voltage of the fourth voltage GBI1 overlaps the low voltage of the fifth voltage GBI2, and a scan signal may be erroneously output.

In contrast, when a timing at which the fourth voltage GBI1 is switched from a high level to a low level is slower than a timing at which the fifth voltage GBI2 is switched from a low level to a high level, and/or a timing at which the fourth voltage GBI1 is switched from a low level to a high level is faster than a timing at which the fifth voltage GBI2 is switched from a high level to a low level, the tenth transistor T10 and the eleventh transistor T11 of the first output controller 135 may be simultaneously turned on in the section where the high voltage of the fourth voltage GBI1 overlaps the high voltage of the fifth voltage GBI2. In this case, because a scan signal of a low voltage is output through the tenth transistor T10 and the eleventh transistor T11, there is no erroneous output issue of a scan signal.

Figure 7:
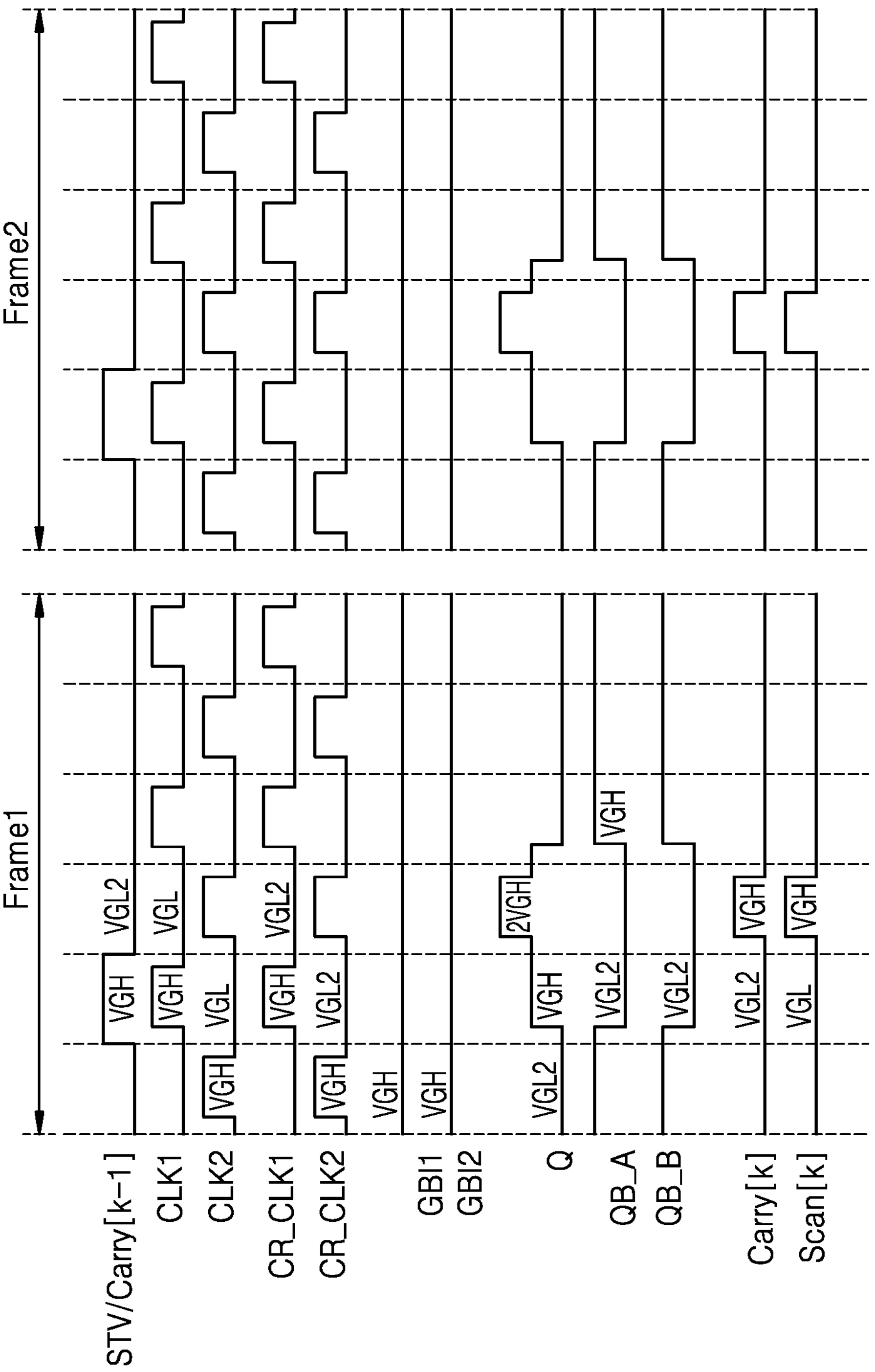
FIG. 7 is a timing diagram for explaining a method of driving a scan driver, according to another embodiment.

FIG. 7 is a timing diagram for explaining a method of driving the scan driver 130, according to some embodiments.

The timing diagram of FIG. 7 is different from the timing diagram of FIG. 5 in that both the fourth voltage GBI1 and the fifth voltage GBI2 are high voltages in odd-numbered frames and even-numbered frames, and changes in the voltage levels of the (2-1)st control node QB_A and the (2-2)nd control node QB_B are the same. Timings of the other signals are the same.

According to driving of the scan driver 130 in the timing diagram of FIG. 7, the tenth transistor T10 and the eleventh transistor T11 of the first output controller 135 may be simultaneously turned on, and the seventh transistor T7 and the eighth transistor T8 of the second output controller 136 may be simultaneously turned on.

While the scan driver 130 is driven according to the timing diagram of FIG. 5, a threshold voltage shift (for example, a negative shift) of the seventh transistor T7, the eighth transistor T8, the tenth transistor T10, and the eleventh transistor T11 may occur. According to some embodiments, because the scan driver 130 is driven according to the timing diagram of FIG. 7 for a preset time while driven according to the timing diagram of FIG. 5, the threshold voltage shift of the seventh transistor T7, the eighth transistor T8, the tenth transistor T10, and the eleventh transistor T11 may be restored. Then, the scan driver 130 may be driven according to the timing diagram of FIG. 5 again.

Though the above embodiments have been described by using an odd-numbered stage as an example, the embodiments are equally applicable to an even-numbered stage. In an even-numbered stage, a first scan clock signal CLK1 may be applied to the scan clock terminal SCK, a first carry clock signal CR_CLK1 may be applied to the first carry clock terminal CCK1, and a second carry clock signal CR_CLK2 may be applied to the second carry clock terminal CCK2.

Figure 8:
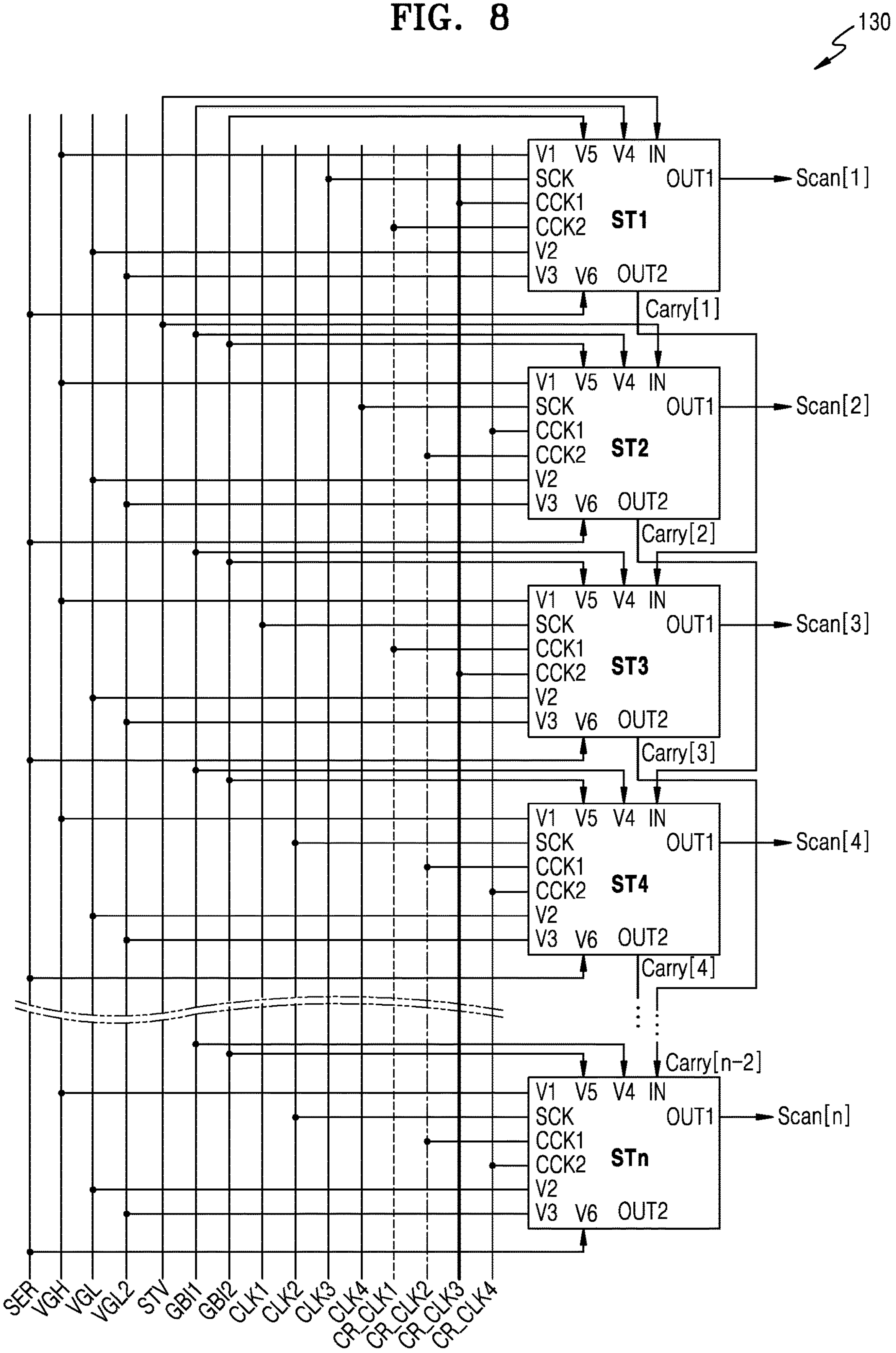
FIG. 8 is a schematic view of a scan driver according to an embodiment.
Figure 9:
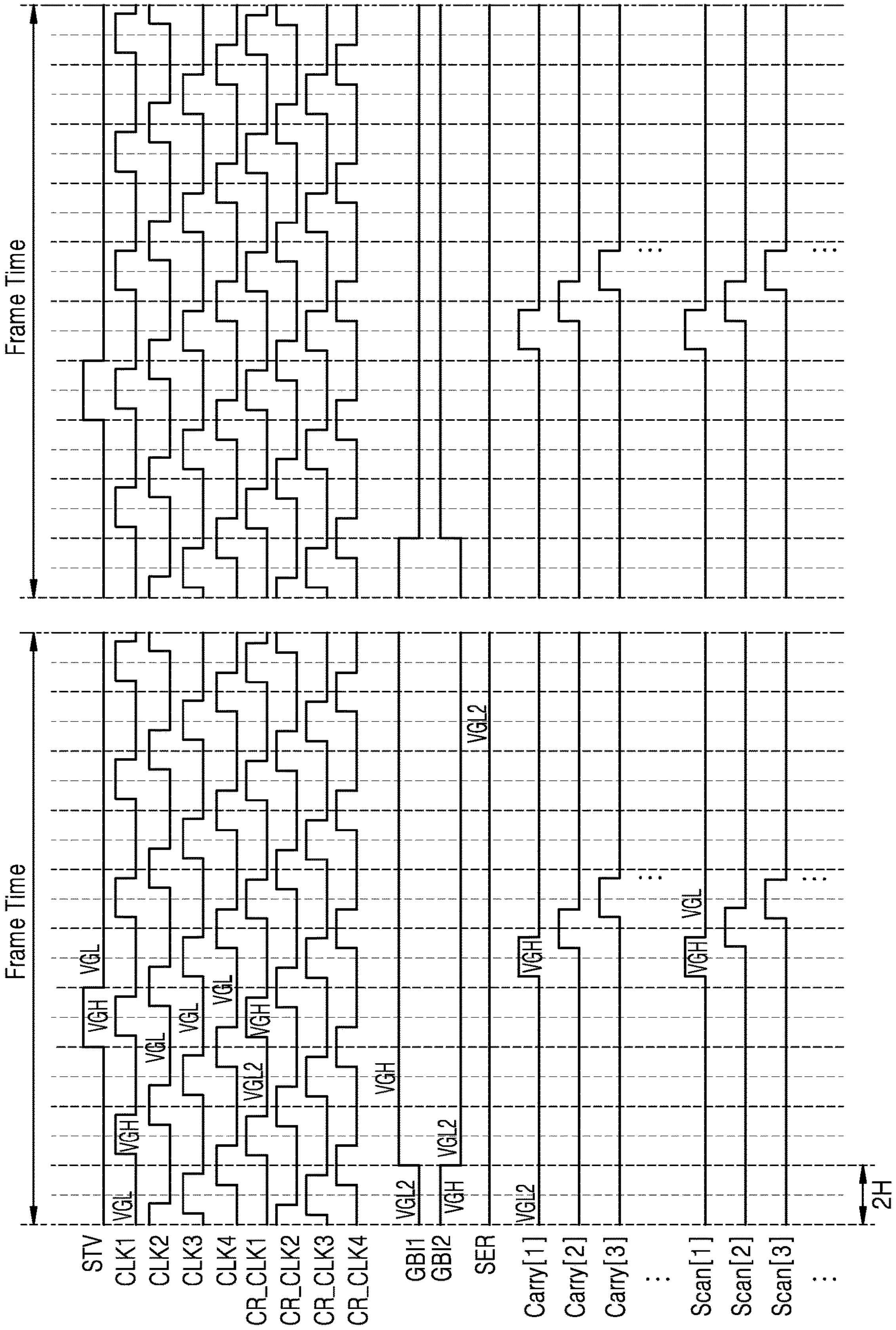
FIG. 9 is a timing diagram of input/output signals of the scan driver of FIG. 8.
Figure 10:
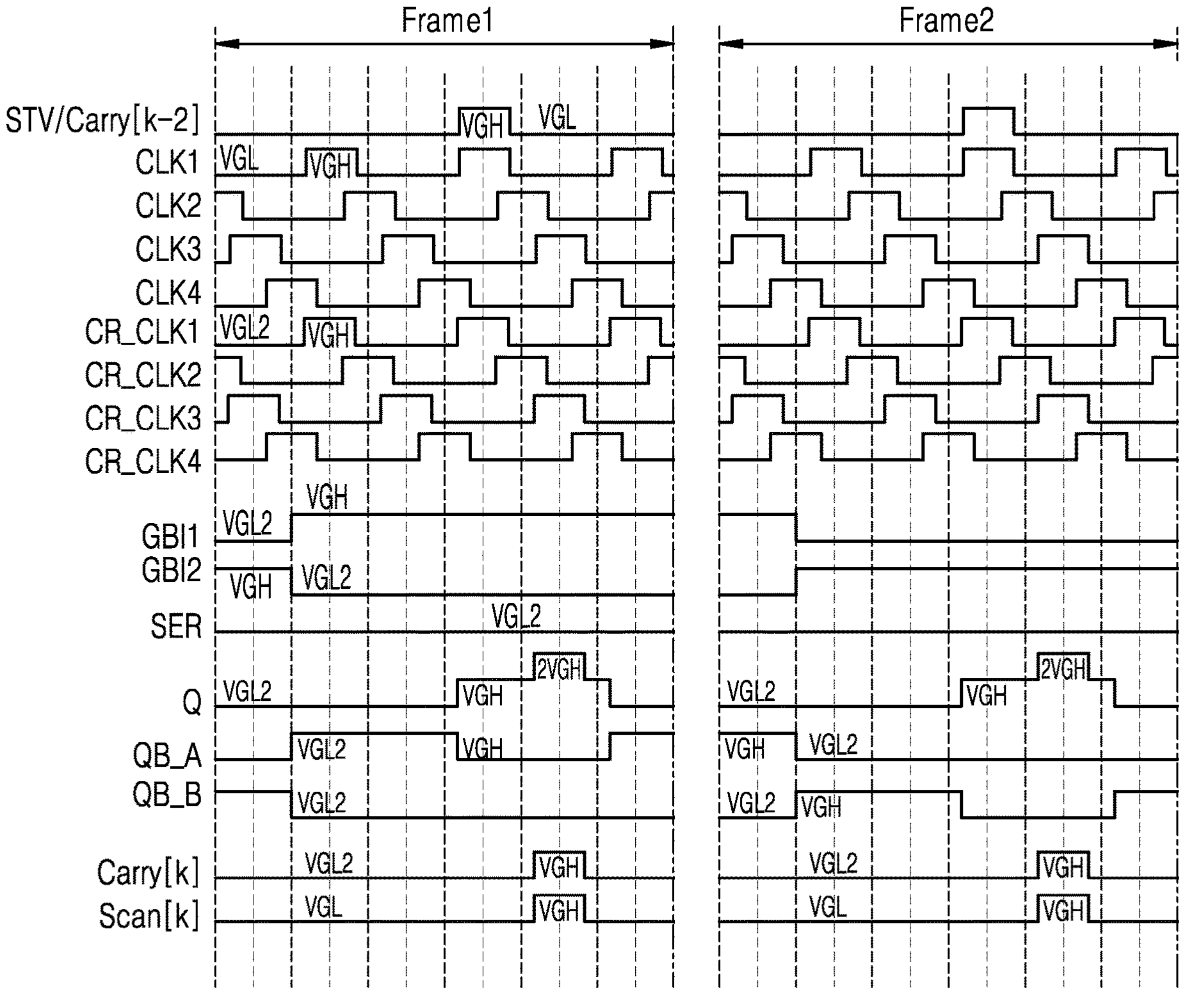
FIG. 10 is a timing diagram for explaining a method of driving a stage of FIG. 8.

FIG. 8 is a schematic view of the scan driver 130 according to some embodiments. FIG. 9 is a timing diagram of input/output signals of the scan driver 130 of FIG. 8. FIG. 10 is a timing diagram for explaining a method of driving a stage of FIG. 8. A circuit of each stage of the scan driver 130 shown in FIG. 8 is the same as that of FIG. 4.

The embodiments shown with respect to FIG. 8 are different from the embodiments shown with respect to FIG. 2 in the number of scan clock signals and carry clock signals applied to the scan driver 130 and signals applied to the input terminal IN. The driving of the scan driver 130 is the same. Hereinafter, differences are mainly described.

According to some embodiments, one of four signals including first to fourth scan clock signals CLK1 to CLK4 may be applied to a scan clock terminal SCK of each of the first to n-th stages ST1 to STn, and one of first to fourth carry clock signals CR_CLK1 to CR_CLK4 may be applied to the first carry clock terminal CCK1 and the second carry clock terminal CCK2.

The first to fourth scan clock signals CLK1 to CLK4, and the first to fourth carry clock signals CR_CLK1 to CR_CLK4 may be set as square-wave signals repeating a high voltage and a low voltage. Here, a high-voltage period (an on-voltage period) may be set less than a low-voltage period (an off-voltage period). A high-voltage period corresponds to a pulse width of a scan signal and may be variously set according to a circuit structure of a pixel PX. The four signals including the first to fourth scan clock signals CLK1 to CLK4 may have the same waveform and be set as signals with a shifted phase. The first to fourth scan clock signals CLK1 to CLK4 may be sequentially phase-shifted such that on-voltages partially overlap each other, and applied to the scan driver 130. The first to fourth carry clock signals CR_CLK1 to CR_CLK4 may be sequentially phase-shifted such that on-voltages partially overlap each other, and applied to the scan driver 130.

In each of the first to n-th stages ST1 to STn, a waveform of a scan clock signal applied to the scan clock terminal SCK may be the same as a waveform of a carry clock signal applied to the first carry clock terminal CCK1, and an on-voltage period and an off-voltage period of a carry clock signal applied to the second carry clock terminal CCK2 may respectively correspond to an off-voltage period and an on-voltage period of a carry clock signal applied to the first carry clock terminal CCK1.

As an example, as shown in FIG. 8, in odd-numbered stages, a third scan clock signal CLK3 and a first scan clock signal CLK1 may be alternately applied to the scan clock terminal SCK, and a third carry clock signal CR_CLK3 and a first carry clock signal CR_CLK1 may be alternately applied to the first carry clock terminal CCK1 and the second carry clock terminal CCK2. In even-numbered stages, a fourth scan clock signal CLK4 and a second scan clock signal CLK2 may be alternately applied to the scan clock terminal SCK, and a fourth carry clock signal CR_CLK4 and a second carry clock signal CR_CLK2 may be alternately applied to the first carry clock terminal CCK1 and the second carry clock terminal CCK2.

An external signal STV as a start signal may be applied to an input terminal IN of the first stage ST1 and the second stage ST2. A carry signal output from a previous stage may be applied to an input terminal IN of each of the third to n-th stages ST3 to STn except the first stage ST1 and the second stage ST2. Here, the previous stage may be a stage before two stages. As an example, as shown in FIG. 10, a (k−2)nd carry signal Carry[k−2] output from a (k−2)nd stage STk−2 may be applied to an input terminal IN of a k-th stage STk.

At least one dummy stage may be further provided to the rear end of the last n-th stage STn. As an example, two dummy stages may be provided to the rear end of the last n-th stage STn, and carry signals of the two previous stages may be applied to input terminals of the dummy stages. The dummy stage may not be connected to a scan line. According to some embodiments, the dummy stage may be connected to a dummy scan line, but the dummy scan line is connected to a dummy pixel that does not display images, and the dummy stage is not used in displaying images. According to some embodiments, one dummy stage may be provided to a front end of the first stage ST1, and a carry signal output from the dummy stage may be applied as a start signal to the input terminal IN of the second stage ST2. An external signal STV may be applied to an input terminal of the dummy stage.

A pulse width of first to n-th scan signals Scan[1], Scan[2], Scan[3], Scan[4], . . . , and Scan[n] output from the first to n-th stages ST1 to STn may be about a 2-horizontal period 2H. On-voltage periods of adjacent scan signals may partially overlap each other. As an example, a second scan signal Scan[2] output from the second stage ST2 may be shifted by about a 1-horizontal period 1H from a first scan signal Scan[1] output from the first stage ST1, and thus, may overlap about a 1-horizontal period 1H.

The first to n-th scan signals Scan[1], Scan[2], Scan[3], Scan[4], . . . , and Scan[n] output from the first to n-th stages ST1 to STn may overlap a section that is boosted by the first capacitor C1 while the first control node Q is in a high-level state.

A pulse width of the first to n-th carry signals Carry[1], Carry[2], Carry[3], Carry[4], . . . , and Carry[n] respectively output from the first to n-th stages ST1 to STn, may be about a 2 horizontal period 2H. On-voltage periods of adjacent carry signals may partially overlap each other. As an example, a second carry signal Carry[2] output from the second stage ST2 may be shifted by about a 1-horizontal period 1H from a first carry signal Carry[1] output from the first stage ST1, and thus, may overlap by about a 1-horizontal period 1H with the first carry signal Carry[1].

The first to n-th carry signals Carry[1], Carry[2], Carry[3], Carry[4], . . . , and Carry[n] respectively output from the first to n-th stages ST1 to STn, may overlap a section that is boosted by the first capacitor C1 while the first control node Q is in a high-level state.

Figure 11:
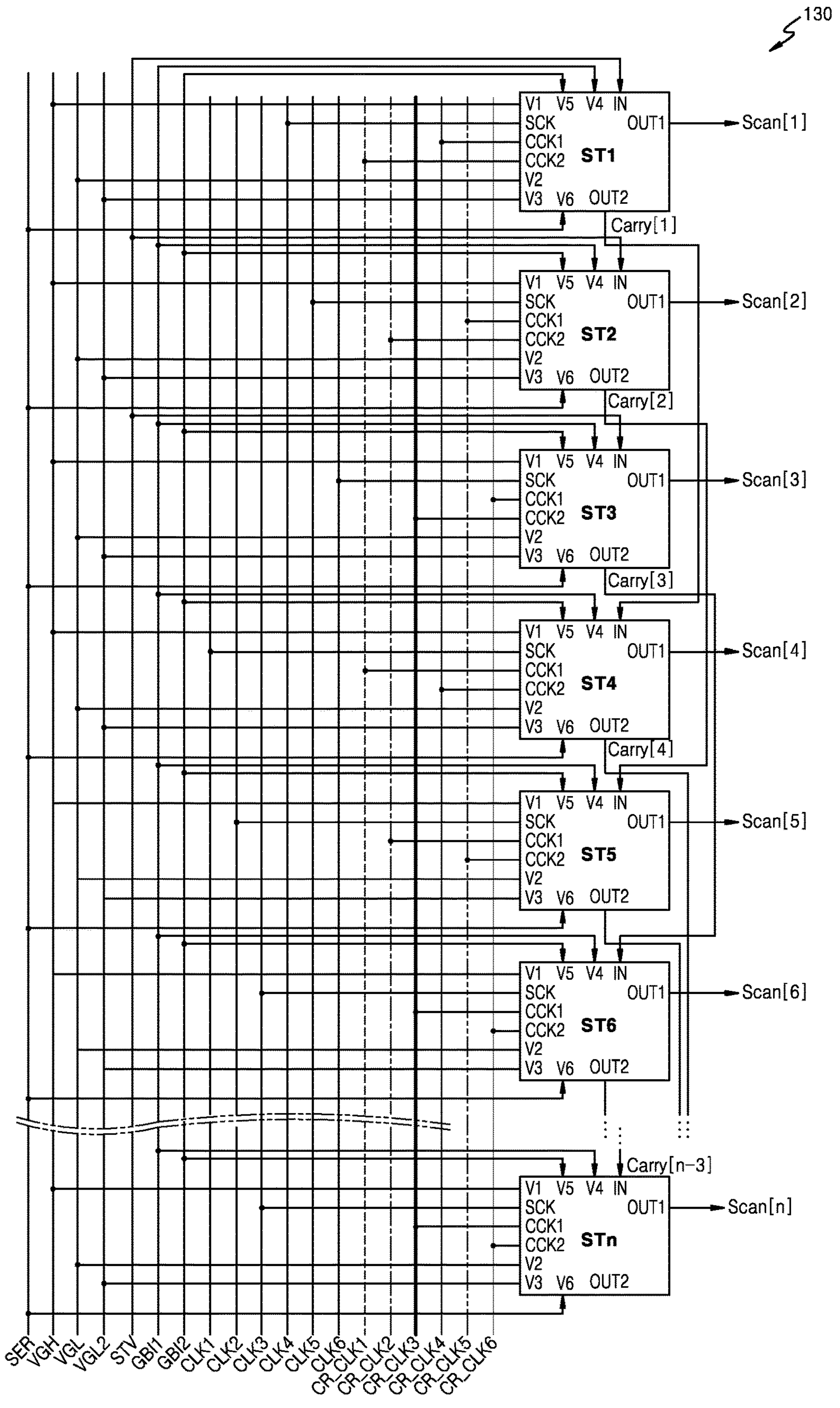
FIG. 11 is a schematic view of a scan driver according to an embodiment.
Figure 12:
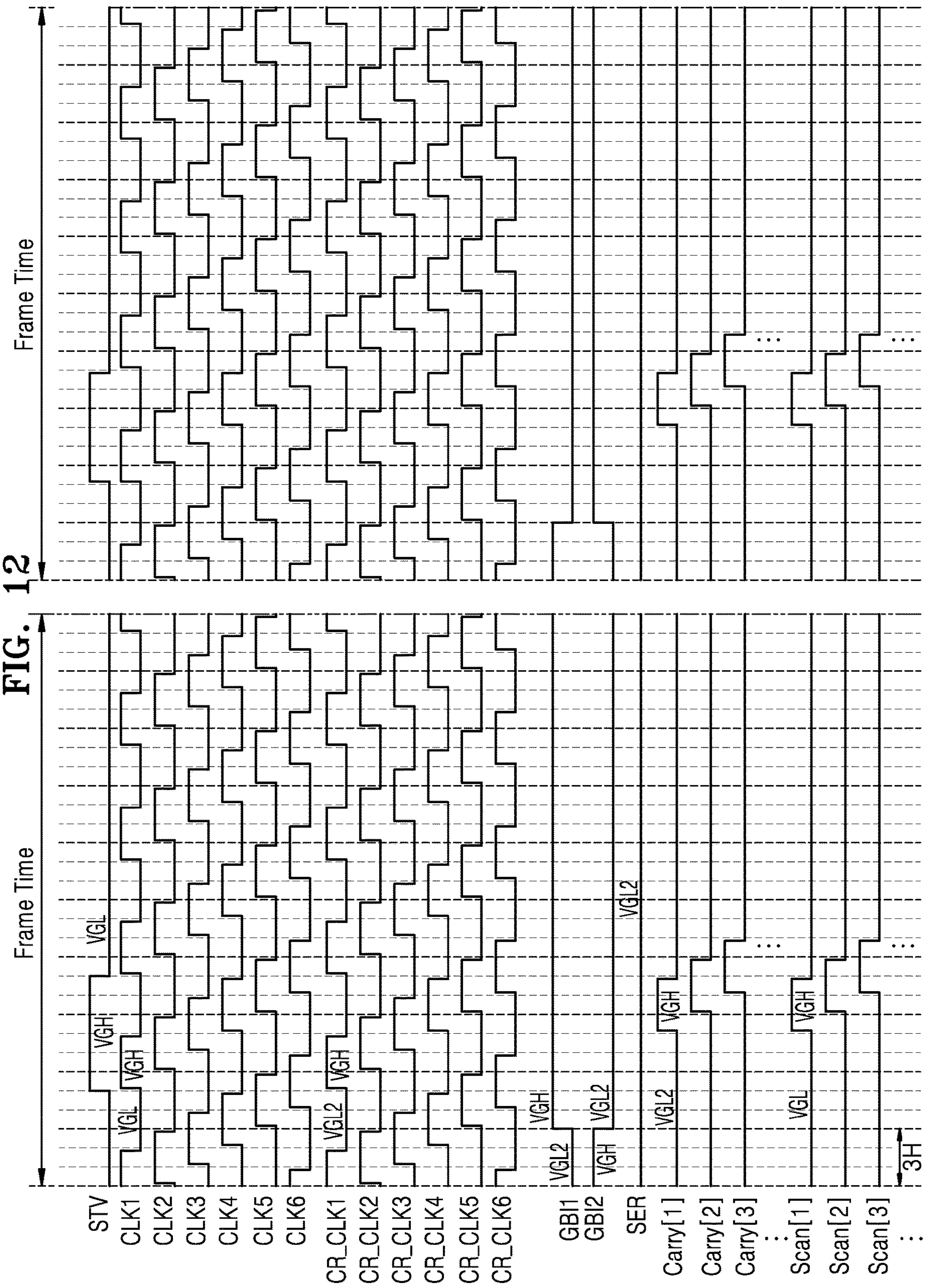
FIG. 12 is a timing diagram of input/output signals of the scan driver of FIG. 11.
Figure 13:
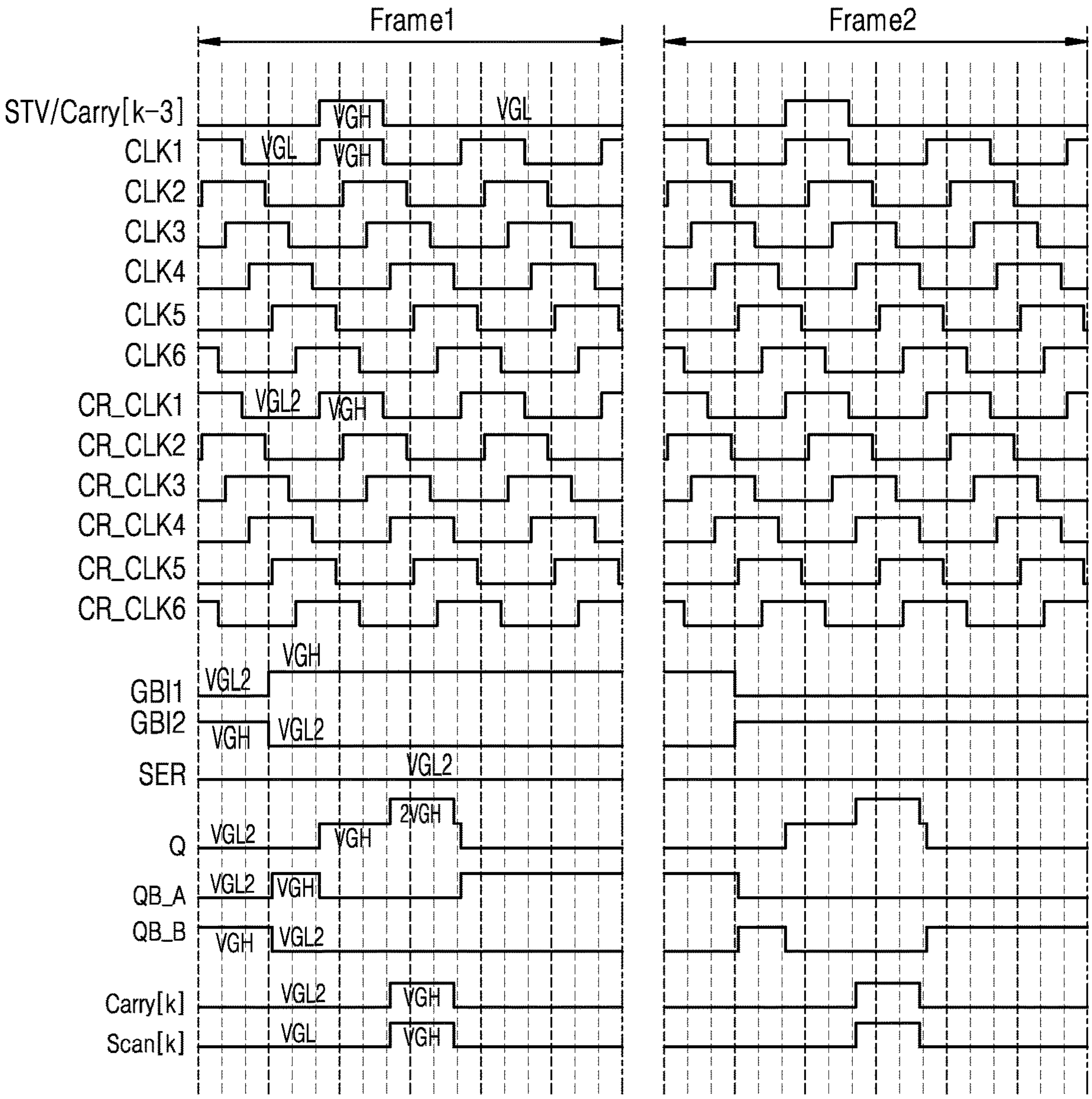
FIG. 13 is a timing diagram for explaining a method of driving a stage of FIG. 11.

FIG. 11 is a schematic view of the scan driver 130 according to some embodiments. FIG. 12 is a timing diagram of input/output signals of the scan driver 130 of FIG. 11. FIG. 13 is a timing diagram for explaining a method of driving a stage of FIG. 11. A circuit of each stage of the scan driver 130 shown in FIG. 11 is the same as that of FIG. 4.

The embodiments shown with respect to FIG. 11 are different from the embodiments shown with respect to FIGS. 2 and 8 in terms of the number of scan clock signals and carry clock signals applied to the scan driver 130 and signals applied to the input terminal IN. The driving of the scan driver 130 is the same. Hereinafter, differences are mainly described.

According to some embodiments, one of six signals including first to sixth scan clock signals CLK1 to CLK6 may be applied to a scan clock terminal SCK of each of the first to n-th stages ST1 to STn, and one of first to sixth carry clock signals CR_CLK1 to CR_CLK6 may be applied to the first carry clock terminal CCK1 and the second carry clock terminal CCK2.

The first to sixth scan clock signals CLK1 to CLK6, and the first to sixth carry clock signals CR_CLK1 to CR_CLK6 may be set as square-wave signals repeating a high voltage and a low voltage. Here, a high-voltage period (an on-voltage period) may be set less than a low-voltage period (an off-voltage period). The six signals including the first to sixth scan clock signals CLK1 to CLK6 may have the same waveform and be set as signals with a shifted phase. The first to sixth scan clock signals CLK1 to CLK6 may be sequentially phase-shifted such that on-voltages partially overlap each other, and applied to the scan driver 130. The first to sixth carry clock signals CR_CLK1 to CR_CLK6 may be sequentially phase-shifted such that on-voltages partially overlap each other, and applied to the scan driver 130.

In each of the first to n-th stages ST1 to STn, a waveform of a scan clock signal applied to the scan clock terminal SCK may be the same as a waveform of a carry clock signal applied to the first carry clock terminal CCK1, and an on-voltage period and an off-voltage period of a carry clock signal applied to the second carry clock terminal CCK2 may respectively correspond to an off-voltage period and an on-voltage period of a carry clock signal applied to the first carry clock terminal CCK1.

As an example, as shown in FIG. 11, a second scan clock signal CLK2, a fourth scan clock signal CLK4, and a sixth scan clock signal CLK6 may be alternately applied to scan clock terminals SCK of odd-numbered stages. A second carry clock signal CR_CLK2, a fourth carry clock signal CR_CLK4, and a sixth carry clock signal CR_CLK6 may be alternately applied to the first carry clock terminals CCK1 of odd-numbered stages. A first carry clock signal CR_CLK1, a third carry clock signal CR_CLK3, and a fifth carry clock signal CR_CLK5 may be alternately applied to the second carry clock terminals CCK2 of odd-numbered stages.

A first scan clock signal CLK1, a third scan clock signal CLK3, and a fifth scan clock signal CLK5 may be alternately applied to the scan clock terminals SCK of the even-numbered stages. A first carry clock signal CR_CLK1, a third carry clock signal CR_CLK3, and a fifth carry clock signal CR_CLK5 may be alternately applied to the first carry clock terminals CCK1 of the even numbered stages. A second carry clock signal CR_CLK2, a fourth carry clock signal CR_CLK4, and a sixth carry clock signal CR_CLK6 may be alternately applied to the second carry clock terminals CCK2 of the even-numbered stages.

An external signal STV as a start signal may be applied to the first to third stages ST1, ST2, and ST3, and a carry signal output from a previous stage may be applied to an input terminal IN of each of the fourth to n-th stages ST4 to STn. Here, the previous stage may be a stage before three stages. As an example, as shown in FIG. 13, a (k−3)nd carry signal Carry[k−3] output from a (k−3)nd stage STk−3 may be applied to an input terminal IN of a k-th stage STk.

At least one dummy stage may be further provided to the rear end of the last n-th stage STn. As an example, three dummy stages may be further provided to the rear end of the last n-th stage STn, and carry signals output from the three previous stages may be applied to each input terminal of the dummy stages. According to some embodiments, two dummy stages may be provided to the front end of the first stage ST1, and a carry signal output from the dummy stage may be applied to the input terminal IN of the second stage ST2, and the input terminal IN of the third stage ST3. An external signal STV may be applied to input terminals of the dummy stage.

A pulse width of first to n-th scan signals Scan[1], Scan[2], Scan[3], Scan[4], . . . , and Scan[n] output from the first to n-th stages ST1 to STn may be about a 3-horizontal period 3H. On-voltage periods of adjacent scan signals may partially overlap each other. As an example, a second scan signal Scan[2] output from the second stage ST2 may be shifted by about a 1-horizontal period 1H from a first scan signal Scan[1] output from the first stage ST1, and thus, may overlap by about a 2-horizontal period 2H with the first scan signal Scan[1].

The first to n-th scan signals Scan[1], Scan[2], Scan[3], Scan[4], . . . , and Scan[n] output from the first to n-th stages ST1 to STn may overlap a section that is boosted by the first capacitor C1 while the first control node Q is in a high-level state. The first to third scan signals Scan[1], Scan[2], and Scan[3] output from the first to third stages ST1, ST2, and ST3 may partially overlap a second half of an external signal STV, which is a start signal. Fourth to n-th scan signals Scan[4] to Scan[n] output from the fourth to n-th stages ST4 to STn do not overlap the previous carry signal, which is a start signal.

A pulse width of the first to n-th carry signals Carry[1], Carry[2], Carry[3], Carry[4], . . . , and Carry[n] respectively output from the first to n-th stages ST1 to STn, may be about a 3-horizontal period 3H. On-voltage periods of adjacent carry signals may partially overlap each other. As an example, a second carry signal Carry[2] output from the second stage ST2 may be shifted by about a 1-horizontal period 1H from a first carry signal Carry[1] output from the first stage ST1, and thus, may overlap by about a 2-horizontal period 2H with the first carry signal Carry[1].

The first to n-th carry signals Carry[1], Carry[2], Carry[3], Carry[4], . . . , and Carry[n] respectively output from the first to n-th stages ST1 to STn, may overlap a section that is boosted by the first capacitor C1 while the first control node Q is in a high-level state. The first to third carry signals Carry[1], Carry[2], and Carry[3] output from the first to third stages ST1, ST2, and ST3 may partially overlap a second half of an external signal STV, which is a start signal. Fourth to n-th carry signals Carry[4] to Carry[n] output from the fourth to n-th stages ST4 to STn do not overlap the previous carry signal, which is a start signal.

In embodiments of FIGS. 8 to 13, a pulse width of a scan signal has a 2H or more (2 nH or (2n+1)H), and an overlap section of a 1H or more ((2n−1)H or 2 nH) is provided between scan signals of adjacent stages. Accordingly, while the display apparatus according to some embodiments is driven, a scan time may be sufficiently secured and images may be displayed without deterioration in display quality.

Figure 14:
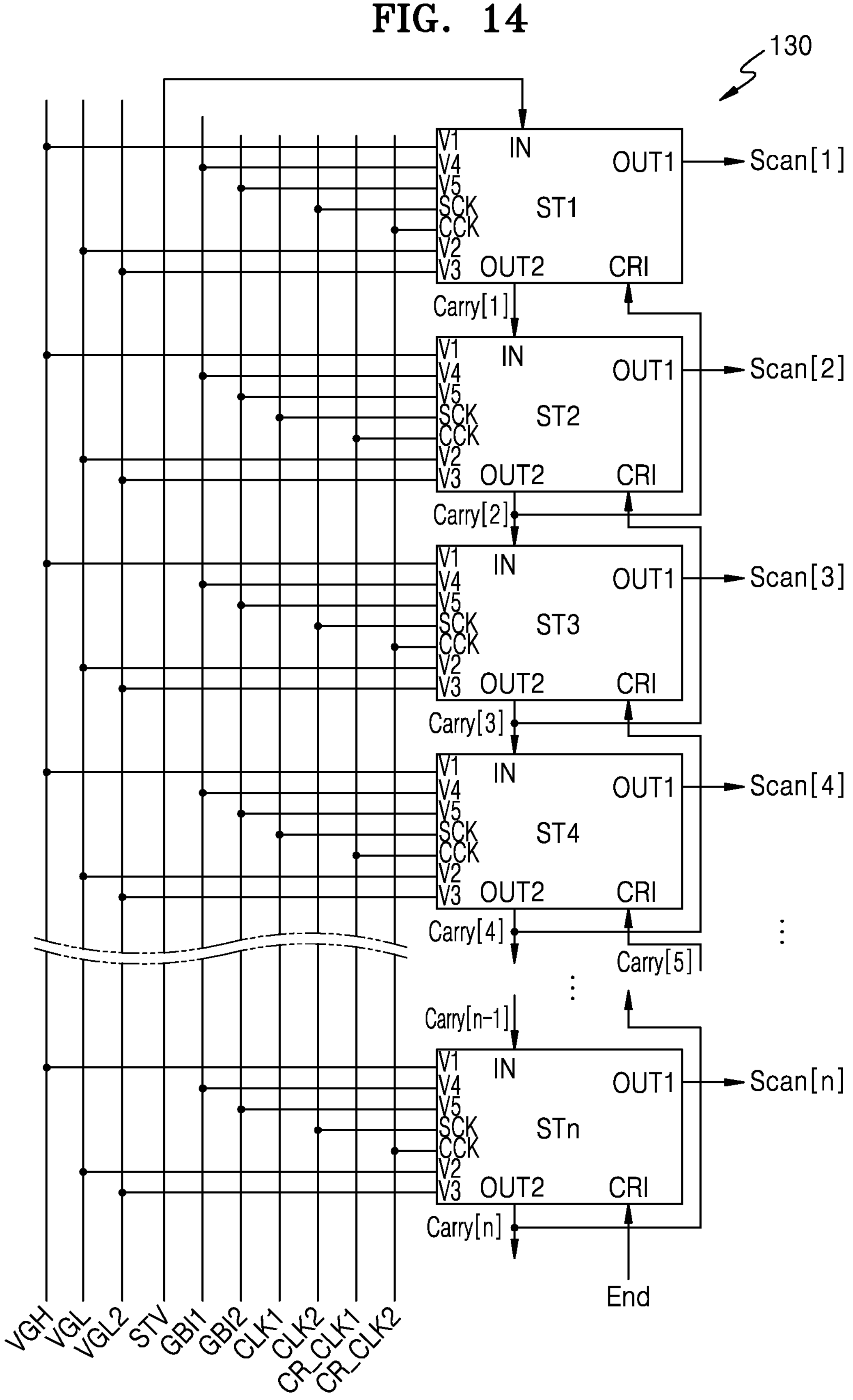
FIG. 14 is a schematic view of a scan driver according to an embodiment.
Figure 15:
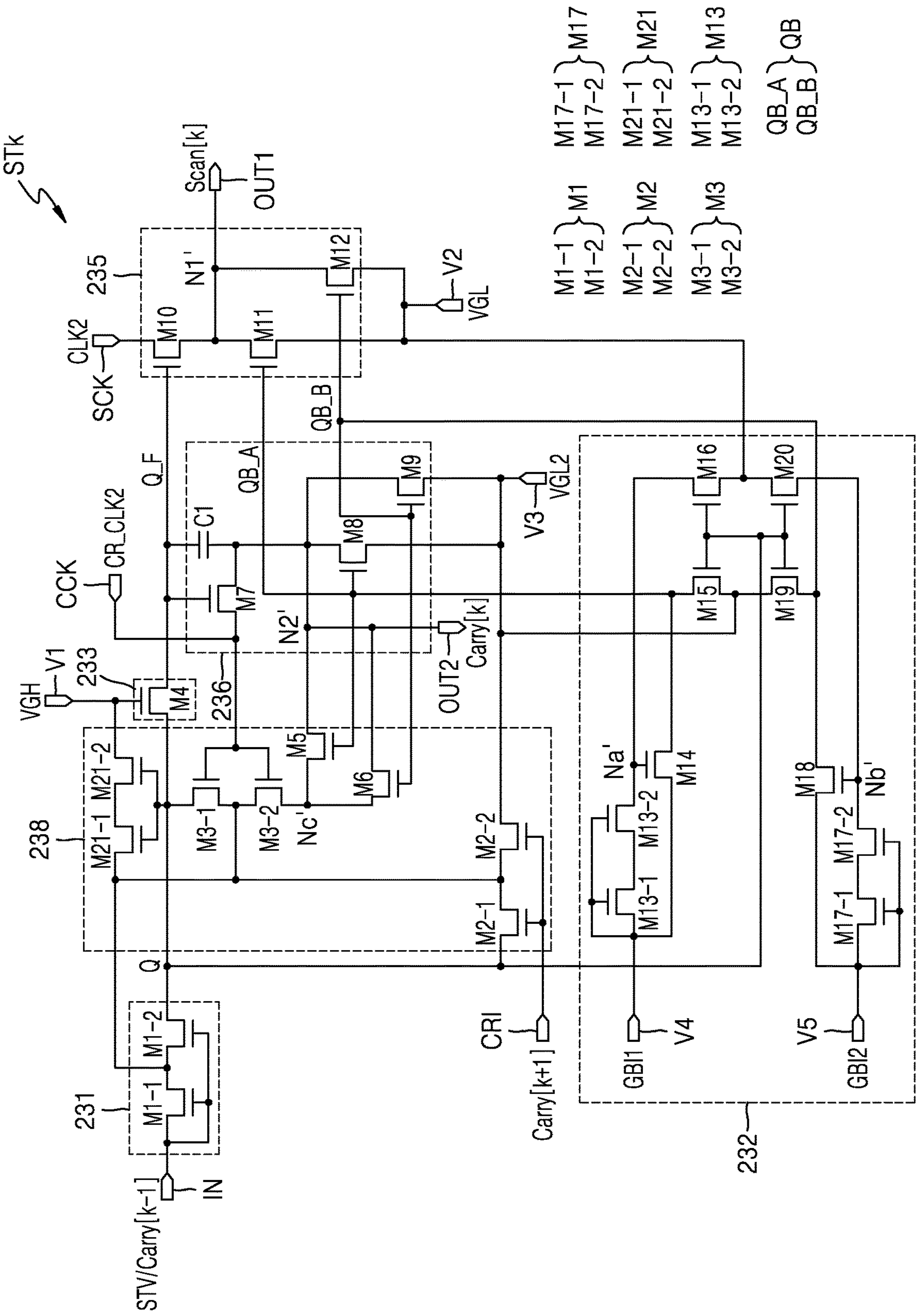
FIG. 15 is a view of a circuit of a stage of a scan driver according to an embodiment.
Figure 16:
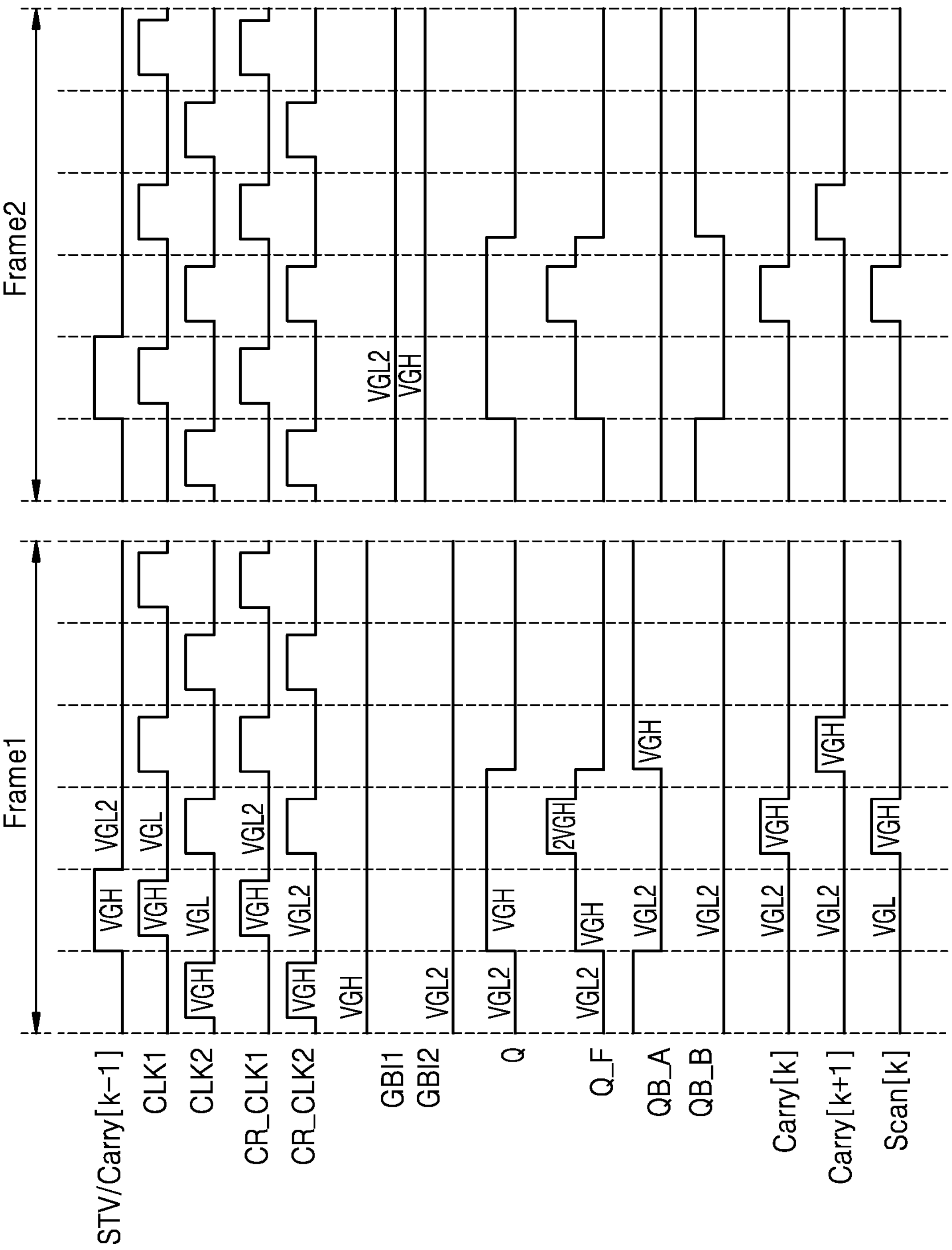
FIG. 16 is a timing diagram for explaining a method of driving the stage of FIG. 15.

FIG. 14 is a schematic view of the scan driver 130 according to some embodiments. FIG. 15 is a view of a circuit of a stage of the scan driver 130 according to some embodiments. FIG. 16 is a timing diagram for explaining a method of driving the stage of FIG. 15. Hereinafter, detailed description of content repeated in the content described with reference to FIGS. 2 to 13 is omitted.

Referring to FIG. 14, each of the first to n-th stages ST1 to STn may include an input terminal IN, a scan clock terminal SCK, a carry clock terminal CCK, a first voltage input terminal V1, a second voltage input terminal V2, a third voltage input terminal V3, a fourth voltage input terminal V4, a fifth voltage input terminal V5, a carry input terminal CRI, a first output terminal OUT1, and a second output terminal OUT2.

The input terminal IN may be configured to receive an external signal STV or a previous carry signal as a start signal. According to some embodiments, an external signal STV may be applied to the input terminal IN of the first stage ST1. A carry signal output from a previous stage may be applied to the input terminal IN of each of the second to n-th stages ST2 to STn except the first stage ST1.

The scan clock terminal SCK may be configured to receive the first scan clock signal CLK1 or the second scan clock signal CLK2. The first scan clock signal CLK1 and the second scan clock signal CLK2 may be alternately applied to the first to n-th stages ST1 to STn. As an example, a second scan clock signal CLK2 may be applied to an odd-numbered stage, and a first scan clock signal CLK1 may be applied to an even-numbered stage.

The carry clock terminal CCK may receive a first carry clock signal CR_CLK1 or a second carry clock signal CR_CLK2. A first carry clock signal CR_CLK1 and a second carry clock signal CR_CLK2 may be alternately applied to the first to n-th stages ST1 to STn. As an example, a second carry clock signal CR_CLK2 may be applied to an odd-numbered stage, and a first carry clock signal CR_CLK1 may be applied to an even-numbered stage.

The first voltage input terminal V1 may be configured to receive the first voltage VGH, the second voltage input terminal V2 may be configured to receive the second voltage VGL, and the third voltage input terminal V3 may be configured to receive the third voltage VGL2. The fourth voltage input terminal V4 may be configured to receive a fourth voltage GBI1, and the fifth voltage input terminal V5 may be configured to receive a fifth voltage GBI2.

The first output terminal OUT1 may be configured to output scan signals. A scan signal may be supplied to a pixel through its corresponding scan line. The second output terminal OUT2 may be configured to output carry signals. A carry input terminal CRI may receive a carry signal output from a next stage. An end signal End, which is a first voltage VGH of a high level may be applied to the carry input terminal CRI of the last n-th stage STn.

Hereinafter, the case where the k-th stage STk is an odd-numbered stage is described.

The k-th stage STk may include a first node controller 231, a second node controller 232, a node connector 233, a first output controller 235, a second output controller 236, and a stabilizer 238.

The first node controller 231 may be connected between the input terminal IN and the first control node Q. The first node controller 231 may include a first transistor.

The first transistor may include a (1-1)st transistor M1-1 and a (1-2)nd transistor M1-2 connected in series between the input terminal IN and the first control node Q. Gates of the (1-1)st transistor M1-1 and the (1-2)nd transistor M1-2 may be connected to the input terminal IN. When a start signal of a high level (e.g., an external signal STV or a previous carry signal Carry[k−1]) is applied, the (1-1)st transistor M1-1 and the (1-2)nd transistor M1-2 may be turned on and may set (charge) the first control node Q to a high voltage.

The second node controller 232 may be connected between the first control node Q and the second control node QB. The second node controller 232 may be configured to control the voltage of the second control node QB by inverting the voltage of the first control node Q and supplying the same to the second control node QB. The second node controller 232 may be configured to control the voltage of the second control node QB, based on the fourth voltage GBI1 applied to the fourth voltage input terminal V4 and the fifth voltage GBI2 applied to the fifth voltage input terminal V5. The second node controller 232 may include a thirteenth transistor M13, a 14-th transistor M14, a 15-th transistor M15, a 16-th transistor M16, a 17-th transistor M17, an 18-th transistor M18, a 19-th transistor M19, and a 20-th transistor M20.

The thirteenth transistor M13 may include a (13-1)st transistor M13-1 and a (13-2)nd transistor M13-2 connected in series between the fourth voltage input terminal V4 and a first node Na'. Gates of the (13-1)st transistor M13-1 and the (13-2)nd transistor M13-2 may be connected to the fourth voltage input terminal V4.

The 14-th transistor M14 may be connected between the fourth voltage input terminal V4 and the (2-1)st control node QB_A. A gate of the 14-th transistor M14 may be connected to the first node Na'.

The 15-th transistor M15 may be connected between the (2-1)st control node QB_A and the third voltage input terminal V3. A gate of the 15-th transistor M15 may be connected to the first control node Q.

The 16-th transistor M16 may be connected between the first node Na' and the second voltage input terminal V2. A gate of the 16-th transistor M16 may be connected to the first control node Q.

The 17-th transistor M17 may include a (17-1)st transistor M17-1 and a (17-2)nd transistor M17-2 connected in series between the fifth voltage input terminal V5 and a second node Nb'. Gates of the (17-1)st transistor M17-1 and the (17-2)nd transistor M17-2 may be connected to the fifth voltage input terminal V5.

The 18-th transistor M18 may be connected between the fifth voltage input terminal V5 and the (2-2)nd control node QB_B. A gate of the 18-th transistor M18 may be connected to the second node Nb'.

The 19-th transistor M19 may be connected between the (2-2)nd control node QB_B and the third voltage input terminal V3. A gate of the 19-th transistor M19 may be connected to the first control node Q.

The 20-th transistor M20 may be connected between the second node Nb' and the second voltage input terminal V2. A gate of the 20-th transistor M20 may be connected to the first control node Q.

In a first frame Frame1, the fourth voltage GBI1 of the first voltage VGH may be applied to the fourth voltage input terminal V4, and the fifth voltage GBI2 of the third voltage VGL2 may be applied to the fifth voltage input terminal V5.

When the first control node Q is switched from a low level to a high level, the (2-1)st control node QB_A may be switched from a high level to a low level, and the (2-2)nd control node QB_B may maintain a low level. Because the first control node Q is in a high-level state, the 15-th transistor M15, the 16-th transistor M16, the 19-th transistor M19, and the 20-th transistor M20 may be turned on. The (2-1)st control node QB_A and the (2-2)nd control node QB_B may each be set to the third voltage VGL2 by the 15-th transistor M15 and the 19-th transistor M19 that are turned on. In addition, the first node Na' and the second node Nb' may be set to the second voltage VGL by the 16-th transistor M16 and the 20-th transistor M20 that are turned on, and the 14-th transistor M14 and the 18-th transistor M18 may be turned off.

When the first control node Q is switched from a high level to a low level, the (2-1)st control node QB_A may be switched from a low level to a high level, and the (2-2)nd control node QB_B may maintain a low level. Because the first control node Q is in a low-level state, the 15-th transistor M15, the 16-th transistor M16, the 19-th transistor M19, and the 20-th transistor M20 may be turned off. Because the 13-th transistor M13 and the 14-th transistor M14 are turned on by the fourth voltage GBI1, the (2-1)st control node QB_A may become a high-level state. The 17-th transistor M17 is turned off by the fifth voltage GBI2, the second node Nb' may maintain a low-level state and the 18-th transistor M18 may be maintained turned off, and the (2-2)nd control node QB_B may maintain a low level state.

In a second frame Frame2, the fourth voltage GBI1 of the third voltage VGL2 may be applied to the fourth voltage input terminal V4, and the fifth voltage GBI2 of the first voltage VGH may be applied to the fifth voltage input terminal V5.

When the first control node Q is switched from a low level to a high level, the (2-2)nd control node QB_B may be switched from a high level to a low level, and the (2-1)st control node QB_A may maintain a low level. Because the first control node Q is in a high-level state, the 15-th transistor M15, the 16-th transistor M16, the 19-th transistor M19, and the 20-th transistor M20 may be turned on. The (2-1)st control node QB_A and the (2-2)nd control node QB_B may each be set to the third voltage VGL2 by the 15-th transistor M15 and the 19-th transistor M19 that are turned on. In addition, the first node Na' and the second node Nb' may be set to the second voltage VGL by the 16-th transistor M16 and the 20-th transistor M20 that are turned on, and the 14-th transistor M14 and the 18-th transistor M18 may be turned off.

When the first control node Q is switched from a high level to a low level, the (2-2)nd control node QB_B may be switched from a low level to a high level, and the (2-1)st control node QB_A may maintain a low level. Because the first control node Q is in a low-level state, the 15-th transistor M15, the 16-th transistor M16, the 19-th transistor M19, and the 20-th transistor M20 may be turned off. Because the 17-th transistor M17 and the 18-th transistor M18 are turned on by the fifth voltage GBI2, the (2-2)nd control node QB_B may become a high-level state. The thirteenth transistor M13 is turned off by the fourth voltage GBI1, the first node Na' may maintain a low-level state and the 14-th transistor M14 may be maintained turned off, and the (2-1)st control node QB_A may maintain a low level state.

The node connector 233 may include the fourth transistor M4.

The fourth transistor M4 may be connected between the first control node Q and a third control node Q_F and configured to control connection of the first control node Q and the third control node Q_F. The fourth transistor M4 may be turned on by the first voltage VGH applied to the first voltage input terminal V1 and configured to transfer the voltage of the first control node Q to the third control node Q_F.

The first output controller 235 may be configured to output the second scan clock signal CLK2 or the second voltage VGL to the first output terminal OUT1 connected to a first output node N1' according to the voltages of the first control node Q and the second control node QB. The first output controller 235 may include the tenth transistor M10, the eleventh transistor M11, and the twelfth transistor M12 connected between the scan clock terminal SCK and the second voltage input terminal V2.

The tenth transistor M10 may be connected between the scan clock terminal SCK and the first output terminal OUT1. A gate of the tenth transistor M10 may be connected to the third control node Q_F. The tenth transistor M10 may be turned on or turned off according to the voltage of the third control node Q_F. The tenth transistor M10 may be a pull-up transistor configured to output a high voltage. While the third control node Q_F is in a high-level state, the tenth transistor M10 may be turned on and may output the second scan clock signal CLK2 of a high voltage as a k-th scan signal Scan[k] of a high voltage through the first output terminal OUT1.

The eleventh transistor M11 may be connected between the first output terminal OUT1 and the second voltage input terminal V2. A gate of the eleventh transistor M11 may be connected to the (2-1)st control node QB_A. The eleventh transistor M11 may be turned on or turned off according to the voltage of the (2-1)st control node QB_A. The eleventh transistor M11 may be a pull-down transistor configured to output a low voltage. While the (2-1)st control node QB_A is in a high-level state, the eleventh transistor M11 may be turned on and may output the second voltage VGL as a k-th scan signal Scan[k] of a low voltage through the first output terminal OUT1.

The twelfth transistor M12 may be connected between the first output terminal OUT1 and the second voltage input terminal V2. A gate of the twelfth transistor M12 may be connected to the (2-2)nd control node QB_B. The twelfth transistor M12 may be turned on or turned off according to the voltage of the (2-2)nd control node QB_B. The twelfth transistor M12 may be a pull-down transistor configured to output a low voltage. While the (2-2)nd control node QB_B is in a high-level state, the twelfth transistor M12 may be turned on and may output the second voltage VGL as a k-th scan signal Scan[k] of a low voltage through the first output terminal OUT1.

The second output controller 236 may be configured to output the second carry clock signal CR_CLK2 or the third voltage VGL2 to the second output terminal OUT2 connected to a second output node N2' according to the voltages of the first control node Q and the second control node QB. The second output controller 236 may include the seventh transistor M7, the eighth transistor M8, and the ninth transistor M9 connected between the carry clock terminal CCK and the third voltage input terminal V3. The second output controller 236 may further include the first capacitor C1.

The seventh transistor M7 may be connected between the carry clock terminal CCK and the second output terminal OUT2. A gate of the seventh transistor M7 may be connected to the third control node Q_F. The seventh transistor M7 may be turned on or turned off according to the voltage of the third control node Q_F. The seventh transistor M7 may be a pull-up transistor configured to output a high voltage. While the third control node Q_F is in a high-level state, the seventh transistor M7 may be turned on and may output the second carry clock signal CR_CLK2 of a high voltage as a k-th carry signal Carry[k] of a high voltage through the second output terminal OUT2.

The eighth transistor M8 may be connected between the second output terminal OUT2 and the third voltage input terminal V3. A gate of the eighth transistor M8 may be connected to the (2-1)st control node QB_A. The eighth transistor M8 may be turned on or turned off according to the voltage of the (2-1)st control node QB_A. The eighth transistor M8 may be a pull-down transistor configured to output a low voltage. While the (2-1)st control node QB_A is in a high-level state, the eighth transistor M8 may be turned on and may output the third voltage VGL2 as a k-th carry signal Carry[k] of a low voltage through the second output terminal OUT2.

The ninth transistor M9 may be connected between the second output terminal OUT2 and the third voltage input terminal V3. A gate of the ninth transistor M9 may be connected to the (2-2)nd control node QB_B. The ninth transistor M9 may be turned on or turned off according to the voltage of the (2-2)nd control node QB_B. The ninth transistor M9 may be a pull-down transistor configured to output a low voltage. While the (2-2)nd control node QB_B is in a high-level state, the ninth transistor M9 may be turned on and may output the third voltage VGL2 as a k-th carry signal Carry[k] of a low voltage through the second output terminal OUT2.

The first capacitor C1 may be connected between the third control node Q_F and the second output terminal OUT2. The voltage of the third control node Q_F may be bootstrapped by the first capacitor C1.

The eleventh transistor M11 and the twelfth transistor M12 may be alternately turned on according to alternate application of the fourth voltage GBI1 and the fifth voltage GBI2. As an example, in the case where the fourth voltage GBI1 and the fifth voltage GBI2 alternate on a frame basis, the eleventh transistor M11 and the twelfth transistor M12 may be alternately turned on, on a frame basis.

The eighth transistor M8 and the ninth transistor M9 may be alternately turned on according to alternate application of the fourth voltage GBI1 and the fifth voltage GBI2. As an example, in the case where the fourth voltage GBI1 and the fifth voltage GBI2 alternate on a frame basis, the eighth transistor M8 and the ninth transistor M9 may be alternately turned on, on a frame basis.

The stabilizer 238 may include the second transistor, the third transistor, the fifth transistor M5, the sixth transistor M6, and the 21-st transistor.

The second transistor may include a (2-1)st transistor M2-1 and a (2-2)nd transistor M2-2 connected in series between the first control node Q and the third voltage input terminal V3. Gates of the (2-1)st transistor M2-1 and the (2-2)nd transistor M2-2 may be connected to the carry input terminal CRI which receives a next carry signal Carry[k+1]. An intermediate node (a common electrode) between the (2-1)st transistor M2-1 and the (2-2)nd transistor M2-2 may be connected to intermediate nodes of the first transistor and the third transistor, and the 21-st transistor. The voltage of the first control node Q may be transmitted to a node to which the 15-th transistor M15 and the 19-th transistor M19 are connected, by turn-on of the (2-1)st transistor M2-1 and the (2-2)nd transistor M2-2.

The third transistor may include a (3-1)st transistor M3-1 and a (3-2)nd transistor M3-2 connected in series between the first control node Q and a third node Nc'. Gates of the (3-1)st transistor M3-1 and the (3-2)nd transistor M3-2 may be connected to the carry clock terminal CCK. An intermediate node (a common electrode) of the (3-1)st transistor M3-1 and the (3-2)nd transistor M3-2 may be connected to the 21-st transistor.

The fifth transistor M5 may be connected between the third node Nc' and the second output node N2'. A gate of the fifth transistor M5 may be connected to the (2-1)st control node QB_A.

The sixth transistor M6 may be connected between the third node Nc' and the second output node N2'. A gate of the sixth transistor M6 may be connected to the (2-2)nd control node QB_B.

While the first control node Q and the third control node Q_F are in a low-level state, and the (2-1)st control node QB_A or the (2-2)nd control node QB_B is in a high-level state, when a second scan clock signal CLK2 of a high voltage is supplied to the scan clock terminal SCK, the third transistor may maintain the voltage level of the first control node Q at a low-level state, thereby preventing the voltage of the first control node Q from rising temporarily.

As an example, when the first control node Q is in a low-level state, and a second scan clock signal CLK2 of a high voltage is supplied to the scan clock terminal SCK, the third transistor M3 may be turned on by a second carry clock signal CR_CLK2 of a high voltage applied to the carry clock terminal CCK1. In this case, when the (2-1)st control node QB_A is in a high-level state, the fifth transistor M5 and the eighth transistor M8 may be turned on. The second output node N2' may become a low-level state by the third voltage VGL2 through the eighth transistor M8 that is turned on, and the third node Nc' may become a low-level state equal to that of the second output node N2' through the fifth transistor M5 that is turned on. Accordingly, the third transistor M3 that is turned on may maintain the voltage level of the third control node Q_F at the low-level state of the third node Nc'. Similarly, when the (2-2)nd control node QB_B is in a high-level state, the sixth transistor M6 and the ninth transistor M9 may be turned on. The second output node N2' may become a low-level state by the third voltage VGL2 through the ninth transistor M9 that is turned on, and the third node Nc' may become a low-level state equal to that of the second output node N2' through the sixth transistor M6 that is turned on. Accordingly, the third transistor M3 that is turned on may maintain the voltage level of the first control node Q and the third control node Q_F at the low-level state of the third node Nc'.

Accordingly, by using the third voltage VGL2 of a low voltage set at the second output node N2' through the fifth transistor M5 or the sixth transistor M6 that is turned on, the third transistor may prevent the voltages of the first control node Q and the third control node Q_F from rising temporarily, and thus, maintain the voltage levels of the first control node Q and the third control node Q_F at a low level state.

The embodiments shown with respect to FIG. 15 have been described by using an odd-numbered stage as an example, and is equally applicable to even-numbered stages according to some embodiments. In an even-numbered stage, a first scan clock signal CLK1 may be applied to the scan clock terminal SCK, and a first carry clock signal CR_CLK1 may be applied to the carry clock terminal CCK.

FIGS. 17 to 33 are views of various modifications of a circuit of a stage of the scan driver 130 according to some embodiments.

Figure 17:
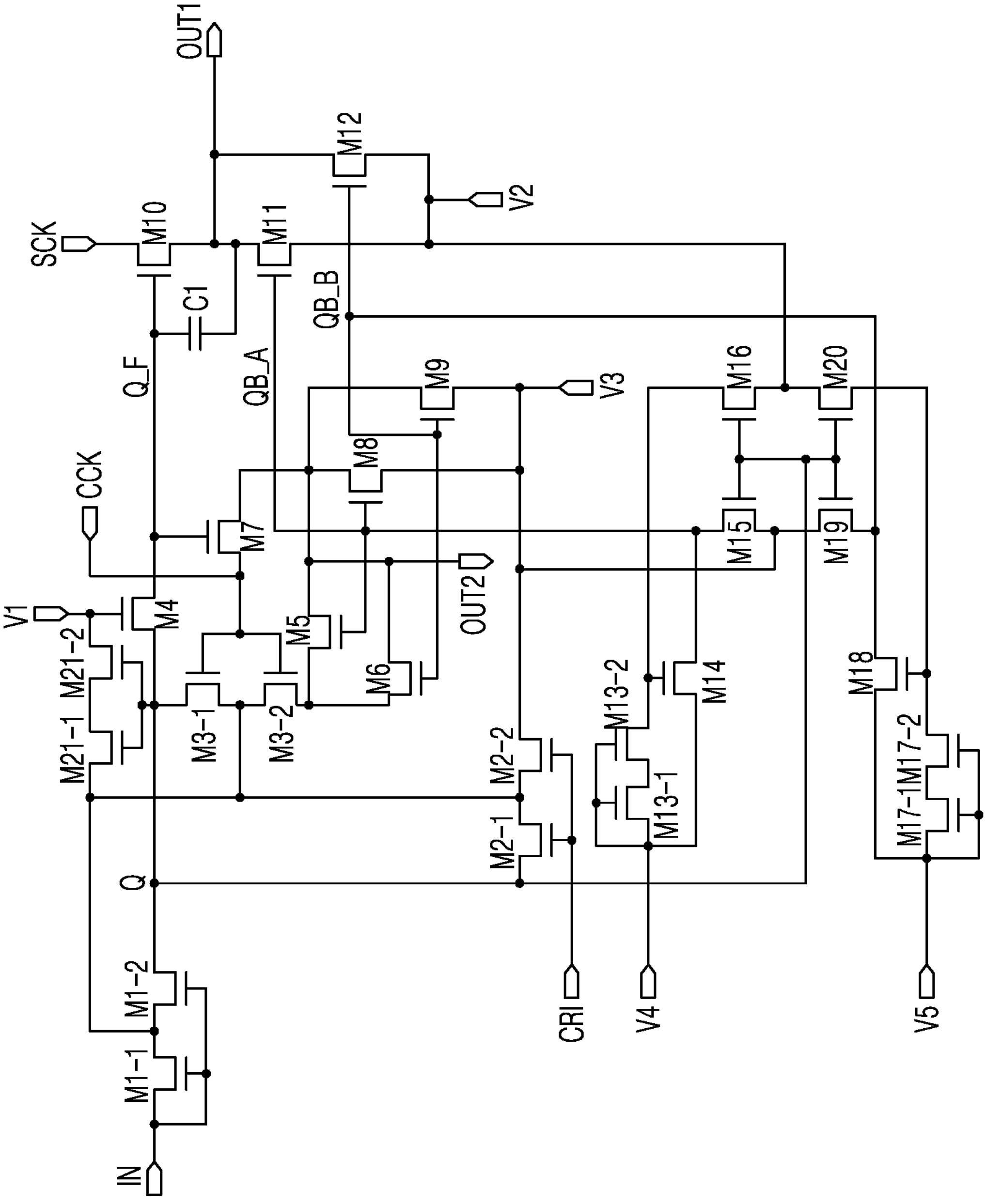
FIGS. 17 to 33 are views of various modifications of a circuit of a stage of a scan driver according to an embodiment.

The stage shown in FIG. 17 is different from the stage shown in FIG. 15 in that the first capacitor C1 is connected between the gate (the third control node Q_F) of the tenth transistor M10 and the first output terminal OUT1. Other configurations and operations are the same.

Figure 18:
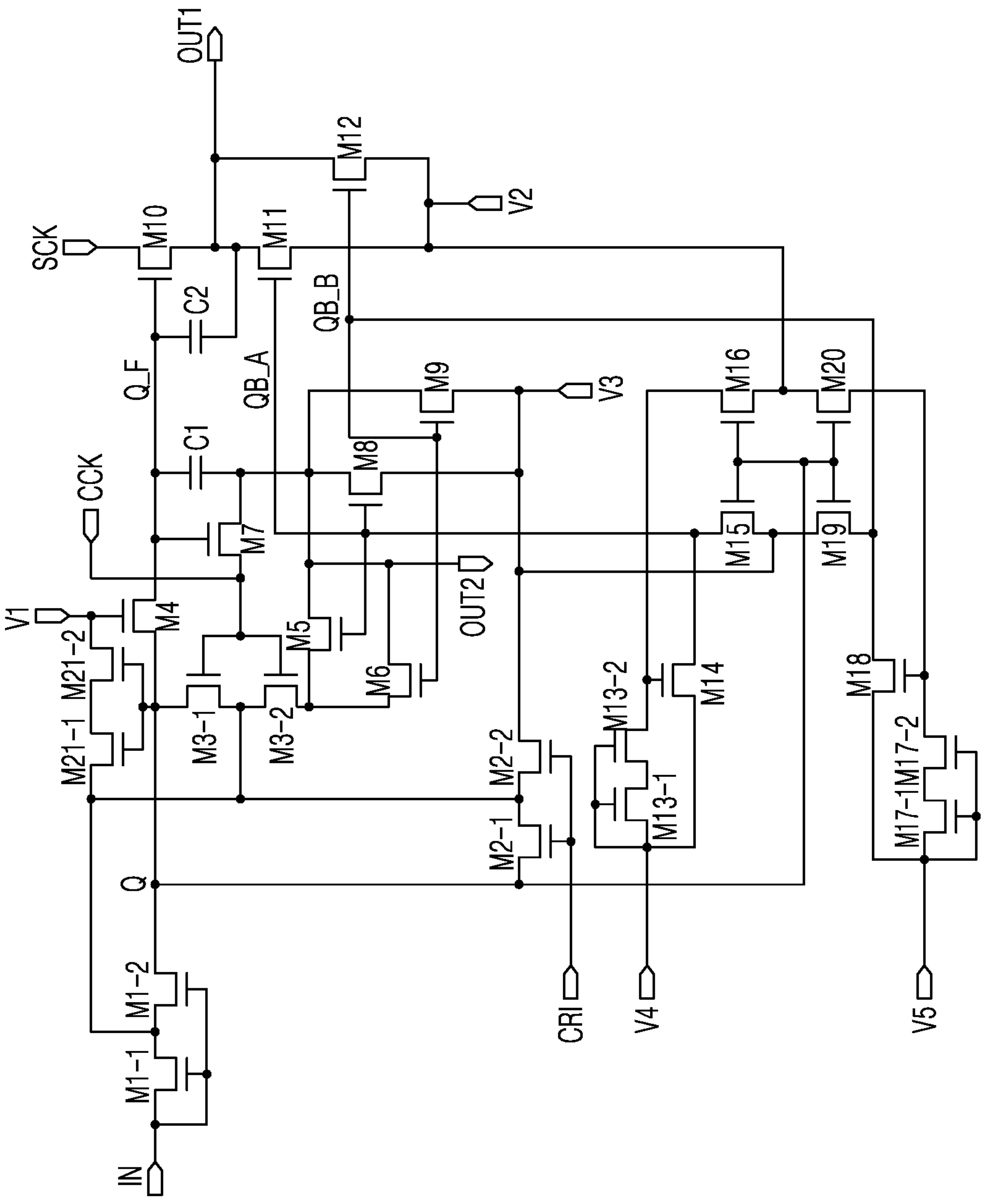

The stage shown in FIG. 18 is different from the stage shown in FIG. 15 in that the second capacitor C2 is added between the gate (the third control node Q_F) of the tenth transistor M10 and the first output terminal OUT1. Other configurations and operations are the same.

Figure 19:
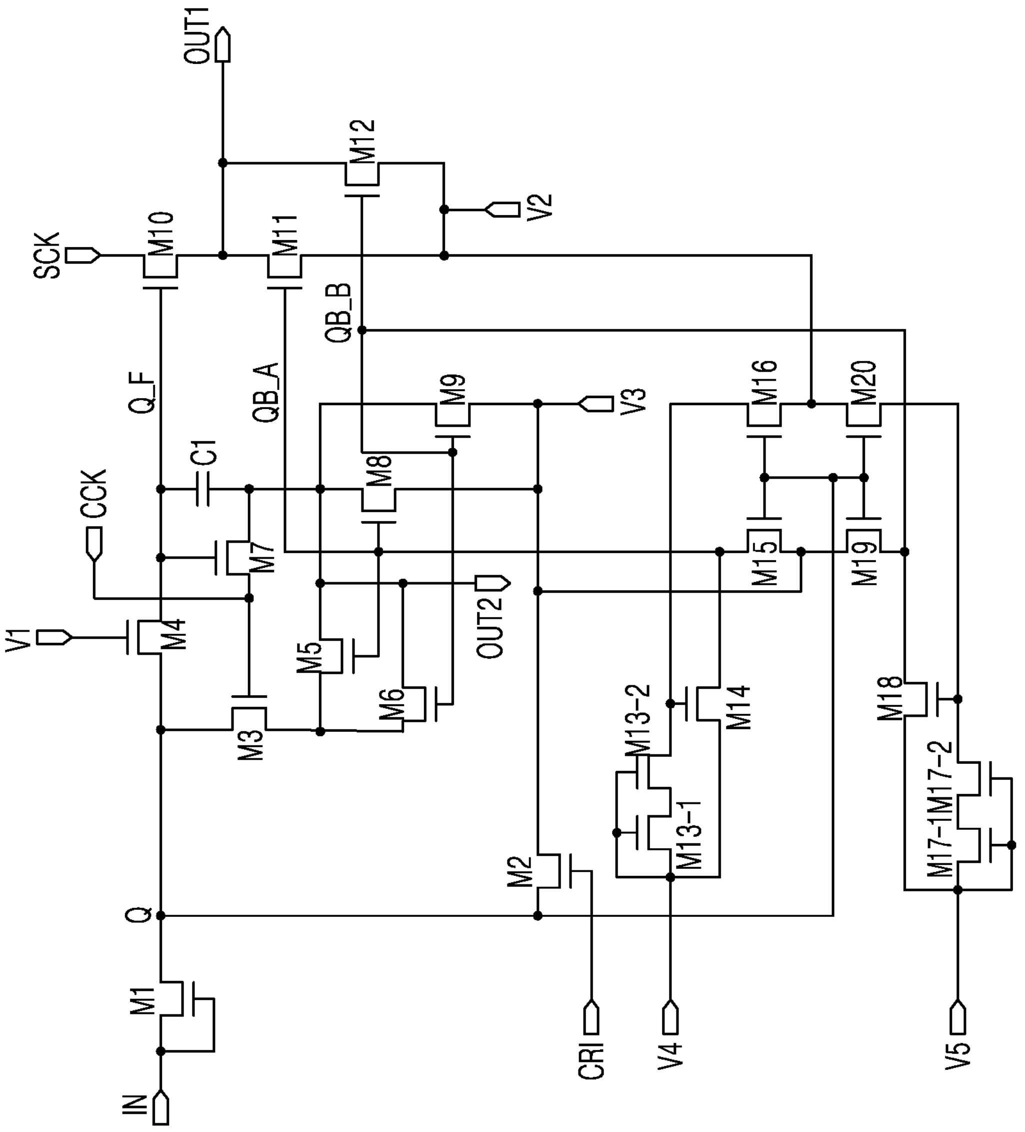

In the stage shown in FIG. 19, because the (1-2)nd transistor M1-2, the (2-2)nd transistor M2-2, and the (3-2)nd transistor M3-2 are removed, the first transistor M1, the second transistor M2, and the third transistor M3 each have a single transistor structure. The stage in FIG. 19 is also different from the stage shown in FIG. 15 in that the (21-1)st transistor M21-1 and the (21-2)nd transistor M21-2 are removed. Other configurations and operations are the same.

Figure 20:
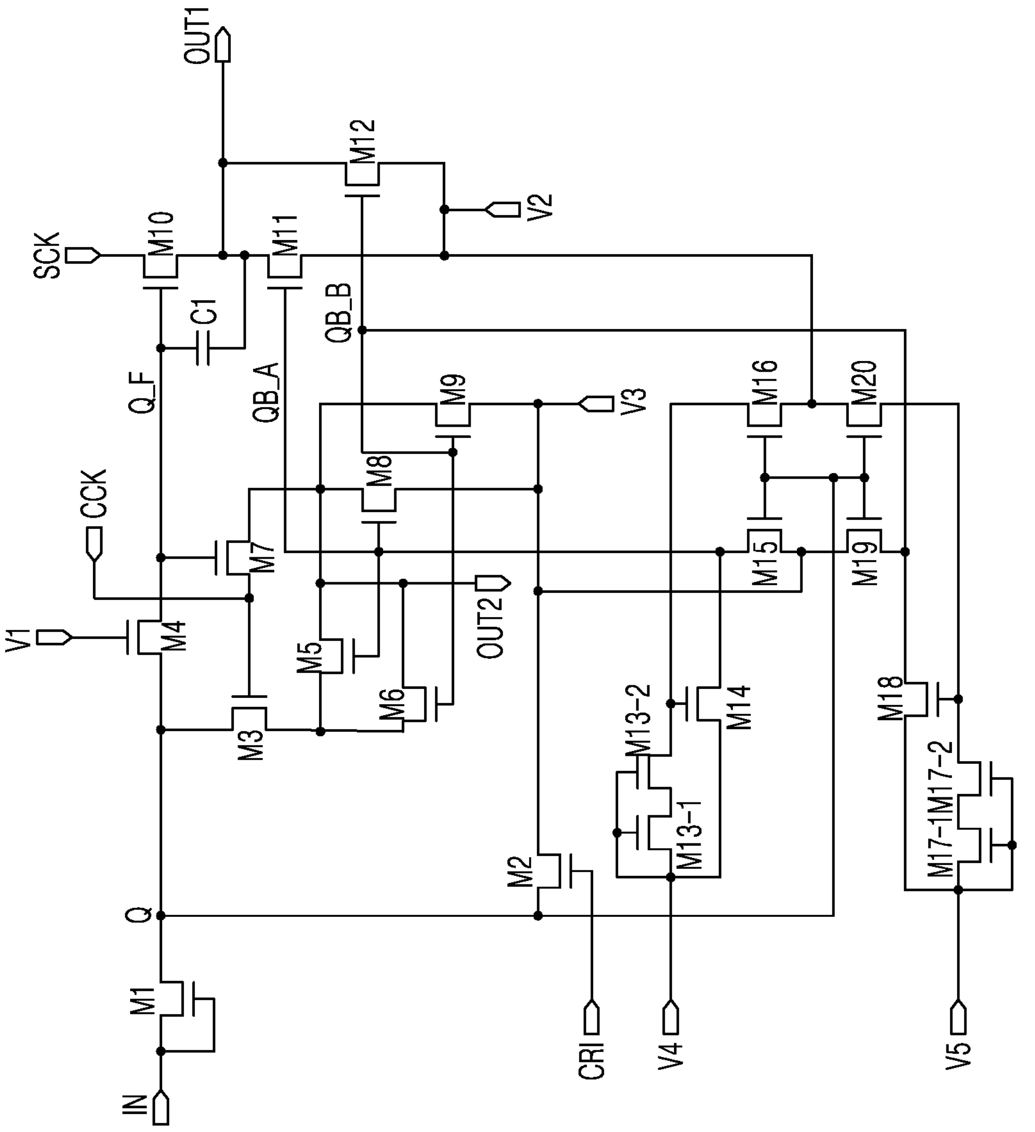

In the stage shown in FIG. 20, because the (1-2)nd transistor M1-2, the (2-2)nd transistor M2-2, and the (3-2)nd transistor M3-2 are removed, the first transistor M1, the second transistor M2, and the third transistor M3 each have a single transistor structure. The stage in FIG. 20 is also different from the stage shown in FIG. 17 in that the (21-1)st transistor M21-1 and the (21-2)nd transistor M21-2 are removed. Other configurations and operations are the same.

Figure 21:
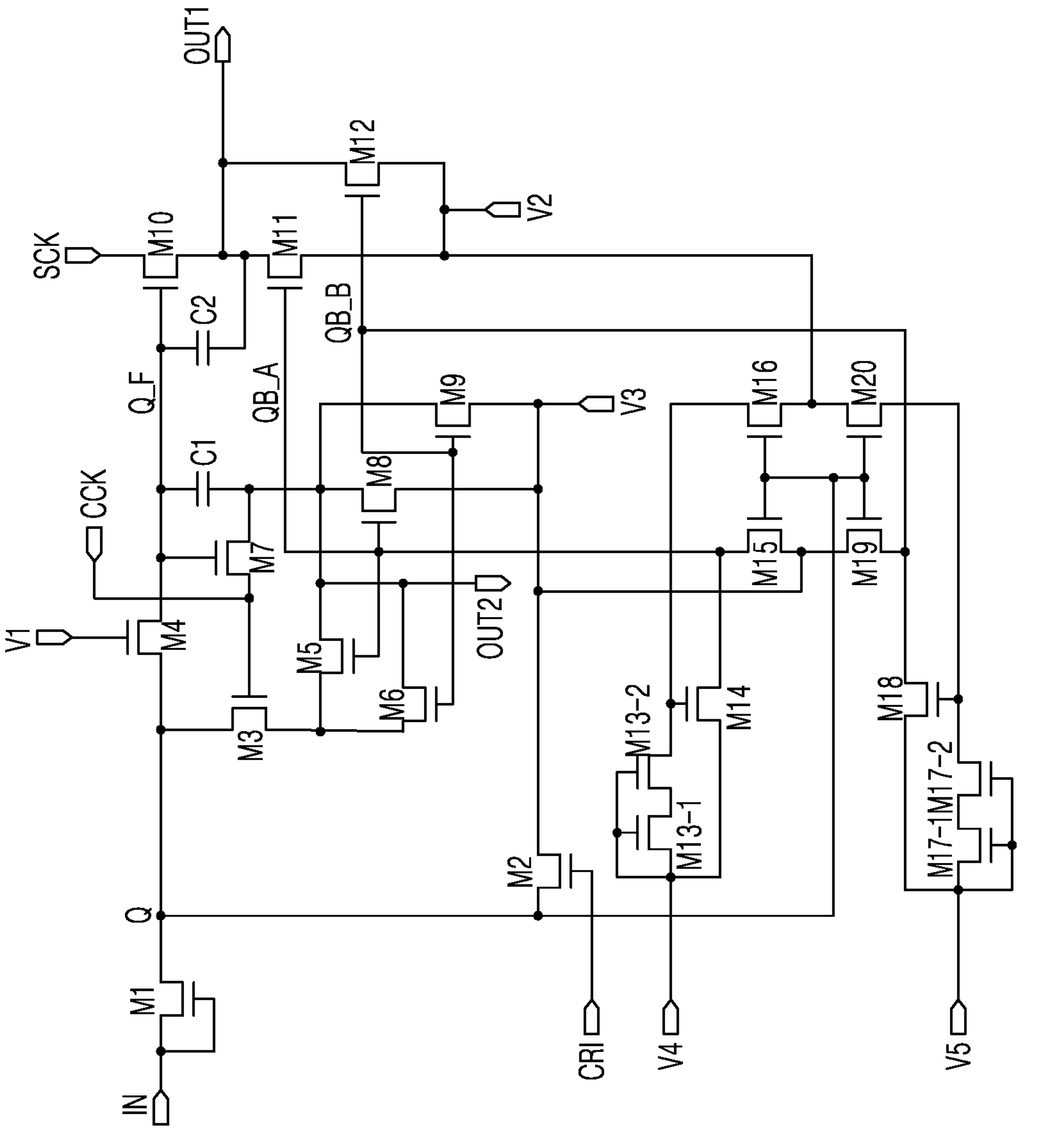

In the stage shown in FIG. 21, because the (1-2)nd transistor M1-2, the (2-2)nd transistor M2-2, and the (3-2)nd transistor M3-2 are removed, the first transistor M1, the second transistor M2, and the third transistor M3 each have a single-transistor structure. The stage in FIG. 21 is also different from the stage shown in FIG. 18 in that the (21-1)st transistor M21-1 and the (21-2)nd transistor M21-2 are removed. Other configurations and operations are the same.

Figure 22:
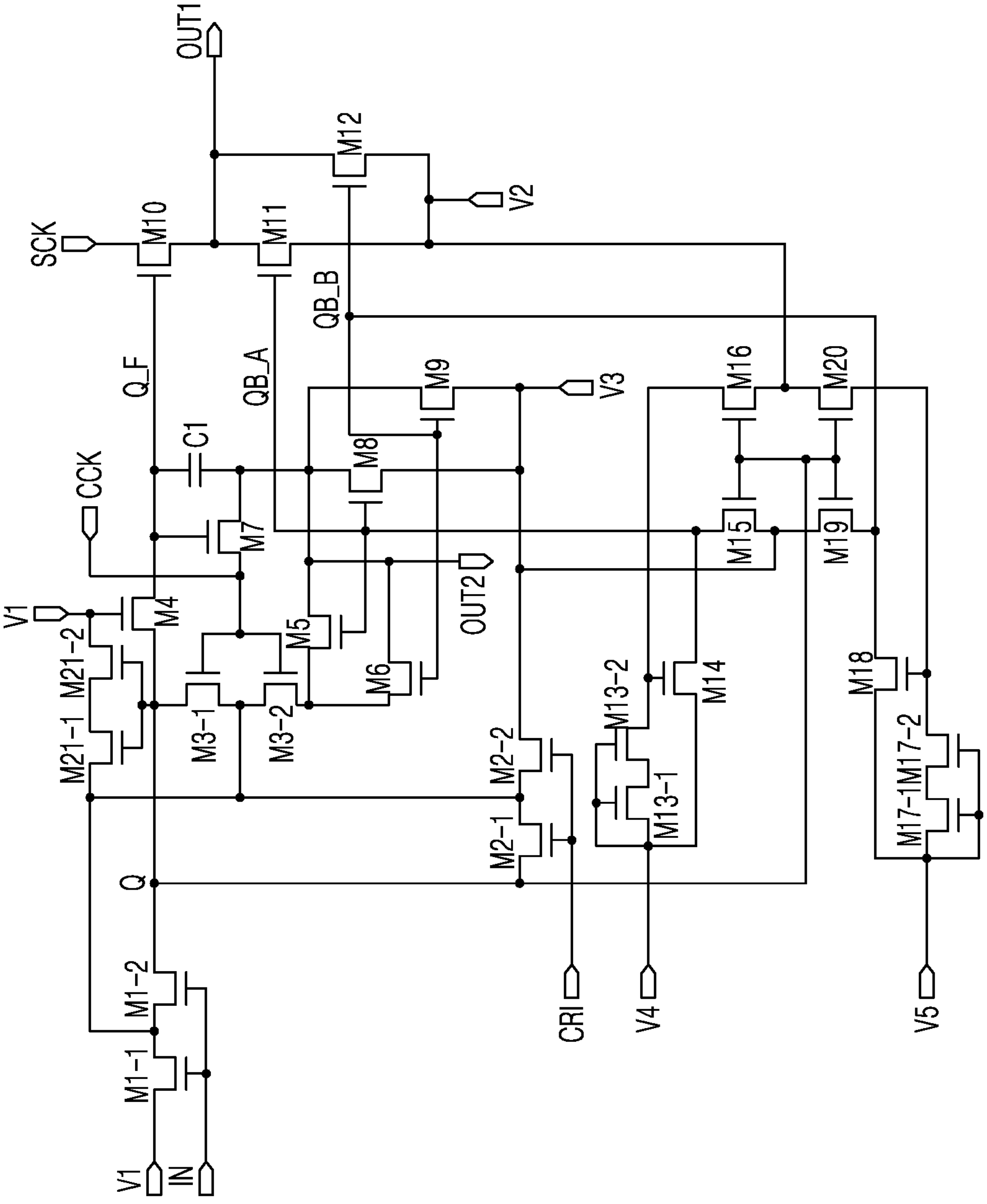

The stage shown in FIG. 22 is different from the stage shown in FIG. 15 in that the (1-1)st transistor M1-1 and the (1-2)nd transistor M1-2 are connected between the first voltage input terminal V1 and the first control node Q, and that gates of the (1-1)st transistor M1-1 and the (1-2)nd transistor M1-2 are connected to the input terminal IN. Other configurations and operations are the same. When a voltage applied to the input terminal IN is a high level, the (1-1)st transistor M1-1 and the (1-2)nd transistor M1-2 may be turned on, and configured to supply the first voltage VGH of a high level to the first control node Q.

Figure 23:
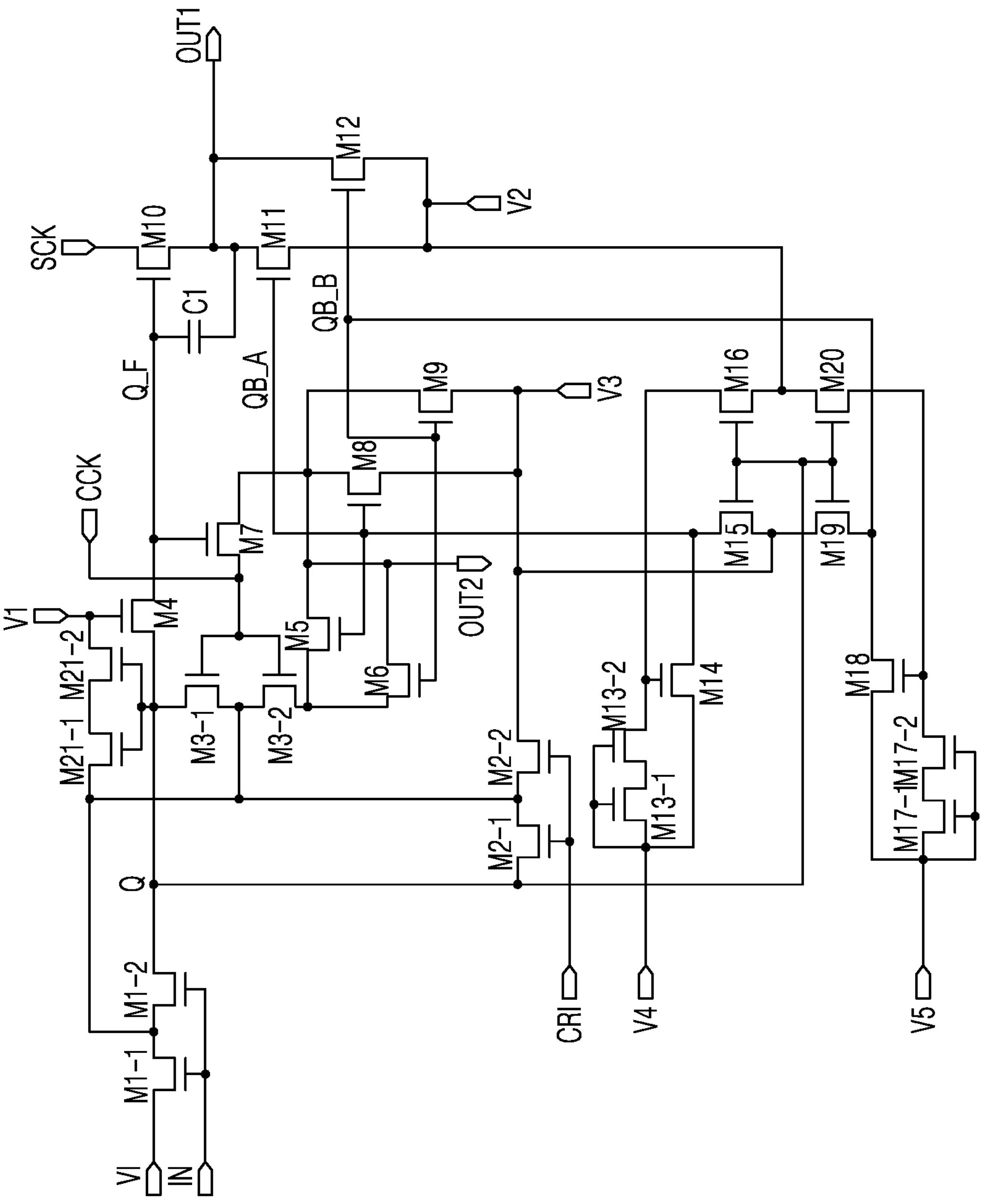

The stage shown in FIG. 23 is different from the stage shown in FIG. 17 in that the (1-1)st transistor M1-1 and the (1-2)nd transistor M1-2 are connected between the first voltage input terminal V1 and the first node Q, and that gates are connected to the input terminal IN. Other configurations and operations are the same. When a voltage applied to the input terminal IN is a high level, the (1-1)st transistor M1-1 and the (1-2)nd transistor M1-2 may be turned on, and configured to supply the first voltage VGH of a high level to the first node Q.

Figure 24:
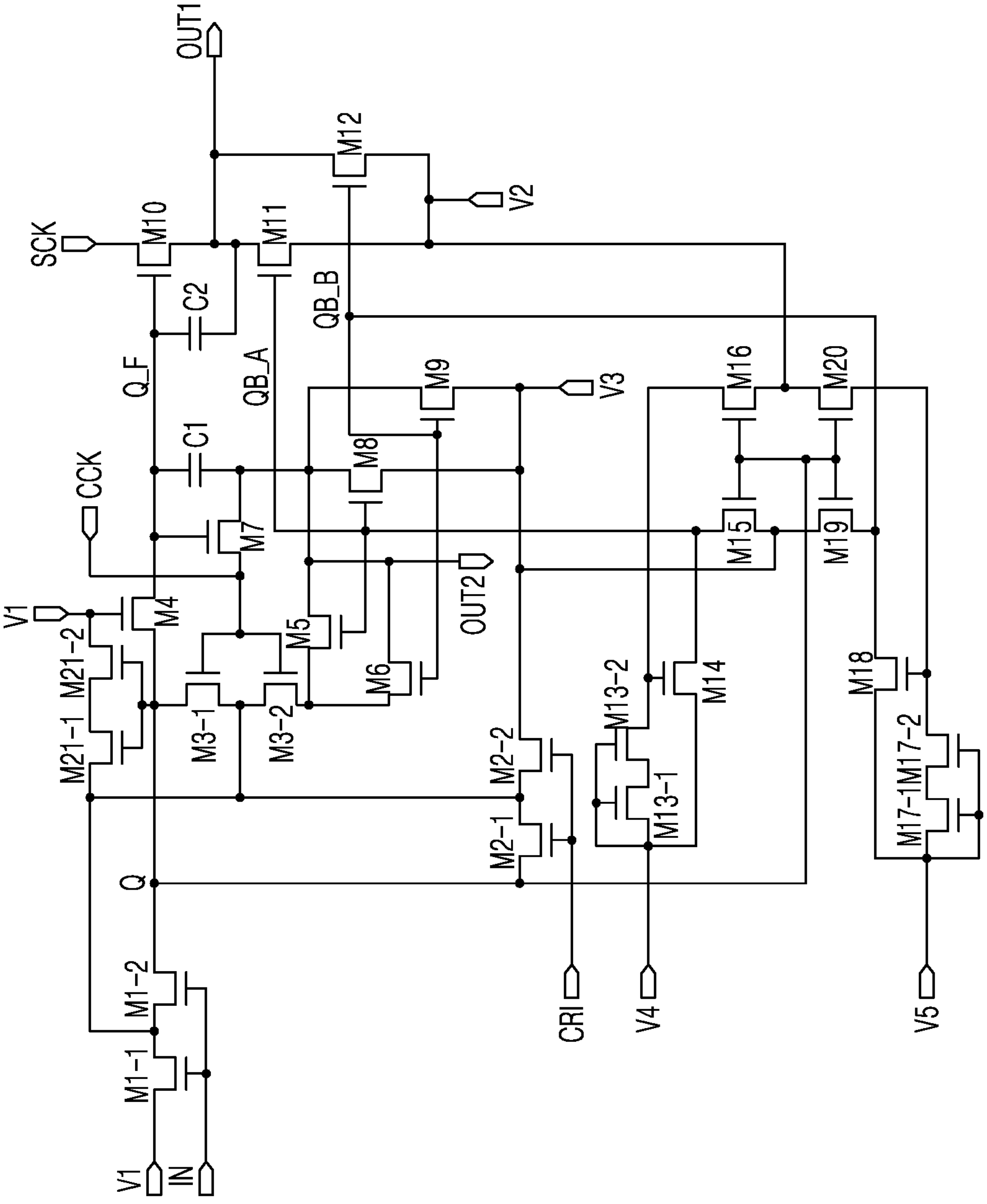

The stage shown in FIG. 24 is different from the stage shown in FIG. 18 in that the (1-1)st transistor M1-1 and the (1-2)nd transistor M1-2 are connected between the first voltage input terminal V1 and the first control node Q, and that gates of the (1-1)st transistor M1-1 and the (1-2)nd transistor M1-2 are connected to the input terminal IN. Other configurations and operations are the same. When a voltage applied to the input terminal IN is a high level, the (1-1)st transistor M1-1 and the (1-2)nd transistor M1-2 may be turned on, and configured to supply the first voltage VGH of a high level to the first control node Q.

Figure 25:
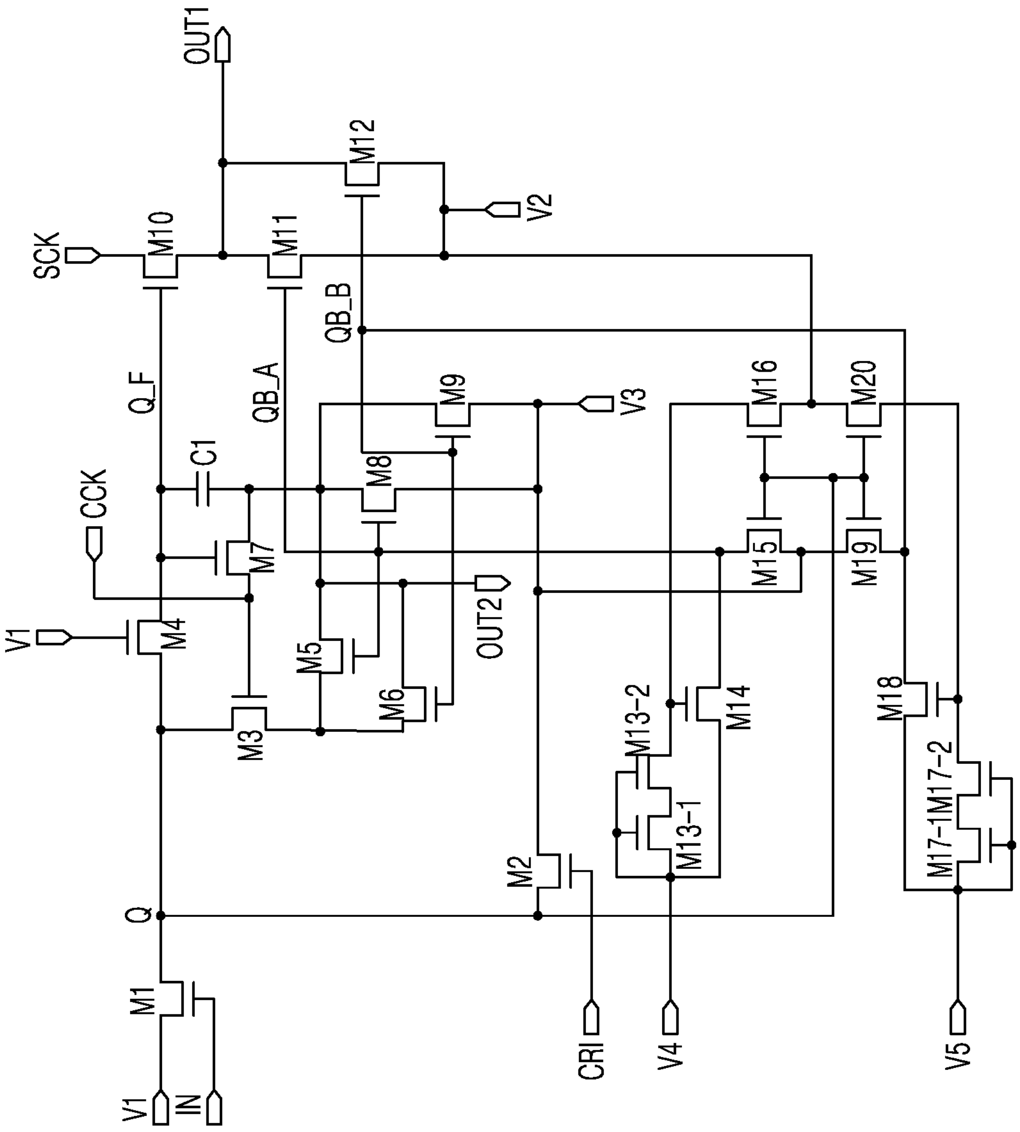

In the stage shown in FIG. 25, because the (1-2)nd transistor M1-2, the (2-2)nd transistor M2-2, and the (3-2)nd transistor M3-2 are removed, the first transistor M1, the second transistor M2, and the third transistor M3 each have a single-transistor structure. The stage in FIG. 25 is different from the stage shown in FIG. 22 in that the (21-1)st transistor M21-1 and the (21-2)nd transistor M21-2 are removed. Other configurations and operations are the same.

Figure 26:
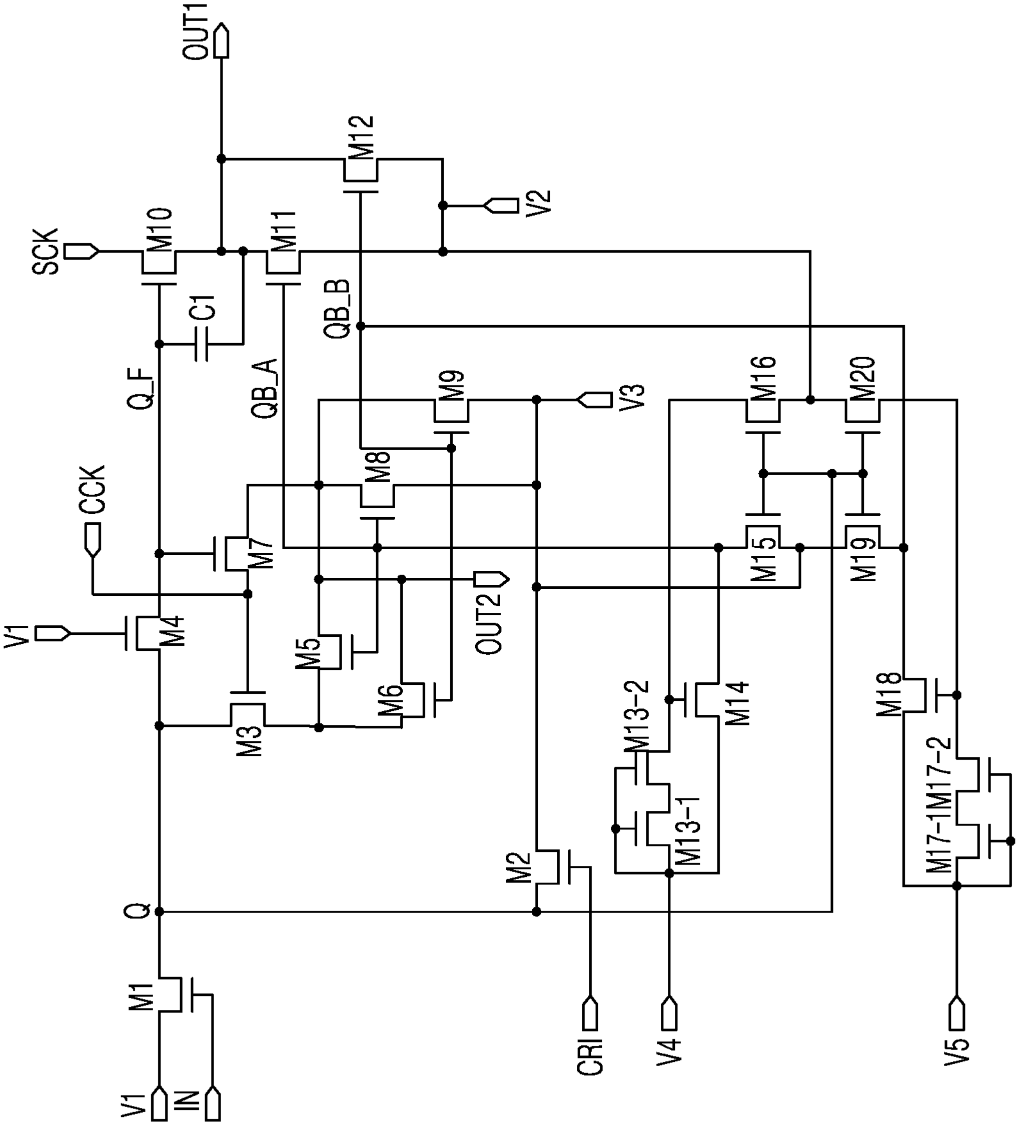

In the stage shown in FIG. 26, because the (1-2)nd transistor M1-2, the (2-2)nd transistor M2-2, and the (3-2)nd transistor M3-2 are removed, the first transistor M1, the second transistor M2, and the third transistor M3 each have a single-transistor structure. The stage in FIG. 26 is different from the stage shown in FIG. 23 in that the (21-1)st transistor M21-1 and the (21-2)nd transistor M21-2 are removed. Other configurations and operations are the same.

Figure 27:
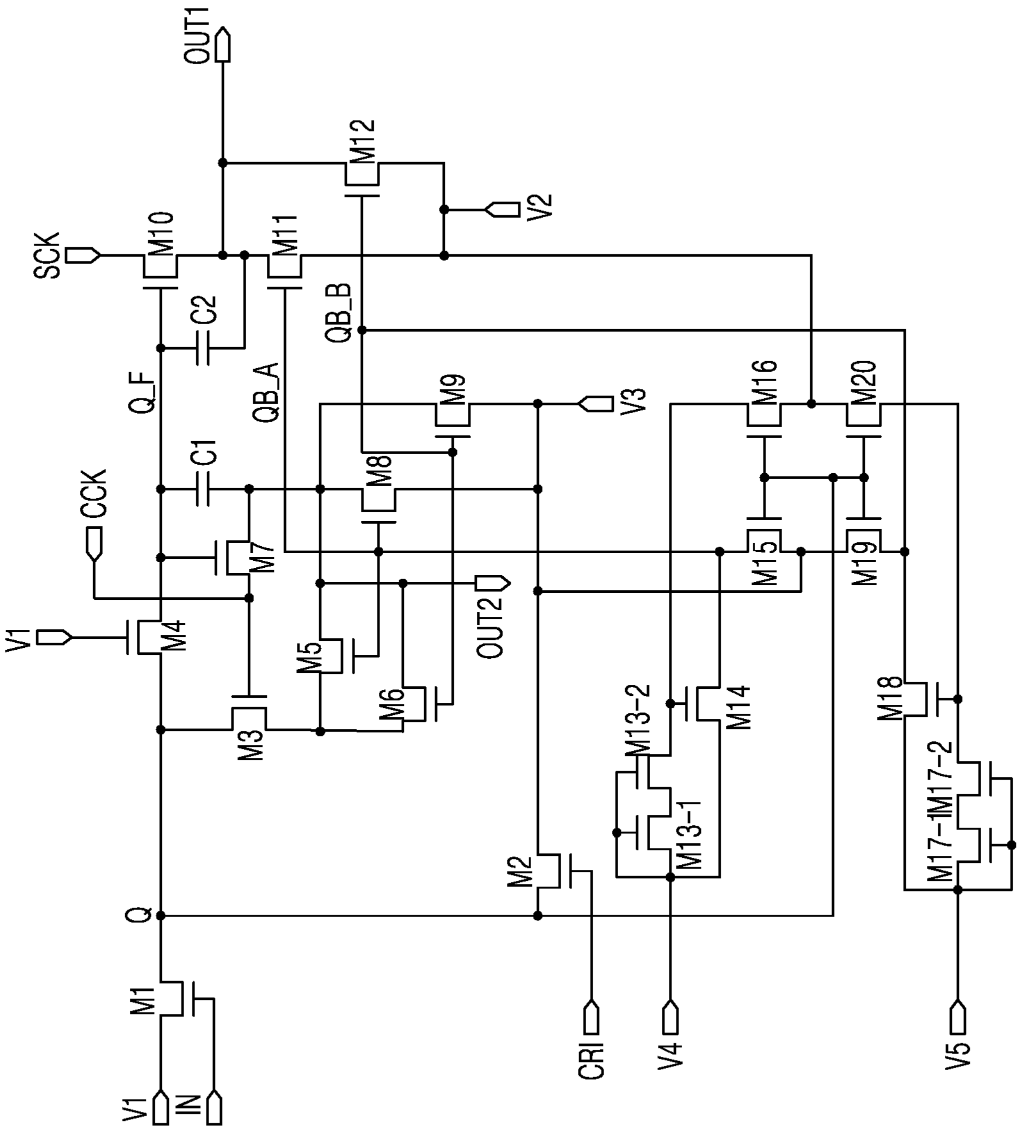

In the stage shown in FIG. 27, because the (1-2)nd transistor M1-2, the (2-2)nd transistor M2-2, and the (3-2)nd transistor M3-2 are removed, the first transistor M1, the second transistor M2, and the third transistor M3 each have a single-transistor structure. The stage in FIG. 27 is different from the stage shown in FIG. 24 in that the (21-1)st transistor M21-1 and the (21-2)nd transistor M21-2 are removed. Other configurations and operations are the same.

Figure 28:
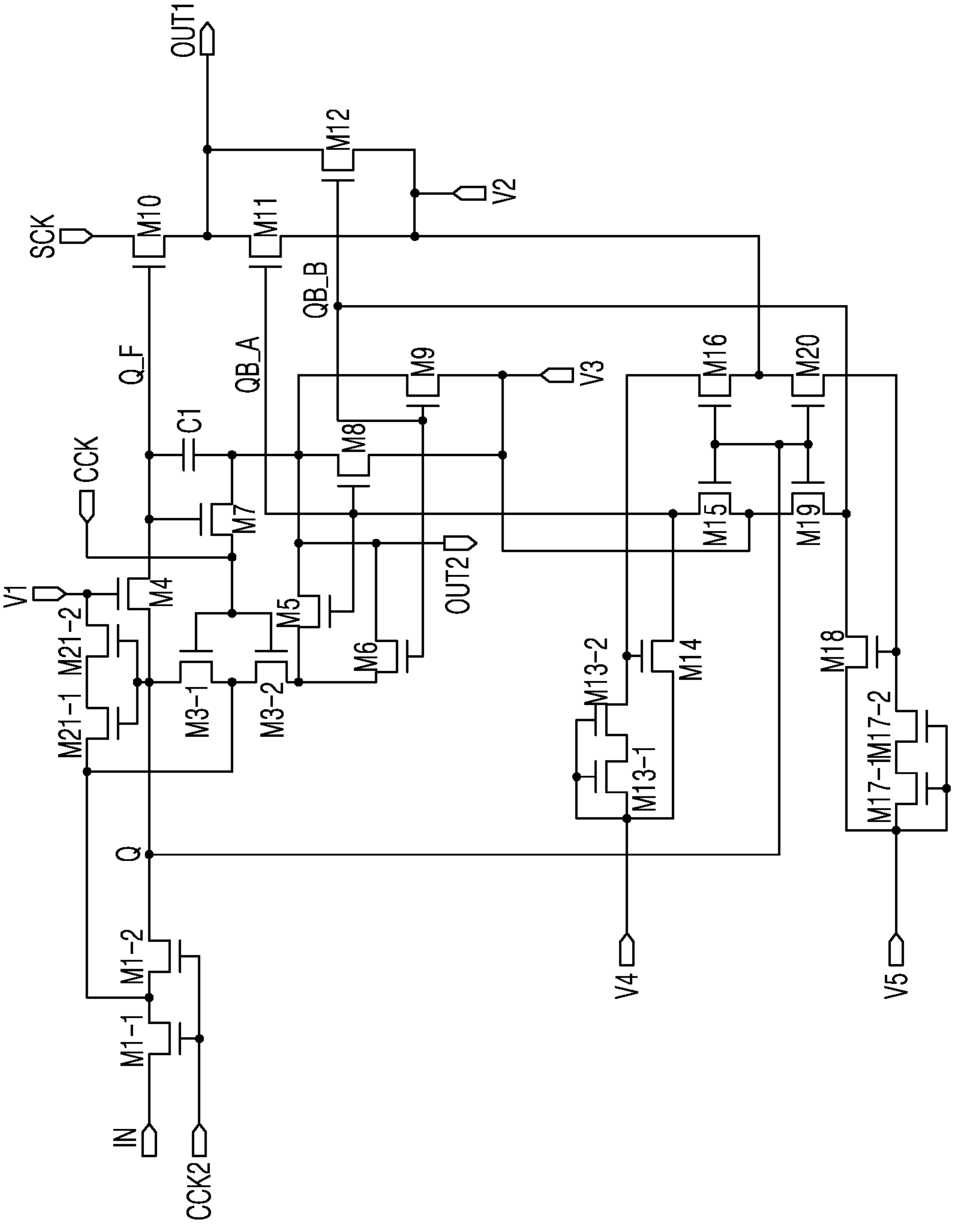

The stage shown in FIG. 28 is different from the stage shown in FIG. 15 in that the (1-1)st transistor M1-1 and the (1-2)nd transistor M1-2 are connected between the input terminal IN and the first control node Q, that gates of the (1-1)st transistor M1-1 and the (1-2)nd transistor M1-2 are connected to the second carry clock terminal CCK2, and that the (2-1)st transistor M2-1 and the (2-2)nd transistor M2-2 are removed. Other configurations and operations are the same.

Figure 29:
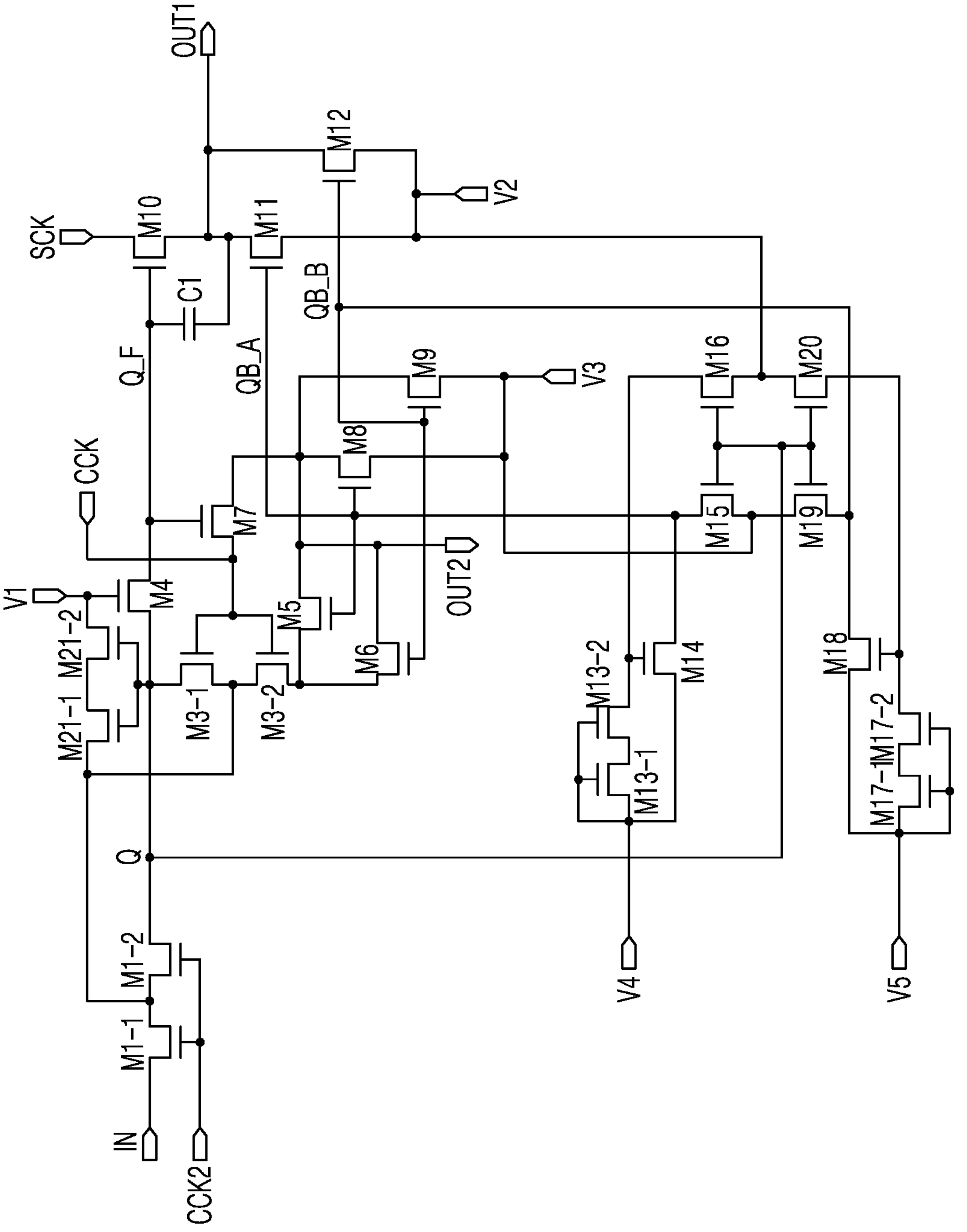

The stage shown in FIG. 29 is different from the stage shown in FIG. 17 in that the (1-1)st transistor M1-1 and the (1-2)nd transistor M1-2 are connected between the input terminal IN and the first control node Q, that the gate of the (1-1)st transistor M1-1 and the (1-2)nd transistor M1-2 are connected to the second carry clock terminal CCK2, and that the (2-1)st transistor M2-1 and the (2-2)nd transistor M2-2 are removed. Other configurations and operations are the same.

Figure 30:
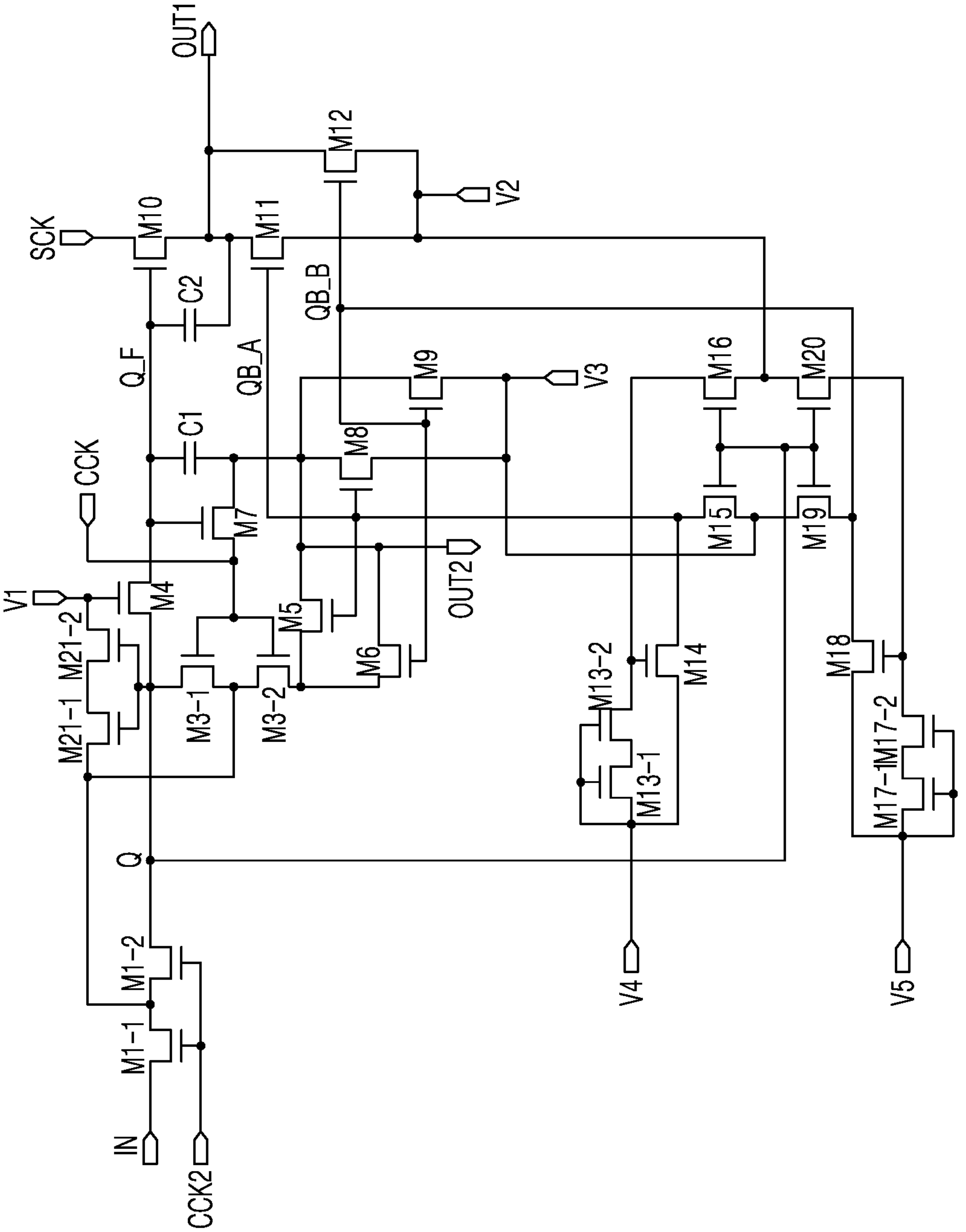

The stage shown in FIG. 30 is different from the stage shown in FIG. 18 in that the (1-1)st transistor M1-1 and the (1-2)nd transistor M1-2 are connected between the input terminal IN and the first control node Q, that the gates of the (1-1)st transistor M1-1 and the (1-2)nd transistor M1-2 are connected to the second carry clock terminal CCK2, and that the (2-1)st transistor M2-1 and the (2-2)nd transistor M2-2 are removed. Other configurations and operations are the same.

In the stages shown in FIGS. 28 to 30, a signal applied to the second carry clock terminal CCK2 may be a signal in which a voltage level of a signal applied to the carry clock terminal CCK is inverted (opposite). As an example, in a stage in which a second carry clock signal CR_CLK2 is applied to the carry clock terminal CCK, a first carry clock signal CR_CLK1 may be applied to the second carry clock terminal CCK2. In a stage in which a first carry clock signal CR_CLK1 is applied to the carry clock terminal CCK, a second carry clock signal CR_CLK2 may be applied to the second carry clock terminal CCK2. The (1-1)st transistor M1-1 and the (1-2)nd transistor M1-2 may be turned on while a first carry clock signal CR_CLK1 or a second carry clock signal CR_CLK2 applied to the second carry clock terminal CCK2 is a high level, and be configured to supply the external signal SW or the previous carry signal Carry [k−1] of a high level to the first control node Q. Accordingly, the first control node Q may be in a high-level state.

Figure 31:
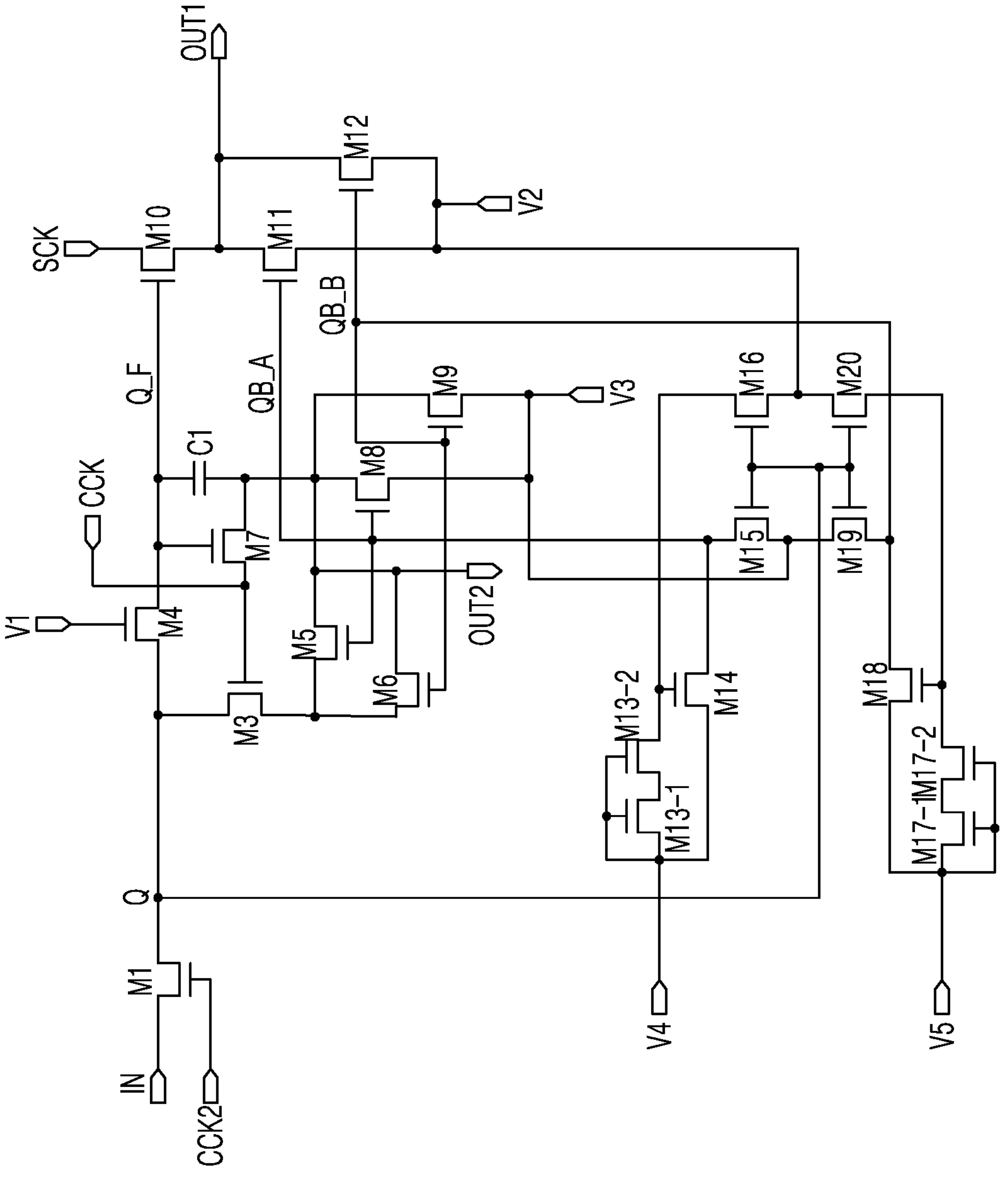

In a stage shown in FIG. 31, because the (1-2)nd transistor M1-2 and the (3-2)nd transistor M3-2 are removed, the first transistor M1 and the third transistor M3 each have a single-transistor structure. The stage shown in FIG. 31 is different from the stage shown in FIG. 28 in that the (21-1)st transistor M21-1 and the (21-2)nd transistor M21-2 are removed. Other configurations and operations are the same.

Figure 32:
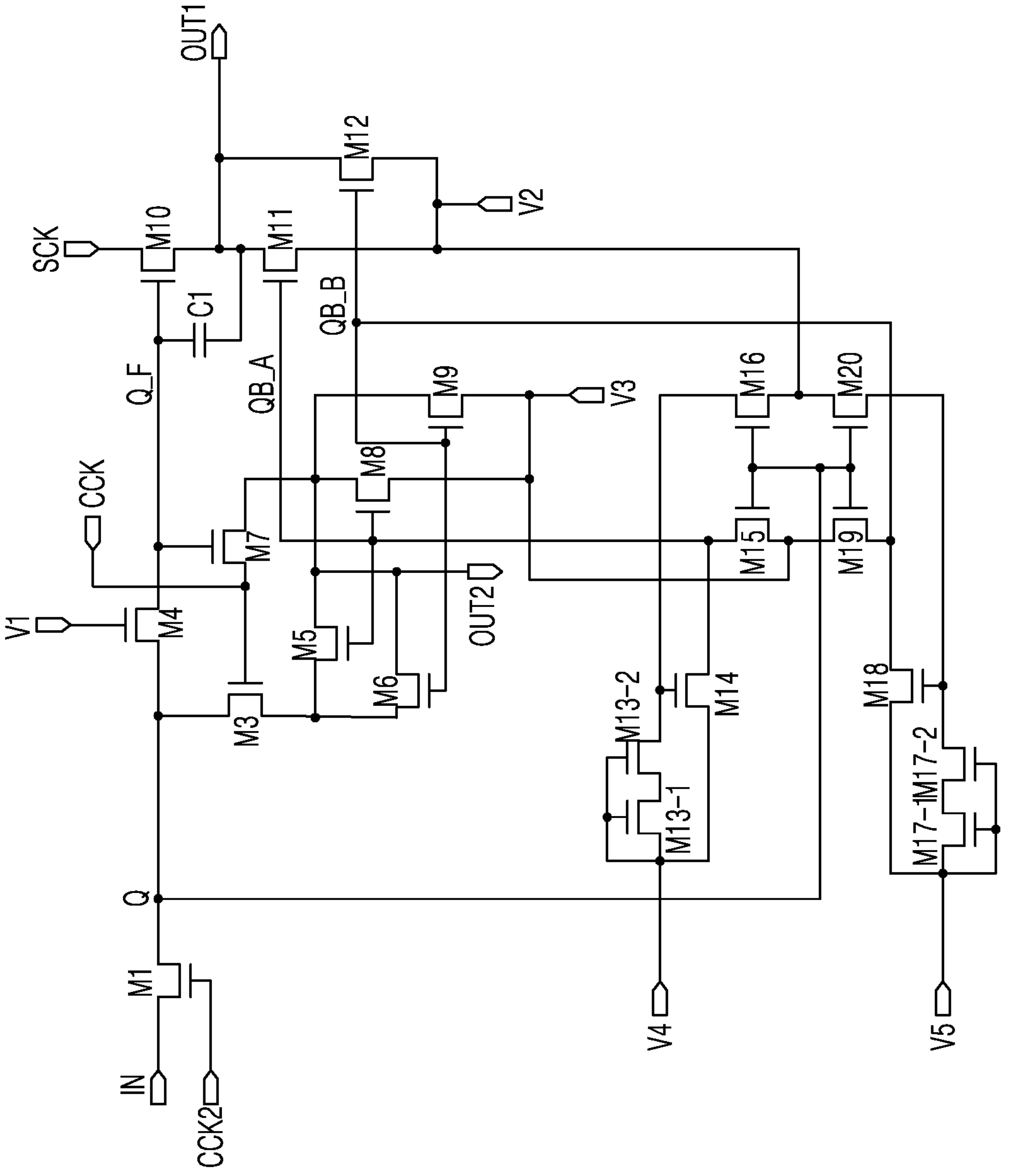

In a stage shown in FIG. 32, because the (1-2)nd transistor M1-2 and the (3-2)nd transistor M3-2 are removed, the first transistor M1 and the third transistor M3 each have a single-transistor structure. The stage shown in FIG. 32 is different from the stage shown in FIG. 29 in that the (21-1)st transistor M21-1 and the (21-2)nd transistor M21-2 are removed. Other configurations and operations are the same.

Figure 33:
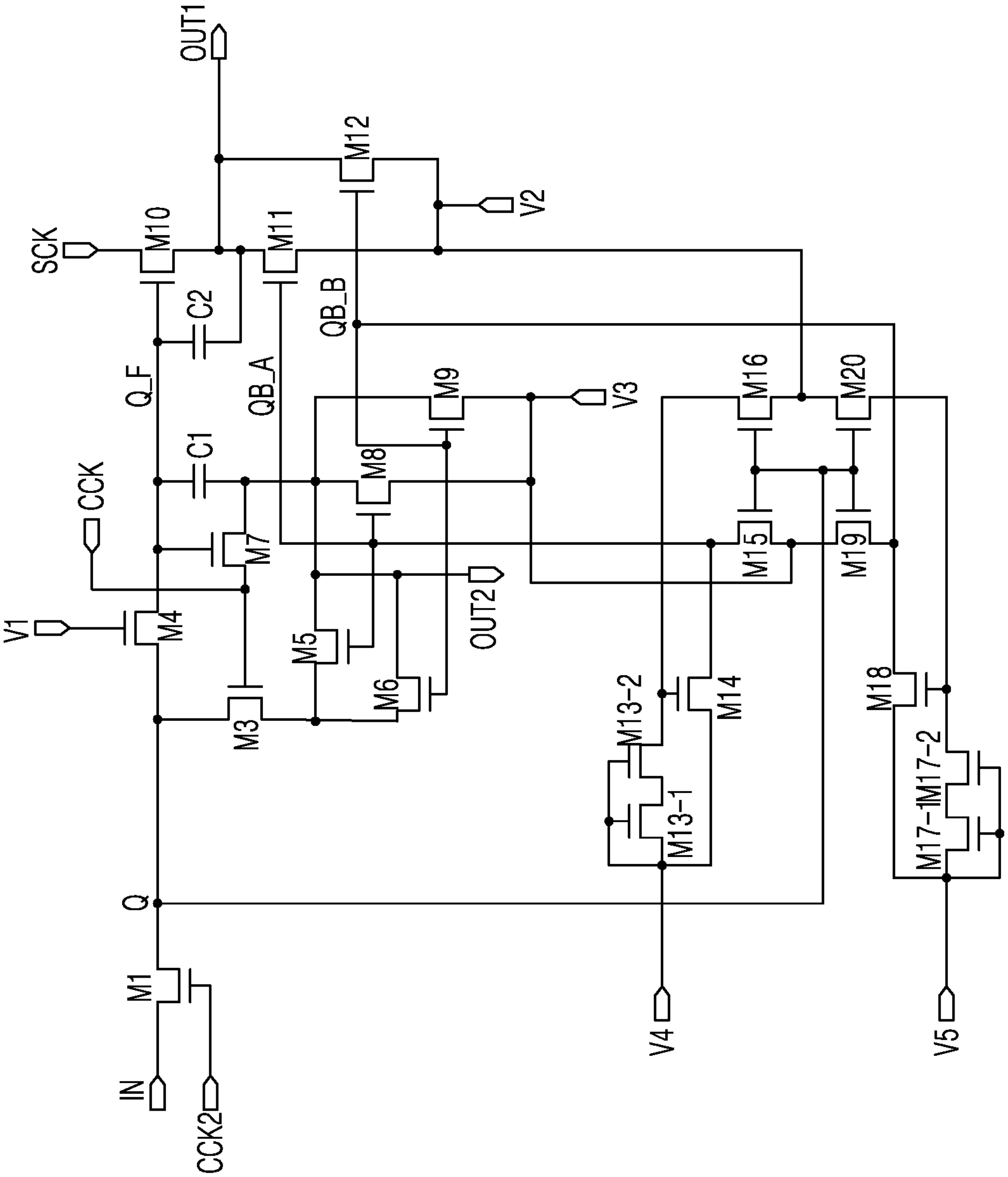

In a stage shown in FIG. 33, because the (1-2)nd transistor M1-2 and the (3-2)nd transistor M3-2 are removed, the first transistor M1 and the third transistor M3 each have a single-transistor structure. The stage shown in FIG. 33 is different from the stage shown in FIG. 30 in that the (21-1)st transistor M21-1 and the (21-2)nd transistor M21-2 are removed. Other configurations and operations are the same.

Figure 34:
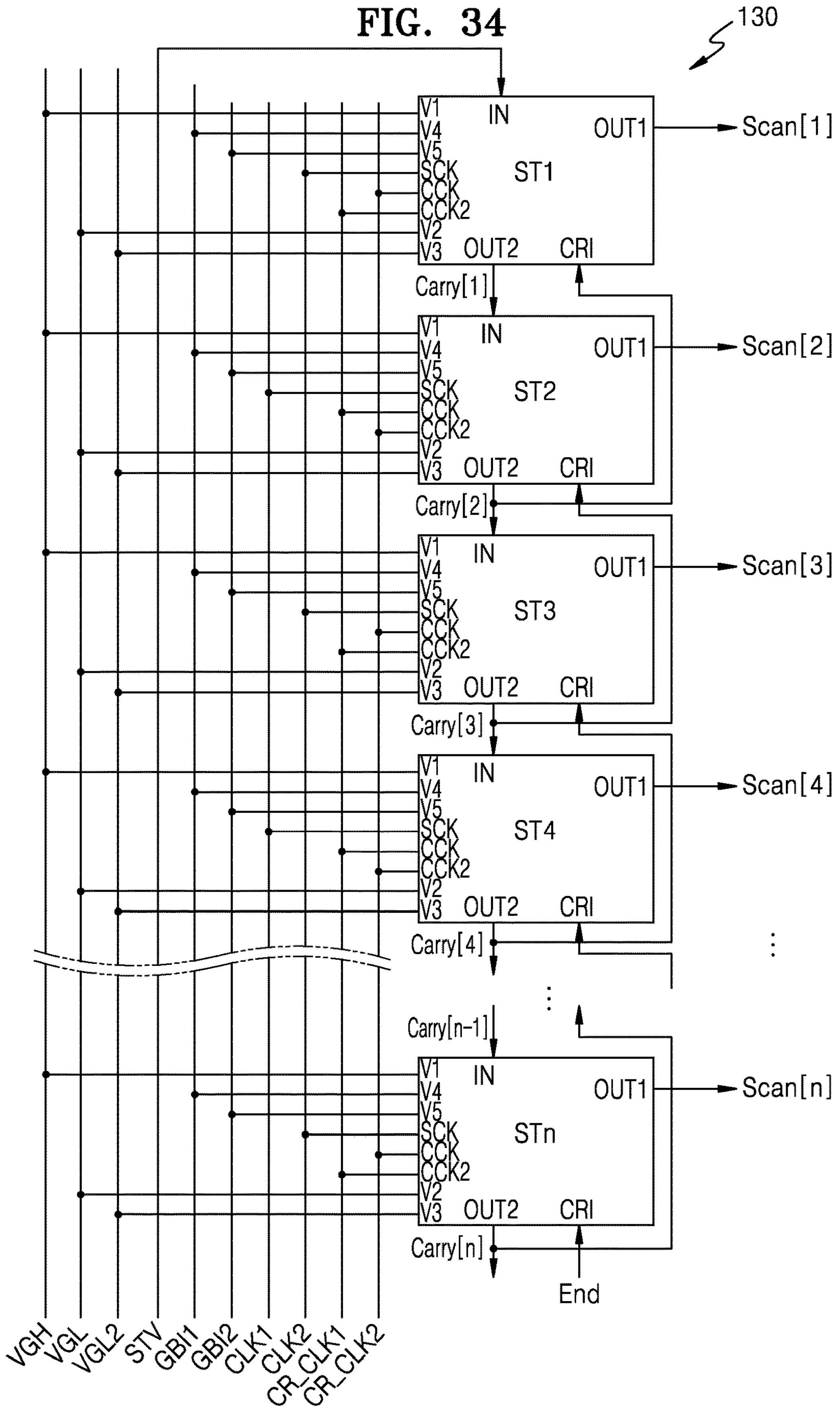
FIG. 34 is a schematic view of a scan driver according to some embodiments.

FIG. 34 is a schematic view of the scan driver 130 according to some embodiments. Each stage of the scan driver 130 shown in FIG. 34 may include the stage shown in FIGS. 28 to 33.

Referring to FIG. 34, the scan driver 130 is different from the scan driver 130 shown in FIG. 14 in that each of first to n-th stages ST1 to STn further includes the second carry clock terminal CCK2. Other configurations and operations are the same. The carry clock terminal CCK and the second carry clock terminal CCK2 may be configured to receive a first carry clock signal CR_CLK1 or a second carry clock signal CR_CLK2. When a first carry clock signal CR_CLK1 is applied to the carry clock terminal CCK, a second carry clock signal CR_CLK2 may be applied to the second carry clock terminal CCK2. When a second carry clock signal CR_CLK2 is applied to the carry clock terminal CCK, a first carry clock signal CR_CLK1 may be applied to the second carry clock terminal CCK2.

The scan driver according to embodiments may include N-type transistors, compensate for deterioration in characteristics of the transistors due to bias stress or an increase in a leakage current due to temperature, and generate scan signals having an on-voltage of a high level.

The display apparatus according to some embodiments may be display apparatus such as an organic light-emitting display apparatus, an inorganic light-emitting display apparatus, and a quantum-dot light-emitting display apparatus.

According to some embodiments, a scan driver configured to stably output scan signals, and a display apparatus including the same may be provided. Effects according to some embodiments are not limited to the above effects but may variously extend without departing from the scope of the present disclosure.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims, and their equivalents.

What is claimed is:

1. A scan driver comprising a plurality of stages, wherein each of the plurality of stages comprises:

a first transistor connected between a first node and an input terminal configured to receive a start signal, and having a gate connected to a first clock terminal configured to receive a first clock signal;

a first pull-up transistor having a gate connected to the first node, and configured to output scan signal of a first voltage level in response to the first node being in the first voltage level;

a first pull-down transistor having a gate connected to a second node, and configured to output scan signal of a second voltage level in response to the second node being in the first voltage level;

a second pull-down transistor having a gate connected to a third node, and configured to output scan signal of the second voltage level in response to the third node being in the first voltage level; and a node controller configured to control the second node and the third node to a third voltage level in response to the first node being in the first voltage level, and control the second node and the third node to the first voltage level in response to the first node being in the third voltage level.

2. The scan driver of claim 1, wherein the node controller comprises:

a second transistor connected between a fourth voltage input terminal configured to receive a first signal and a fourth node, and having a gate connected to the fourth voltage input terminal;

a third transistor connected between the fourth voltage input terminal and the second node, and having a gate connected to the fourth node;

a fourth transistor connected between the fourth node and a second voltage input terminal configured to receive a second voltage of the second voltage level, and having a gate connected to the first node;

a fifth transistor connected between the second node and a third voltage input terminal configured to receive a third voltage of the third voltage level, and having a gate connected to the first node;

a first capacitor connected between the second node and the fourth node;

a sixth transistor connected between a fifth voltage input terminal configured to receive a second signal and a fifth node, and having a gate connected to the fifth voltage input terminal;

a seventh transistor connected between the fifth voltage input terminal and the third node, and having a gate connected to the fifth node;

an eighth transistor connected between the fifth node and the second voltage input terminal, and having a gate connected to the first node;

a ninth transistor connected between the third node and the third voltage input terminal, and having a gate connected to the first node; and a second capacitor connected between the third node and the fifth node.

3. The scan driver of claim 2, wherein a voltage level of the third voltage is lower than a voltage level of the second voltage.

4. The scan driver of claim 2, wherein the first signal and the second signal are signals in which the first voltage level and the third voltage level alternate with each other in units of frames.

5. The scan driver of claim 2, wherein the first signal and the second signal are signals in which the first voltage level and the third voltage level alternate with each other in units of n times or 1/n times of a frame, and n is a natural number of 2 or more.

6. The scan driver of claim 2, wherein a part of a period in which the first signal is at the first voltage level overlaps a part of a period in which the second signal is at the first voltage level.

7. The scan driver of claim 1, wherein first voltage level states of the second node and the third node alternate with each other in units of frames.

8. The scan driver of claim 1, wherein first voltage level states of the second node and the third node alternate with each other in units of n times or 1/n times of a frame, and n is a natural number of 2 or more.

9. The scan driver of claim 1, wherein the first transistor comprises a (1-1)st transistor and a (1-2)nd transistor, which are connected in series, and further comprising a tenth transistor connected between a first voltage input terminal configured to receive a first voltage of the first voltage level and an intermediate node between the (1-1)st transistor and the (1-2)nd transistor, and configured to control the intermediate node to the first voltage level of the first voltage, based on the first node being in a first voltage level state.

10. The scan driver of claim 1, wherein:

the first pull-up transistor is connected between a second clock terminal configured to receive a second clock signal and a first output terminal, and the first pull-down transistor and the second pull-down transistor are connected between the first output terminal and a second voltage input terminal configured to receive a second voltage of the second voltage level.

11. The scan driver of claim 10, further comprising:

a second pull-up transistor having a gate connected to the first node, connected between a third clock terminal configured to receive a third clock signal and a second output terminal, and configured to output carry signal of the first voltage level in response to the first node being in the first voltage level;

a third pull-down transistor having a gate connected to the second node, connected between the second output terminal and a third voltage input terminal configured to receive a third voltage of the third voltage level, and configured to output carry signal of the third voltage level in response to the second node being in the first voltage level; and a fourth pull-down transistor having a gate connected to the third node, connected between the second output terminal and the third voltage input terminal, and configured to output carry signal of the third voltage level in response to the third node being in the first voltage level.

12. The scan driver of claim 11, further comprising a first capacitor connected between the first node and the second output terminal.

13. The scan driver of claim 11, wherein a voltage level of the third voltage is lower than a voltage level of the second voltage.

14. The scan driver of claim 11, wherein a period in which the second clock signal is in the first voltage level overlaps a period in which the third clock signal is in the first voltage level.

15. The scan driver of claim 11, wherein the first clock signal and the third clock signal are clock signals in which a first voltage of the first voltage level and the third voltage alternate with each other, and the second clock signal is a clock signal in which the first voltage and the second voltage alternate with each other.

16. The scan driver of claim 15, wherein the third clock signal has a same waveform as that of the first clock signal, the third clock signal having a phase shifted by a preset interval, and the second clock signal has a same waveform as that of the third clock signal, the second clock signal having a same phase as that of the third clock signal.

17. The scan driver of claim 11, further comprising: an eleventh transistor connected between the first node and a sixth node, and having a gate connected to the third clock terminal;

a twelfth transistor connected between the second output terminal and the sixth node, and having a gate connected to the second node; and a thirteenth transistor connected between the second output terminal and the sixth node, and having a gate connected to the third node.

18. The scan driver of claim 17, wherein:

the third clock signal is configured to alternately output the first voltage level and the third voltage level in response to the first node being in the first voltage level, and the second node or the third node being in the third voltage level, and the first node is electrically connected to the second output terminal in response to the third clock signal being at the first voltage level and the second node or the third node being in the first voltage level.

19. The scan driver of claim 9, further comprising a fourteenth transistor connected between the first node and a second voltage input terminal configured to receive a second voltage of the second voltage level, and configured to reset the first node, wherein the fourteenth transistor comprises a pair of sub-transistors connected in series, each of the pair of sub-transistors having a gate connected to a reset terminal configured to receive a reset signal, and the tenth transistor is configured to control an intermediate node of the fourteenth transistor to the first voltage level of the first voltage in response to the first node being in the first voltage level.

20. A scan driver comprising a plurality of stages, wherein each of the plurality of stages comprises:

a first pull-up transistor having a gate connected to a first node, and connected between a first output terminal and a first clock terminal configured to receive a first clock signal in which a first voltage of a first voltage level and a second voltage of a second voltage level alternate with each other;

a first pull-down transistor having a gate connected to a second node, and connected between the first output terminal and a voltage input terminal configured to receive the second voltage;

a first transistor having a gate connected to a second clock terminal configured to receive a second clock signal in which the first voltage and a third voltage of a third voltage level alternate with each other, and connected between an input terminal configured to receive a start signal and the first node;

a second transistor having a gate connected to the first node, and connected between the second node and a voltage input terminal configured to receive the third voltage, wherein the gate of the first transistor receives the second clock signal and a terminal of the first transistor receives the start signal which is different from the second clock signal, and wherein the third voltage is lower than the second voltage.

21. The scan driver of claim 20, further comprising:

a third transistor having a gate connected to the first node, and connected between the voltage input terminal configured to receive the second voltage and a third node;

a fourth transistor having a gate connected to a voltage input terminal configured to receive a first signal, and connected between the third node and the voltage input terminal configured to receive the first signal;

a fifth transistor having a gate connected to the third node, and connected between the voltage input terminal configured to receive the first signal and the second node; and a first capacitor connected between the third node and the second node, wherein the first signal is a signal in which the first voltage level and the third voltage level alternate with each other in units of frames.

22. The scan driver of claim 20, further comprising:

a second pull-up transistor having a gate connected to the first node, and connected between a second output terminal and a third clock terminal configured to receive a third clock signal in which the first voltage and the third voltage alternate with each other; and a second pull-down transistor having a gate connected to the second node, and connected between the voltage input terminal configured to receive the third voltage and the second output terminal.

23. The scan driver of claim 22, further comprising:

a sixth transistor having a gate connected to the third clock terminal, and connected between the first node and a fourth node; and a seventh transistor having a gate connected to the second node, and connected between the fourth node and the second output terminal.

24. The scan driver of claim 23, further comprising an eighth transistor having a gate connected to a reset terminal configured to receive a reset signal, and connected between the first node and the voltage input terminal configured to receive the second voltage.

25. The scan driver of claim 24, further comprising a ninth transistor having a gate connected to the first node, and having a terminal connected to a voltage input terminal configured to receive the first voltage, wherein the eighth transistor comprises a pair of sub-transistors connected in series, and the ninth transistor is configured to control a voltage of an intermediate node of the eighth transistor to the first voltage level of the first voltage in response to the first node being in the first voltage level.

26. The scan driver of claim 25, further comprising a third pull-down transistor having a gate connected to a fifth node, and connected between the first output terminal and the voltage input terminal configured to receive the second voltage;

a fourth pull-down transistor having a gate connected to the fifth node, and connected between the second output terminal and the voltage input terminal configured to receive the third voltage;

a tenth transistor having a gate connected to the fifth node, and connected between the fourth node and the second output terminal;

an eleventh transistor having a gate connected to the first node, and connected between the fifth node and the voltage input terminal configured to receive the third voltage;

a twelfth transistor having a gate connected to the first node, and connected between a sixth node and the voltage input terminal configured to receive the second voltage;

a thirteenth transistor having a gate connected to a voltage input terminal configured to receive a second signal, and connected between the sixth node and the voltage input terminal configured to receive the second signal;

a fourteenth transistor having a gate connected to the sixth node, and connected between the voltage input terminal configured to receive the second signal and the fifth node; and a second capacitor connected between the sixth node and the fifth node, wherein the second signal is a signal in which the first voltage level and the third voltage level alternate with each other in units of frames.

27. The scan driver of claim 24, further comprising:

a third pull-down transistor having a gate connected to a fifth node, and connected between the first output terminal and the voltage input terminal configured to receive the second voltage;

a fourth pull-down transistor having a gate connected to the fifth node, and connected between the second output terminal and the voltage input terminal configured to receive the third voltage;

a tenth transistor having a gate connected to the fifth node, and connected between the fourth node and the second output terminal;

an eleventh transistor having a gate connected to the first node, and connected between the fifth node and the voltage input terminal configured to receive the third voltage;

a twelfth transistor having a gate connected to the first node, and connected between a sixth node and the voltage input terminal configured to receive the second voltage;

a thirteenth transistor having a gate connected to a voltage input terminal configured to receive a second signal, and connected between the sixth node and the voltage input terminal configured to receive the second signal;

a fourteenth transistor having a gate connected to the sixth node, and connected between the voltage input terminal configured to receive the second signal and the fifth node; and a second capacitor connected between the sixth node and the fifth node, wherein the second signal is a signal in which the first voltage level and the third voltage level alternate with each other in units of frames.

* * * * *